(12) United States Patent
Matsui et al.

(10) Patent No.: US 7,878,610 B2
(45) Date of Patent: Feb. 1, 2011

(54) INFORMATION RECORDING APPARATUS

(75) Inventors: Takeshi Matsui, Tokyo (JP); Tatsumi Ito, Kanagawa (JP); Seiji Kobayashi, Kanagawa (JP); Yuichiro Ikemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 681 days.

(21) Appl. No.: 11/900,337

(22) Filed: Sep. 11, 2007

(65) Prior Publication Data

US 2008/0068408 A1 Mar. 20, 2008

(30) Foreign Application Priority Data

Sep. 15, 2006 (JP) ............... 2006-251758
Feb. 21, 2007 (JP) ............... 2007-041445

(51) Int. Cl.
*B41J 25/308* (2006.01)
*B41J 3/00* (2006.01)

(52) U.S. Cl. ............................ 347/8; 347/2
(58) Field of Classification Search .............. None
See application file for complete search history.

(56) References Cited

U.S. PATENT DOCUMENTS

2006/0209102 A1* 9/2006 Jones et al. ............... 347/4

FOREIGN PATENT DOCUMENTS

| JP | 2000-339916 | 12/2000 |
|----|-------------|---------|
| JP | 3341572 | 8/2002 |
| JP | 2002-531290 | 9/2002 |
| JP | 2002-334553 | 11/2002 |
| JP | 2003-080766 | 3/2003 |
| JP | 2004-216642 | 8/2004 |
| JP | 2004-280953 A | 10/2004 |
| JP | 2005-251325 | 9/2005 |

* cited by examiner

*Primary Examiner*—Omar Rojas
(74) *Attorney, Agent, or Firm*—Wolf, Greenfield & Sacks, P.C.

(57) ABSTRACT

An information recording apparatus into which an information recording medium is loaded, in which a label can be printed on a label surface of the loaded information recording medium is disclosed. The apparatus includes: an information recording means positioned on the recording surface side of the information recording medium; a print head positioned on the opposite side of the information recording means and the information recording medium and configured to print a label; and a print head moving means for moving the print head at a position shifted from the rotational center of the information recording medium in parallel with the radial direction of at least in the part of the information recording medium.

16 Claims, 53 Drawing Sheets

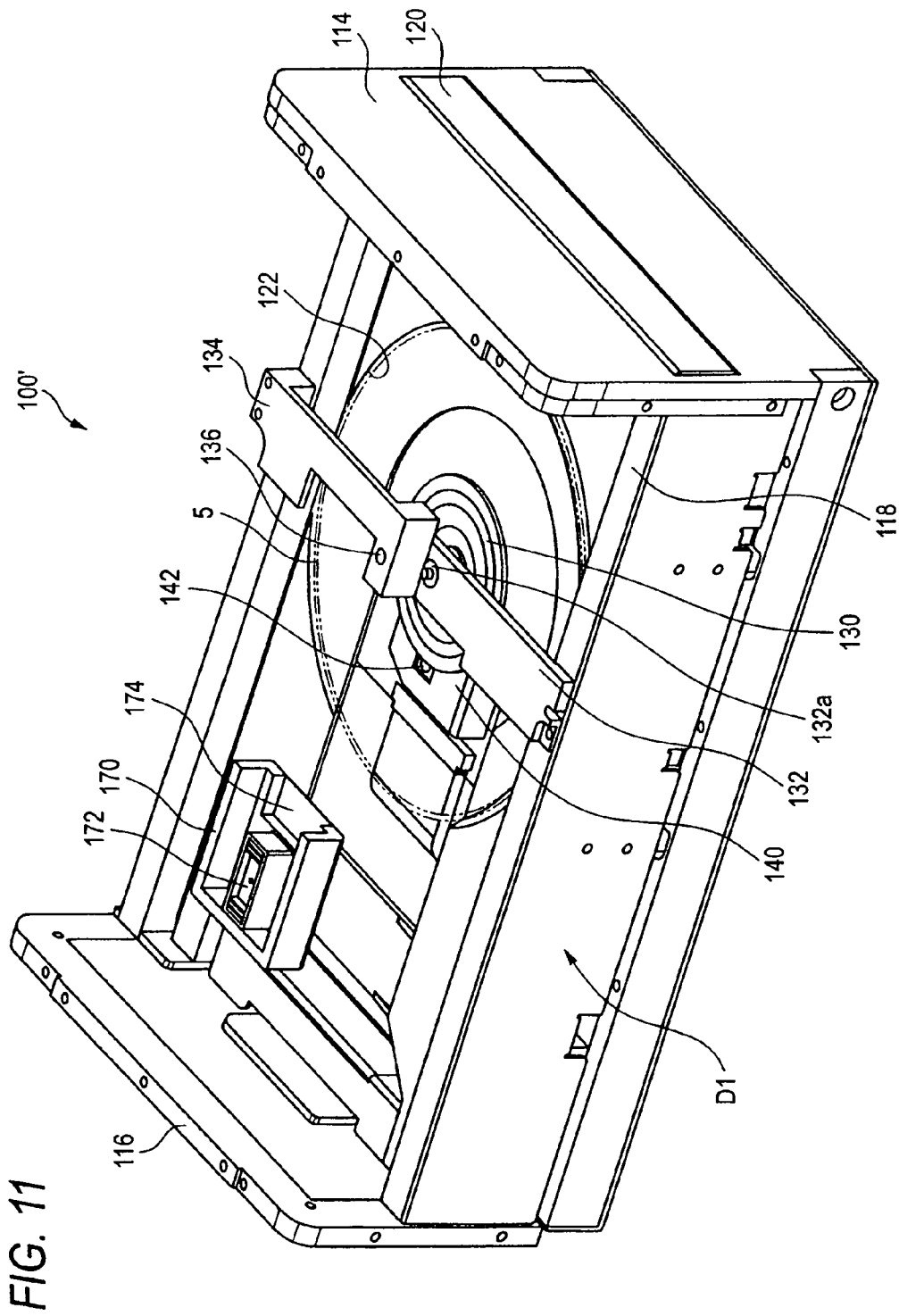

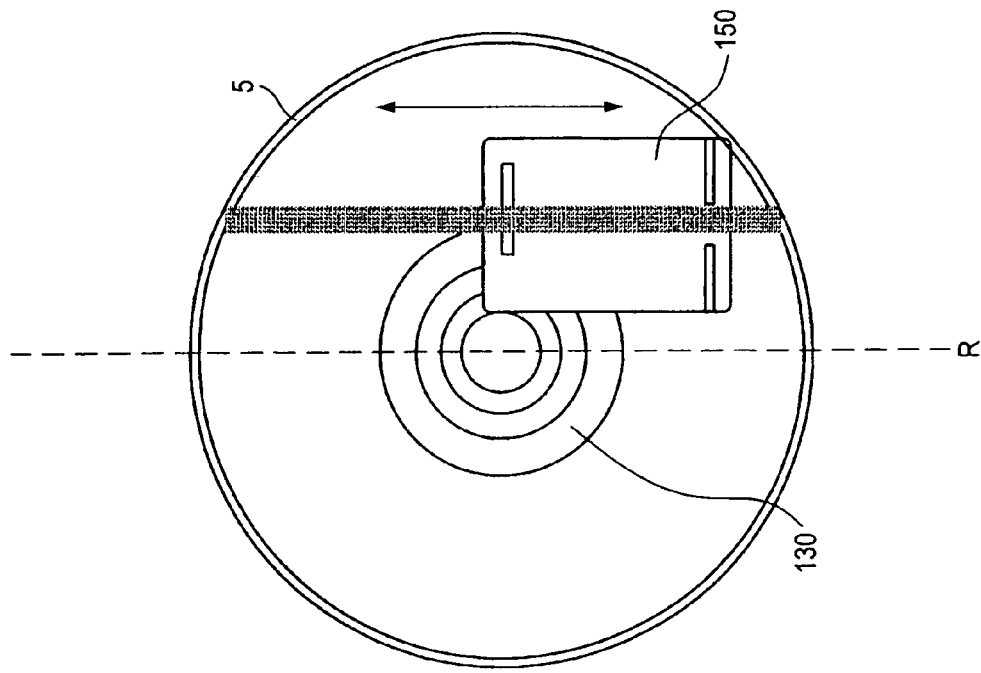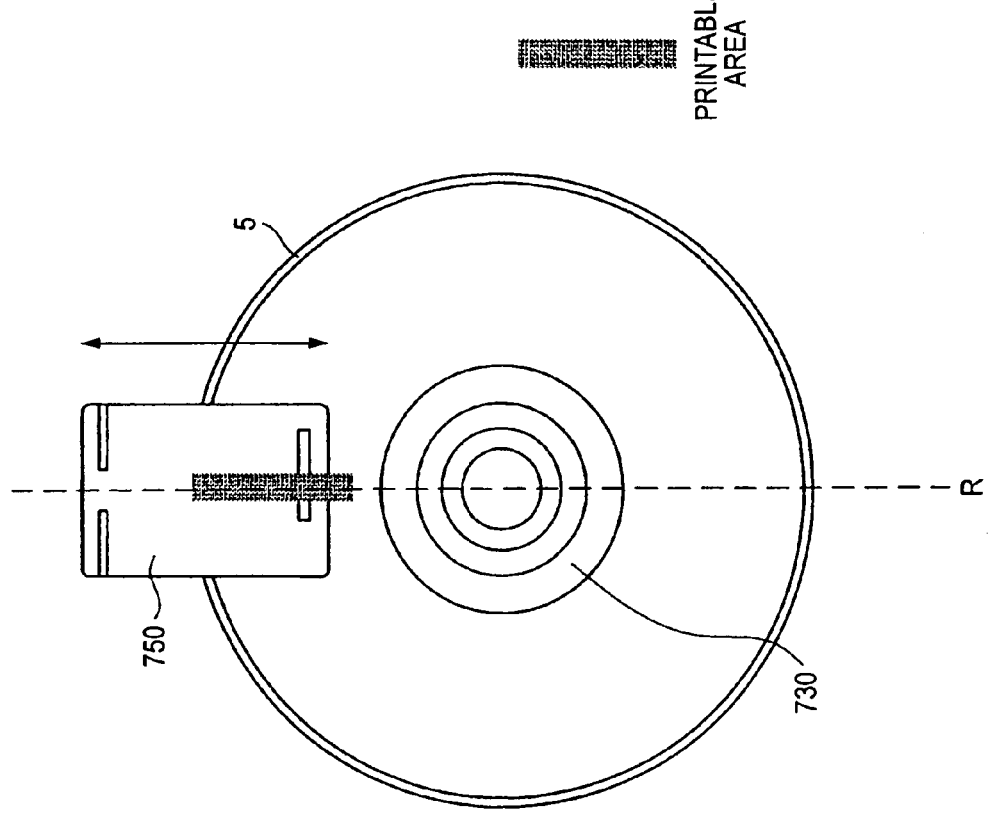

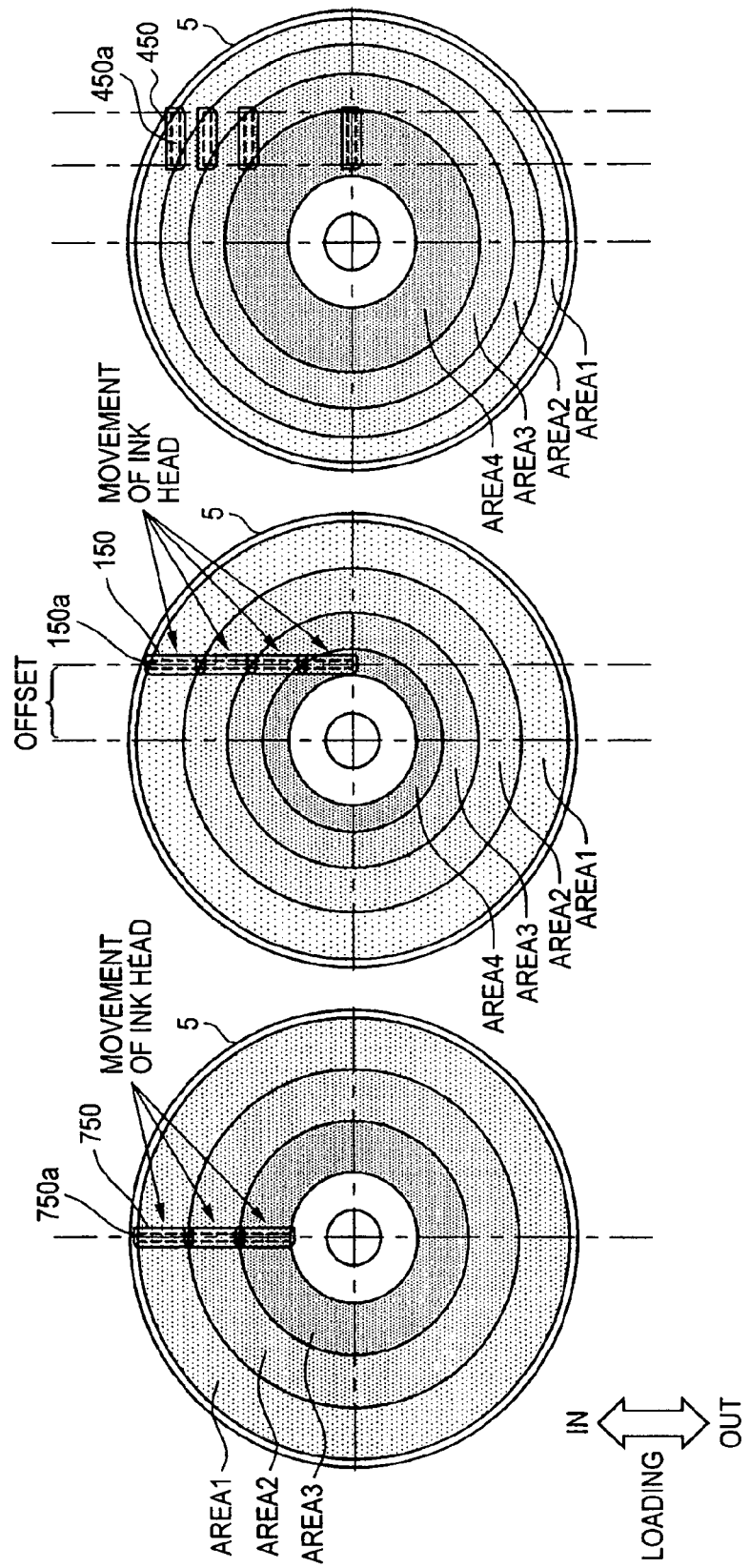

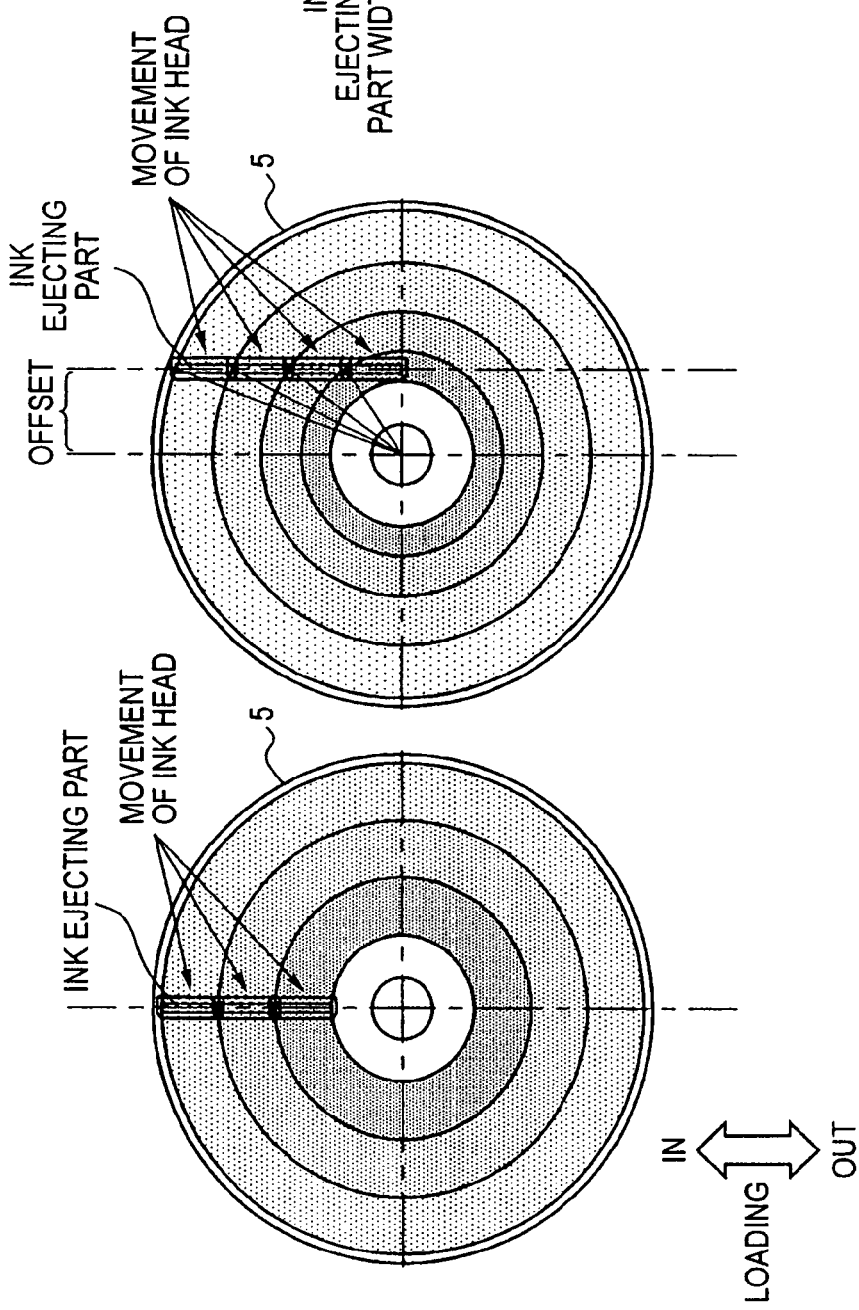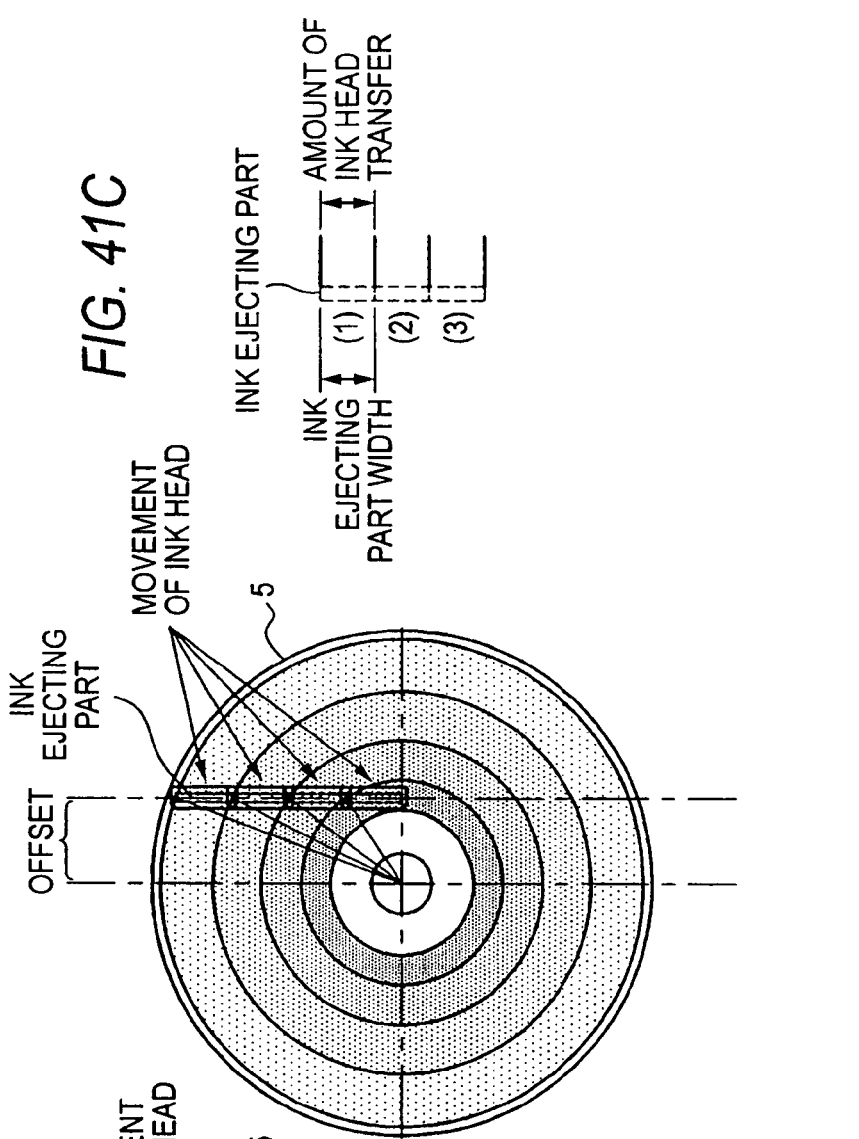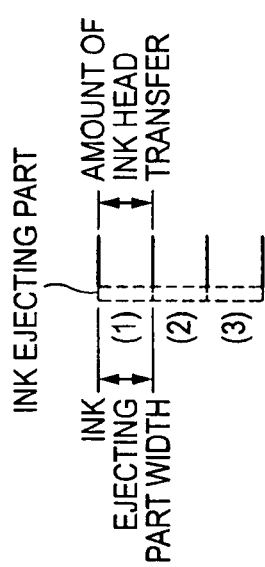

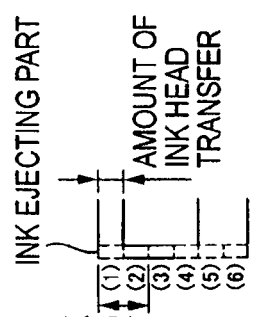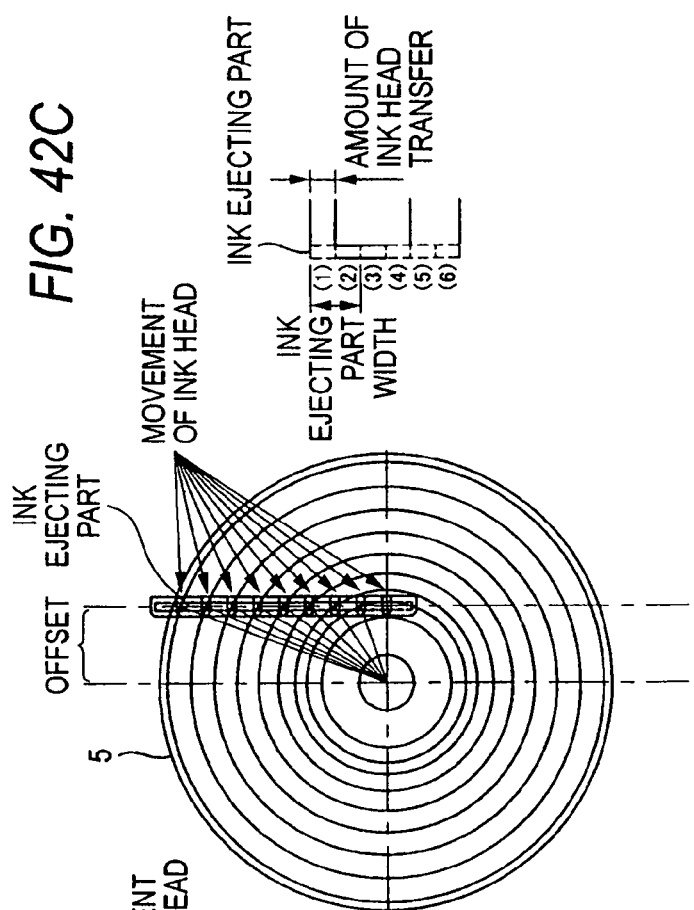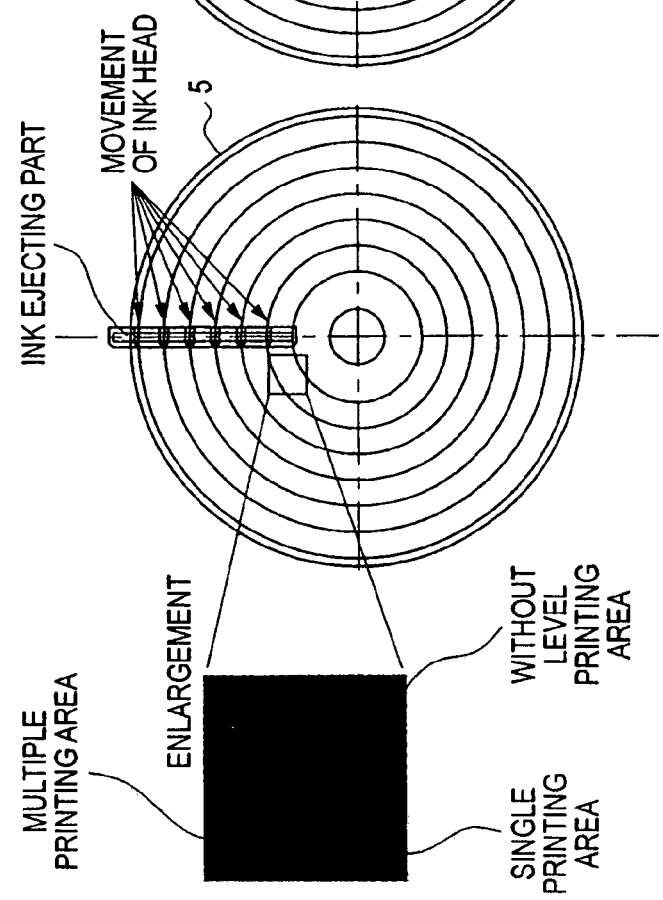

INFORMATION RECORDING APPARATUS

CROSS REFERENCES TO RELATED APPLICATIONS

The present invention contains subject matter related to Japanese Patent Applications JP 2006-251758 and JP 2007-041445 filed in the Japanese Patent Office on Sep. 15, 2006 and Feb. 21, 2007, respectively, the entire contents of which being incorporated herein by reference.

BACKGROUND OF THE INVENTION

1. Field of the Invention

The present invention relates to an information recording apparatus which can record and read digital data, particularly to an information recording apparatus which can print a label on the label surface (a printing surface for text and images) on the opposite side of the data recording surface of an information recording medium such as an optical disk.

2. Description of the Related Art

An information recording apparatus before such as an optical disk apparatus is known as an apparatus in which an optical disk medium having a few megabytes to a few gigabytes of recording capacity such as a CD (Compact Disk) and a DVD (Digital Versatile Disk) is carried into the apparatus by a housing mechanism, it is clamped (chucked) to a spindle motor, and data is read out or read and written by an information recording unit such as an optical head having a lens mounted thereon, and the apparatus is generally widely used.

In addition, in recent years, a BD (Blu-Ray Disk) and a HD-DVD (High Definition Digital Versatile Disk) which are capable of recording in high density are devices having the same basic configuration, and such an optical disk medium is also developed that can achieve the recording capacity five to ten times greater than that of a medium before such as DVD by forming a light source to have shorter wavelengths, or by increasing the NA (Numerical Aperture) value of a lens.

An increasing number of information recording apparatus including an optical disk apparatus using an information recording medium capable of recording in high density such as an optical disk medium multiplies a volume of information to be recorded. In addition, an increasing number of recorded information recording media causes the difficulty to manage a large number of information recording media on which information is recorded.

In contrast to this, various methods are proposed that display management information about an information recording medium such as an optical disk medium on a medium such as a disk. For example, Patent Reference 1 (JP-A-2004-280953) describes a method that records management information about an optical disk medium on the recording surface of the disk so that the management information can be visually recognized. More specifically, a method is disclosed in which the laser beam of an optical pickup is used to record management information in an area different from the information recording area on the recording surface of an optical disk.

In addition, it is also performed that text and images corresponding to information recorded on an information recording medium are printed on the label surface that is on the opposite side of the recording surface of the information recording medium such as an optical disk. More specifically, for example, a printer of the ink jet system that can print a label is used to print on the label surface of an optical disk. In addition to this, some of optical disk apparatus are commercially available that have an ink jet print head incorporated therein to print labels. For the optical disk apparatus which can print labels, a method is proposed in which a print head is mounted on an optical disk apparatus to print a label on a rotating optical disk (for example, see Patent Reference 2 (JP-T-2002-812140)), and an optical disk apparatus is proposed that has a printing function incorporated therein (for example, see Patent Reference 3 (Japanese Patent No. 3341572)). In the optical disk apparatus described in Patent References 2 and 3, the print head is configured to move the radial axis of the optical disk.

SUMMARY OF THE INVENTION

However, in the case in which a print head movable on the radial axis is provided as the optical disk apparatus described in the Patent References 2 and 3, since the print head passes through the rotational center of the disk in printing a label, the print head comes into contact with a member such as a chucking plate. Therefore, a problem arises that the movable area of the print head, that is, the printable area is narrowed to cause the difficulty of printing near the inner radius of the disk.

In addition, on this account, in the case in which it is desired to print throughout the surface, a problem arises that it takes a long time to print a label because the printable area is narrowed.

Moreover, in consideration of a reduction in size of the overall information recording apparatus such as an optical disk apparatus, it is necessary to arrange the print head and the cap of the print head in the rear part of the apparatus (on the opposite side of the eject side of the disk). Thus, a problem arises that the maintenance of the apparatus takes efforts because it is necessary to remove the top cover of the apparatus to replace the print head.

Thus, it is desirable to provide an information recording apparatus which can record and read digital data as well as can print a label, in which a print can be easily made near the inner radius of an information recording medium such as a disk, a print can be made at high speed, and the maintenance of the apparatus can be performed easily.

According to an embodiment of the invention, for example, an information recording apparatus such as an optical disk apparatus is provided into which an information recording medium such as an optical disk is loaded, in which a label can be printed on a label surface of the loaded information recording medium, the apparatus including: an information recording means such as an optical pickup, positioned on the recording surface side of the information recording medium; a print head positioned on the opposite side of the information recording means and the information recording medium and configured to print a label; and a print head moving means for moving the print head at a position shifted from the rotational center of the information recording medium in parallel with the radial direction of at least in the part of the information recording medium.

As described above, the print head moving means moves the print head at the position shifted from the rotational center of the information recording medium such as an optical disk in the direction in parallel with the radial direction, whereby the printable area is increased, and a print can be easily made to near the inner radius of the information recording medium such as a disk. In addition, the print area is thus increased, the time for printing can be reduced greatly, and a print can be made at high speed in the case in which a print is made throughout the label surface of the information recording medium such as an optical disk.

Here, the information recording apparatus may further include a chucking plate disposed on the same side as the print head with respect to the information recording medium and configured to hold the center part of the information recording medium, wherein the print head moving means moves the print head at a position at which the chucking plate is not interfered.

In addition, in the information recording apparatus, the print head moving means may move the print head to a retract position, having a head cleaning mechanism configured to clean the print head and a cap means for capping the print head at the retract position, and the print head is cleaned and capped at a position distant from the information recording means.

In an embodiment of the invention, since the print head can be moved at the position shifted (offset) from the rotational center of the information recording medium, the print head does not interfere with a member such as an optical pickup on the radial axis and the mechanisms for capping and cleaning can be disposed more on the front side of the apparatus than before. Therefore, a reduction in size of the information recording apparatus can be implemented.

In addition, in the information recording apparatus, in the case in which the print head is moved over the information recording medium, the print head moving means may move the print head in parallel with the radial direction of the information recording medium, and in the case in which the print head is off the information recording medium, the print head moving means may move the print head in a predetermined direction different from the radial direction and then moves the print head to a retract position.

In addition, the print head may have an ink discharge part on the side facing to the label surface of the information recording medium, and the ink discharge part may have a plurality of ink discharge ports which is arranged in a direction in parallel with the radial direction of the information recording medium.

In addition, the information recording apparatus may further include a loading means for loading the information recording medium in or ejecting it, wherein the eject operation for the information recording medium by the loading means may be used to print the label.

With this configuration, particularly in the case in which print data is text information, a print time can be shortened to improve the convenience for users. In other words, the operation of the loading means is used to greatly reduce the time for printing when there is a little print data.

In addition, in the information recording apparatus, the print head may be detachably disposed with respect to the information recording apparatus, and the print head moving means may move the print head at a position sifted from the rotational center of the information recording medium toward an opening which is disposed on the surface on the eject side of the information recording medium.

In this case, for example, an openable print head replace cover is disposed with respect to the opening, whereby the print head can be replaced on the front surface side of the apparatus without removing the top cover of the information recording apparatus. Therefore, even though there is no space in the upper part of the information recording apparatus, it is unnecessary to draw the information recording apparatus as the manner before.

In addition, the information recording apparatus may further include a loading means having a tray on which the information recording medium is placed, wherein the tray may be provided with a maintenance member configured to perform maintenance of the print head.

For the maintenance member here, for example, there are a member which caps the print head, and an ink reservoir which stores ink in the case in which ink is discharged on purpose.

With this configuration, the configuration of the information recording apparatus can be simplified as well as the maintenance of the apparatus can be facilitated to improve the convenience for users.

In this case, the maintenance member may be detachably disposed with respect to the tray. For example, a function which caps the print head, and an ink reservoir which stores ink in the case in which ink is discharged on purpose can be detachably disposed on the rear part of the tray.

With this configuration, in drawing the apparatus in order to take the information recording medium out, the maintenance members such as the cap and the ink reservoir can be removed for cleaning, which more easily prevents the inside of the information recording apparatus from being smeared than before.

In addition, preferably, between two areas that are obtained by splitting an area including the information recording medium along the direction of moving the information recording means, the print head may be placed in the area positioned more on the downstream side than the information recording means is positioned with respect to the direction of rotating the information recording medium.

With this configuration, since ink that is discharged from the print head for floating flows toward the side surface side of the housing of the information recording apparatus due to a flow generated in association with the rotation of the information recording medium, the information recording means such as an optical pickup and a substrate positioned in the rear part of the apparatus can be prevented from being smeared.

In addition, the print head may be provided with an ink discharge part on the side facing to the label surface of the information recording medium, and the ink discharge part may have a plurality of ink discharge ports which is arranged in the direction vertical to the radial direction of the information recording medium. In this case, the information recording apparatus may further include a loading means for loading the information recording medium in or ejecting it, wherein the eject operation for the information recording medium by the loading means may be used to print the label.

In addition, a head control part may be provided which is configured to control the print head moving means so that a distance of a single movement of the print head can be changed, wherein the head control part may change a distance of a single movement of the print head, whereby it can be selectively set a single print mode in which the same region on the information recording medium is printed for a single time and a multiprint mode in which the same region on the information recording medium is printed for a plurality of times. In this case, the head control part may control the print head moving means so that a distance of a single movement of the print head is 1/n of a maximum print width of the print head (n is a natural number).

In addition, a head cleaning mechanism configured to clean the print head and a recording means cleaning mechanism configured to clean the information recording means may be provided, wherein the head cleaning mechanism may be formed in one piece with the recording means cleaning mechanism. In this case, a maintenance member may be provided which is configured to perform maintenance of the print head, wherein the head cleaning mechanism, the recording means cleaning mechanism and the maintenance member may be formed in one piece with each other. Moreover, in this case, the information recording apparatus may further include a maintenance control part configured to perform control so that after the head cleaning mechanism cleans the print head, the recording means cleaning mechanism cleans the information recording means.

As described above, according to an embodiment of the invention, in the information recording apparatus which can record and read digital data as well as can print a label, the print head is moved at the position shifted from the rotational center of the information recording medium such as a disk, whereby the print head does not come into contact with the member such as the chucking plate. Therefore, the printable area is more widened than before, and a print can be easily made near the inner radius of the disk. In addition, even though a print is made throughout the surface, the print area is widened to reduce a print time significantly, and a print can be made at high speed.

In addition, according to an embodiment of the invention, the print head is moved at the position shifted from the rotational center of the information recording medium such as a disk, whereby maintenance can be performed such as replacing the print head from the eject side of the information recording medium (from the front surface side of the information recording apparatus). Therefore, as different from the manner before, even though there is no room in the upper part of the apparatus, it is unnecessary to move the main body of the information recording apparatus, which can lead to an improved convenience for users.

BRIEF DESCRIPTION OF THE DRAWINGS

FIG. 11 shows a perspective view illustrative of an exemplary configuration of the chucking plate supporting plate according to the same embodiment;

FIGS. 12A and 12B show an illustration depicting the comparison of the printable area using the optical disk apparatus before with the printable area using the optical disk apparatus according to the first embodiment of an embodiment of the invention;

FIGS. 36A to 36C show an illustration depicting exemplary movements of the print head in the case of printing a label; FIG. 36A shows the case in which a label is printed by a print head before, FIG. 36B shows the case in which a label is printed by the print head according to the first embodiment of an embodiment of the invention, and FIG. 36C shows the case in which a label is printed by the print head according to a fourth embodiment of an embodiment of the invention;

FIGS. 41A to 41C show an illustration depicting the operation of the single print mode; FIG. 41A shows the case of using the optical disk apparatus before, and FIG. 41B shows the case of using the optical disk apparatus according to the fifth embodiment of an embodiment of the invention;

FIGS. 42A to 42C show an illustration depicting the operation of the multiprint mode; FIG. 42A shows the case of using the optical disk apparatus before, and FIG. 42B shows the case of using the optical disk apparatus according to the fifth embodiment of an embodiment of the invention;

DETAILED DESCRIPTION OF THE INVENTION

Hereinafter, preferred embodiments according to an embodiment of the invention will be described in detail with reference to the accompanying drawings. In addition, in the specification and the drawings, for the components having substantially the same functional configuration, the same numerals and signs are assigned to omit the overlapping descriptions.

The Configuration and Operation of the Information Recording Apparatus Before

Figure 3:
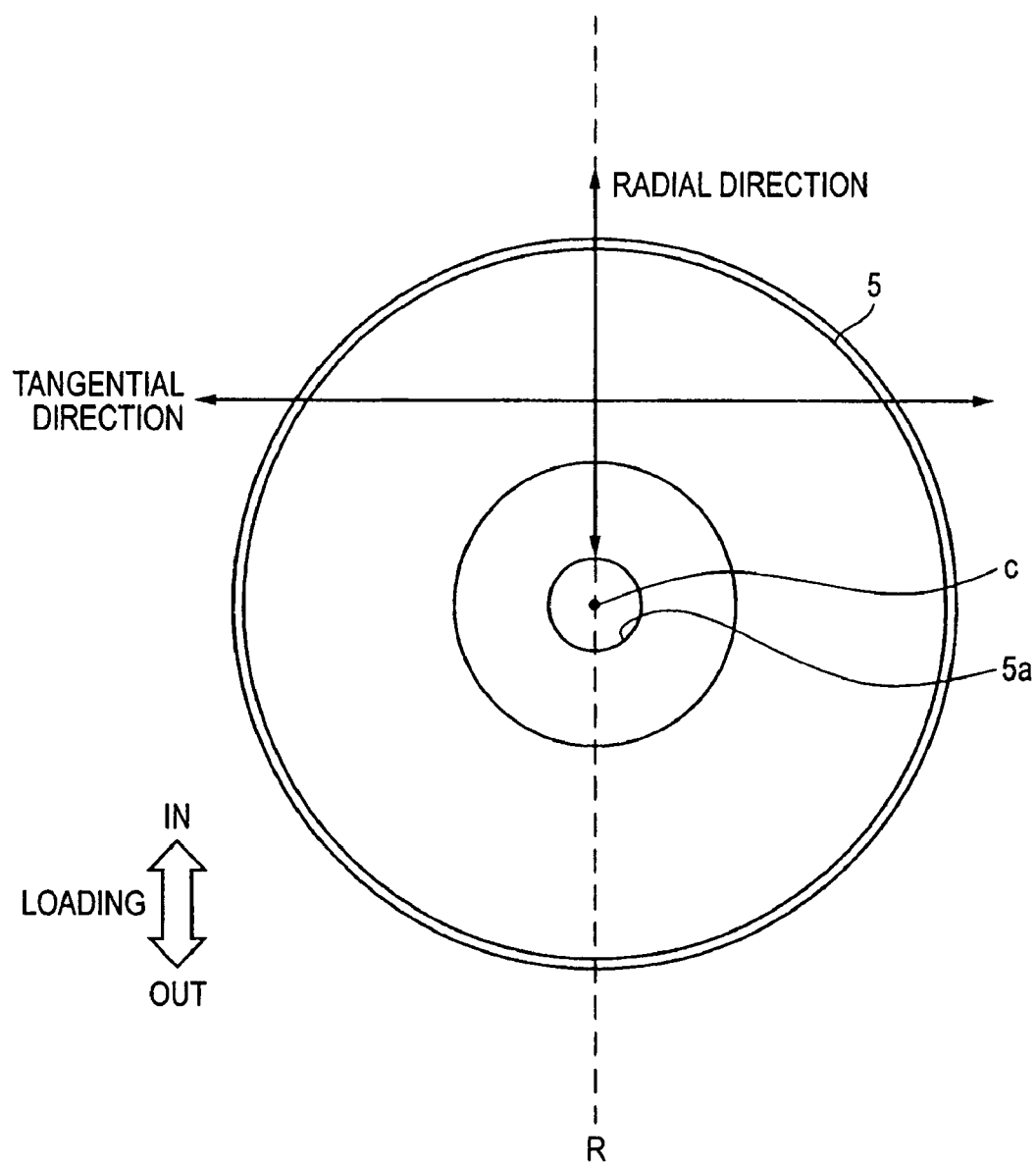
FIG. 3 shows an illustration depicting the radial direction of an optical disk.
Figure 4:
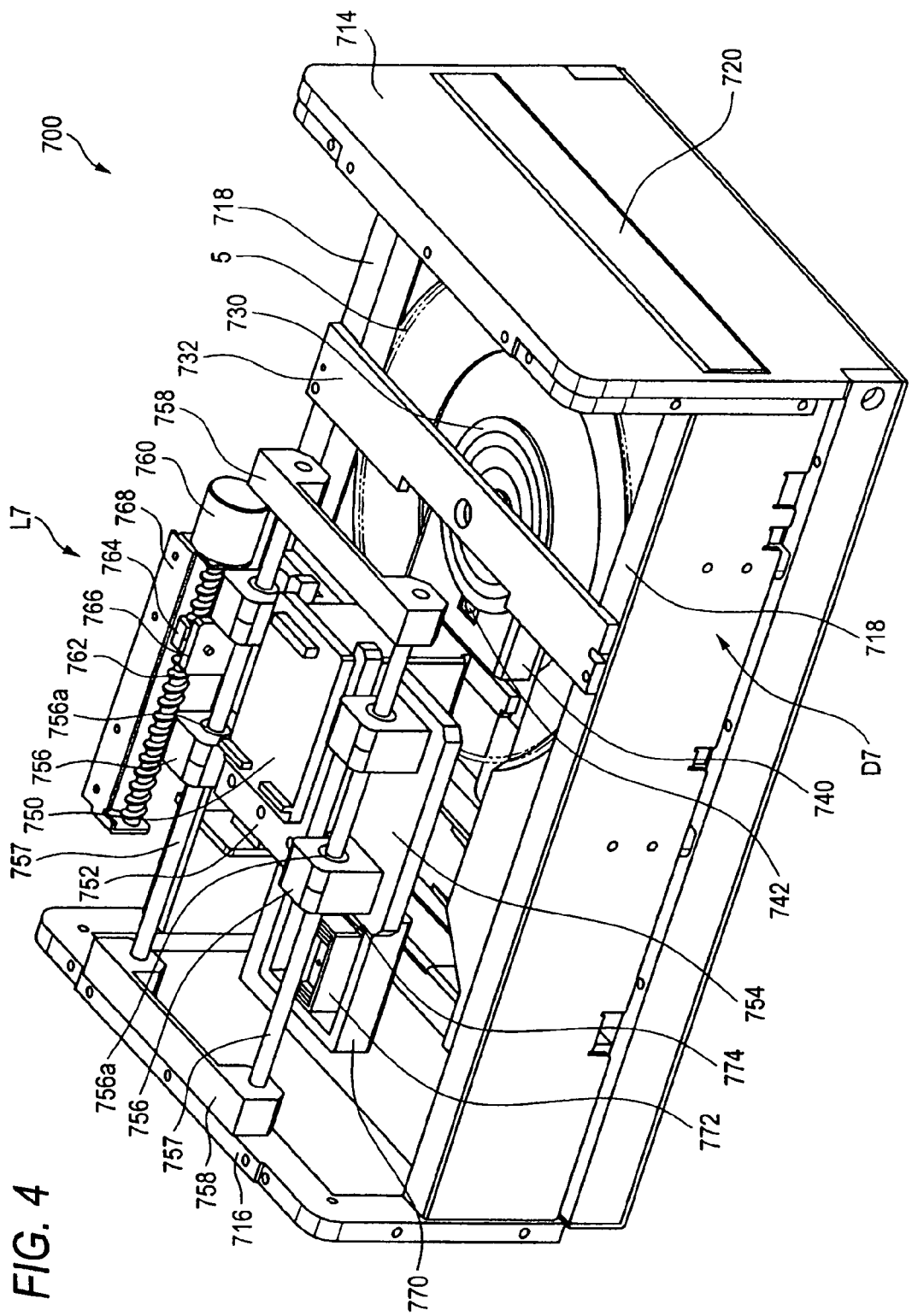
FIG. 4 shows a perspective view depicting the internal configuration of the optical disk apparatus before having the function of printing a label.
Figure 5:
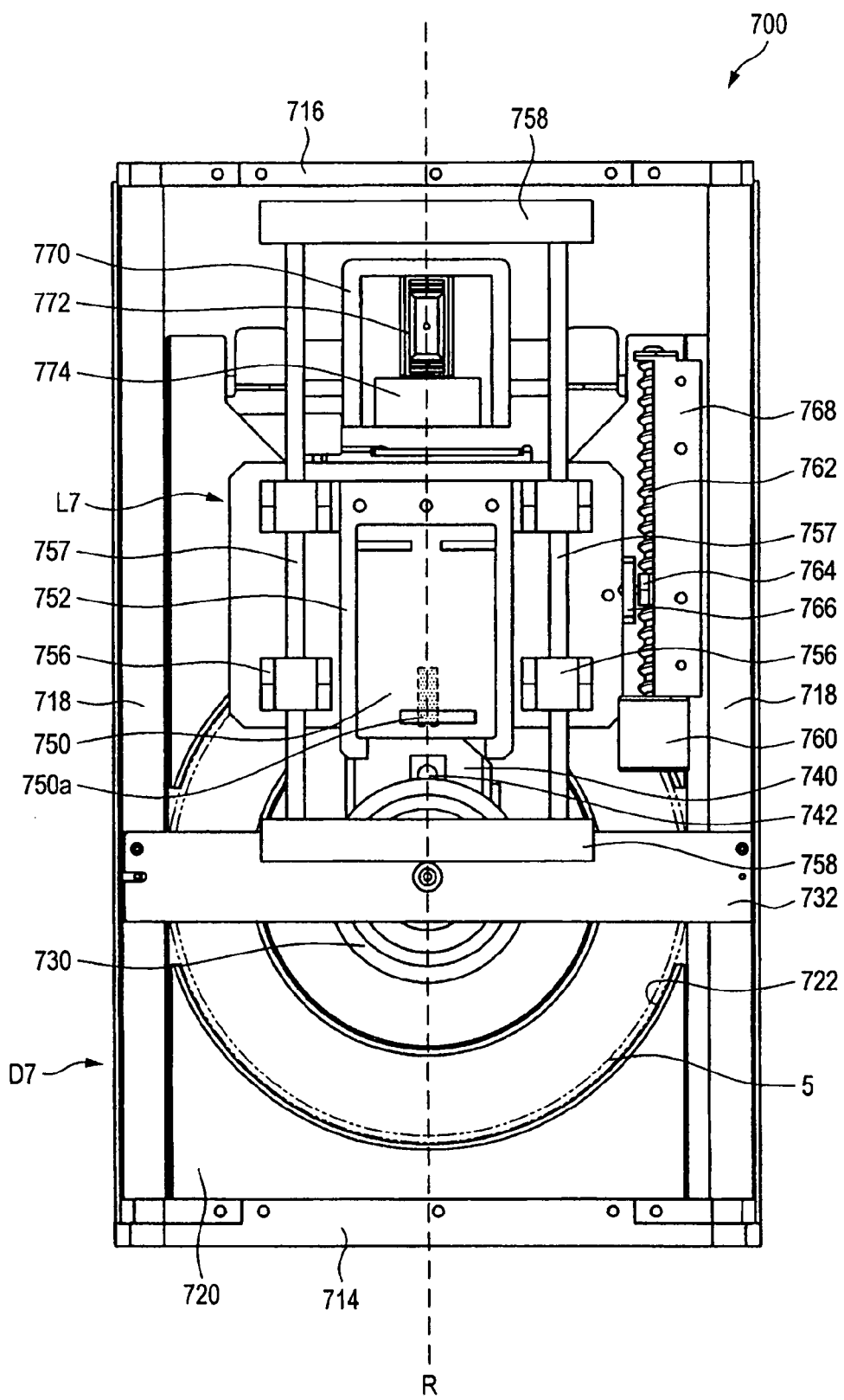
FIG. 5 shows a plan view depicting the internal configuration of the optical disk apparatus before having the function of printing a label.

First, an optical disk apparatus is taken as an example as one example of the information recording apparatus before, and the configuration and the operation will be described with reference to FIGS. 1 to 5. In addition, FIG. 1 shows a perspective view depicting the configuration of the appearance of an optical disk apparatus 700 before having the function of printing a label (tray system), FIG. 2 shows a perspective view depicting the configuration of the appearance of an optical disk apparatus 800 before having the function of printing a label (slot-in system), FIG. 3 shows an illustration depicting the radial direction and the tangential direction of an optical disk 5, FIG. 4 shows a perspective view depicting the internal configuration of the optical disk apparatus 700 before, and FIG. 5 shows a plan view depicting the internal configuration of the optical disk apparatus 700 before.

Figure 1:
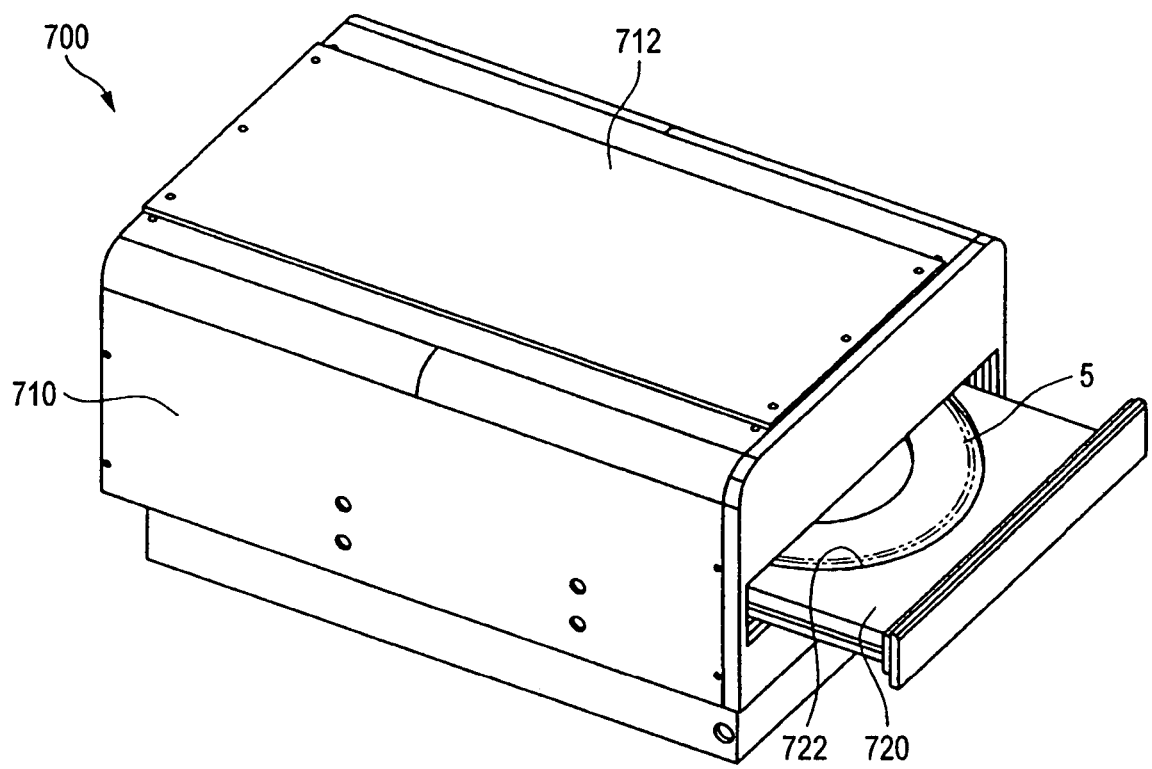
FIG. 1 shows a perspective view depicting the configuration of the appearance of an optical disk apparatus before having the function of printing a label (tray system)
Figure 2:
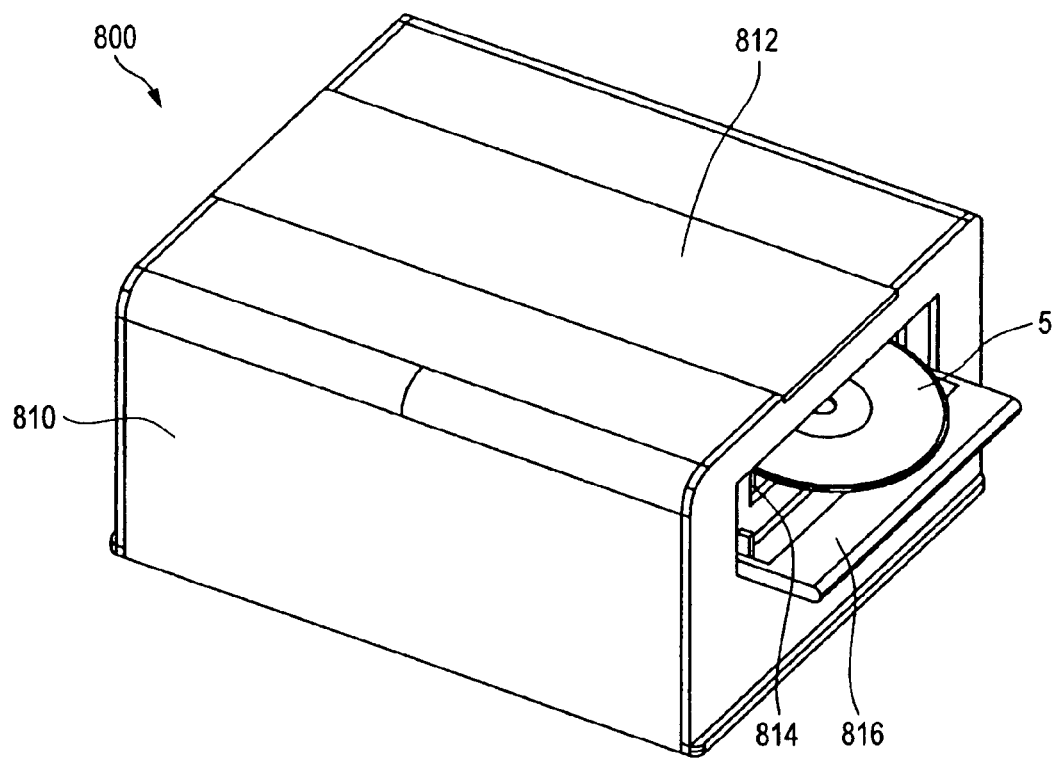
FIG. 2 shows a perspective view depicting the configuration of the appearance of an optical disk apparatus before having the function of printing a label (slot-in system)

For example, the optical disk apparatus 700 and the optical disk apparatus 800 shown in FIGS. 1 and 2 are examples of a removable optical disk apparatus which can replace media among optical disk apparatus which can record and read digital data, using an optical disk medium having a few megabytes to a few gigabytes of recording capacity such as CD (Compact Disk) and DVD (Digital Versatile Disk), an optical disk medium having a few tens of gigabyte of recording capacity such as BD (Blu-Ray Disk), HD-DVD (High Definition Digital Versatile Disk), or near field recording. Among these optical disk apparatus, some of them can print a label inside the apparatus using a disk shaped information recording medium having the data recording surface on one side and the label surface (the printing surface for information such as text and images corresponding to recorded data) on the other side (on the opposite side of the data recording surface). Both of the optical disk apparatus 700 and the optical disk apparatus 800 are also examples of the optical disk apparatus which can print labels.

First, the configuration of the appearance of the optical disk apparatus 700 and the optical disk apparatus 800 will be described with reference to FIGS. 1 and 2.

As shown in FIG. 1, in the optical disk apparatus 700 of the tray system, a housing 710 nearly in a rectangular parallelepiped is provided with a top cover 712 and a tray 720. In the case of performing maintenance of replacing a print head (see FIGS. 4 and 5), or a cap and an ink reservoir (see FIGS. 4 and 5), the top cover 712 can be removed for maintenance from the upper part of the optical disk apparatus 700 (see FIG. 26).

The tray 720 is movably disposed in the radial direction of the optical disk so as to move from the inside to the outside of the optical disk apparatus 700 by a predetermined loading mechanism (not shown). In addition, on the top surface side of the tray 720, a disk mounting part 722 is formed which is a recessed part nearly in a circular shape having almost the same diameter as that of the optical disk 5.

Here, the radial direction means the radial direction of the optical disk 5 nearly in a disk shape as shown in FIG. 3. In addition, in the specification, the virtual axis that passes through a rotational center c of the optical disk 5 in parallel with the radial direction is referred to as a radial axis (R). On the other hand, the tangential direction means the direction vertical to the radial direction on the optical disk 5. In addition, at the center part of the optical disk 5, an opening 5a is formed which is fit into the hub part (not shown) of a spindle motor (not shown) disposed inside the optical disk apparatus 700 and 800.

The optical disk 5 is placed on the disk mounting part 722, and carried into the optical disk apparatus 700 by a loading mechanism. The optical disk 5 is thus carried into the optical disk apparatus 700, it is clamped (chucked) by the spindle motor (not shown), and then a laser beam is applied onto the data recording surface of the optical disk 5 by an optical head (see FIGS. 4 and 5) such as an optical pickup mounted with a lens, whereby recorded data can be read out of the optical disk 5, or data can be read and written to the optical disk 5.

On the other hand, as shown in FIG. 2, in the optical disk apparatus 800 of the slot-in system, a housing 810 nearly in a rectangular parallelepiped is provided with a top cover 812, an opening 814 and a slot cover 816. In the case of performing maintenance of replacing a print head (not shown), or a cap and an ink reservoir (not shown), as similar to the optical disk apparatus 700, the top cover 812 can be removed for maintenance from the upper part of the optical disk apparatus 800. In addition, the optical disk 5 is loaded from the opening 814, it is carried into the optical disk apparatus 800 by a predetermined loading mechanism (not shown), it is clamped (chucked) by a spindle motor (not shown), and a laser beam is applied onto the data recording surface of the optical disk 5 by an optical head (not shown) mounted with a lens, whereby recorded data can be read out of the optical disk 5, or data can be read and written to the optical disk 5.

Both of the opening 814 and the slot cover 816 are disposed on the entrance side (the front surface side of the optical disk apparatus 800) of the optical disk 5 of the housing 810. In addition, the slot cover 816 is openably disposed which opens the opening 814 while the optical disk 5 is being loaded or ejected, whereas which closes the opening 814 while the optical disk 5 is being recorded or reproduced.

Next, the internal configuration and the operation of the optical disk apparatus 700 will be described with reference to FIGS. 4 and 5 as the apparatus is taken as an example among the optical disk apparatus before.

As shown in FIGS. 4 and 5, the optical disk apparatus 700 mainly has a drive part D7 which uses the optical disk 5 to record and reproduce data, and a label printing part L7 which is disposed on the label surface (printing surface) side on the opposite side of the data recording surface of the optical disk 5, that is, which is disposed above the drive part D7 and prints a label.

The drive part D7 is disposed in the area surrounded by a front panel 714, a rear panel 716, two side panels 718 and 718 which configure the housing 710 together with the top cover 712 (see FIGS. 1 and 2), mainly having the tray 720 which is disposed movably by a predetermined loading mechanism, a chucking plate 730 which is disposed above the center part of the disk mounting part 722 of the tray 720, and an optical pickup 740 as an information recording unit which is disposed under the tray 720 (on the data recording surface side of the optical disk 5).

In the tray 720, the optical disk 5 is placed on the disk mounting part 722 which is the recessed part nearly in a circular shape disposed on the top surface side, and the optical disk 5 is loaded into the optical disk apparatus 700 or ejected to outside. The tray 720 is movably disposed to and fro in parallel with the radial direction of the optical disk 5, which ejects the optical disk 5 from the front surface side of the optical disk apparatus 700 (on the front panel 714 side) to outside, and on which the disk is replaced on the front surface side.

The chucking plate 730 is a member that has a shaft at the center part, which is mounted on a chucking plate supporting plate 732 nearly in a rectangular plate through a bearing (not shown), and is supported from above by the chucking plate supporting plate 732. The chucking plate 730 catches the optical disk 5 together with the hub part of a spindle motor (not shown) which is disposed on the under surface side (the data recording surface side) of the optical disk 5 and rotates the optical disk 5, and the chucking plate is rotated together with the optical disk 5. In addition, the both ends of the chucking plate supporting plate 732 in the longitudinal direction are mounted on the top surface of the side panel 718, and the chucking plate supporting plate 732 supports the chucking plate 730 at the center part thereof.

The optical pickup 740 is movably disposed under the tray 720, that is, on the recording surface side of the optical disk 5 in the radial direction. In addition, the optical pickup 740 has a lens 742 which applies a laser beam onto the recording surface of the optical disk 5, in which the lens 742 collects a laser beam and applies the laser beam onto the recording surface of the optical disk 5, whereby data can be recorded and reproduced.

In the drive part D7 of the optical disk apparatus 700 having this configuration, the optical disk 5 is placed on the disk mounting part 722 of the tray 720, the tray 720 is moved into the apparatus to retract the optical disk 5 inside the apparatus, the optical disk is caught and clamped between the hub part of the spindle motor (not shown) and the chucking plate 730, and then the optical disk 5 is rotated. In the state in which the optical disk 5 is being rotated, the optical pickup 740 approaches to read and write data so that it directs and collects the laser beam onto the data recording surface of the optical disk 5 while the optical pickup is moving in the radial direction.

In addition, the other configurations of the drive part D7 are similar to those of known optical disk apparatus, omitting the detailed descriptions.

The label printing part L7 mainly has a print head 750, a print head drive mechanism which moves the print head 750 in the radial direction, and a print head maintenance unit which caps and cleans the print head 750.

The print head 750 is disposed on the opposite side of the front surface side of the optical disk apparatus 700 (the front panel 714 side) with respect to the center of the optical disk 5 (or the chucking plate 730), and is disposed on the opposite side (the label surface side of the optical disk 5) of the optical pickup 740 with respect to the optical disk 5, which is configured to be movable along the radial axis R (that is, the radial direction of the optical disk 5). In addition, on the under surface side of the print head 750 (the label surface side of the optical disk 5), an ink discharge part 750a is disposed in which ink is discharged from the ink discharge part 750a while the print head 750 is moving toward the outer radius or the inner radius of the optical disk 5 rotating on the radial axis, whereby a label can be printed on the label surface of the optical disk 5.

The print head 750 is held from three sides by a print head holder 752 nearly in a U-shape, and mounted on a head supporting plate 754. On the top surface side of the head supporting plate 754, head drive bearing members 756 are disposed two each on the right and left sides of the print head 750. On each of the head drive bearing members 756, a bearing (linear bearing) 756a is disposed which penetrates through in the direction in parallel with the radial direction. In addition, two head drive shafts 757 are disposed almost in parallel with each other so as to penetrate through the inner radius of two bearings 756a arranged in the radial direction (in parallel with the radial direction). The both ends of two head drive shafts 757 (the end part on the front panel 714 side and the end part on the rear panel 716) are supported by identical shaft support members 758.

The print head drive mechanism is mainly configured of a head drive motor 760, a ball screw 762 which is joined to the head drive motor 760, a bearing 764 through which the ball screw 762 is inserted, a joining member 766 which joins the bearing 764 to the head support member 754, and a drive mechanism support member 768 which supports the head drive motor 760 and the ball screw 762.

The head drive motor 760 rotates the ball screw 762 with the power. The ball screw 762 is extended in the direction in parallel with the radial direction, and the bearing 764 is configured to be movable in the direction in parallel with the radial direction by the rotation of the ball screw 762. The joining member 766 joins the bearing 764 to the head support member 754 to move the head support member 754 in the direction in parallel with the radial direction in association with the movement of the bearing 764. The drive mechanism support member 768 supports the joining part of the head drive motor 760 to the ball screw 762 and the tip end part of the ball screw 762.

In addition, the shaft support member 758 and the drive mechanism support member 768 are mounted on a plate shaped support member disposed on the upper part, not shown.

The print head maintenance unit has a cap accommodating part 770 which accommodates a cap 772 and an ink reservoir 774. The cap 772 is used not to dry the print head, and the ink discharge part 750a of the print head 750 is capped by the cap 772 during the standby for printing. In addition, for example, in order to prevent such a print error that the ink discharge part 750a is clogged and ink is not discharged, the ink reservoir 774 is a place at which ink is discharged on purpose so that air does not enter the print head 750 (ink is discharged from the ink discharge part 750a without printing a label). The cap accommodating part 770 in which the cap 772 and the ink reservoir 774 are accommodated is disposed on the rear side (the rear panel 716 side) of the optical disk apparatus 700 on the opposite side of the eject side (the eject port side) of the optical disk 5.

In the label printing part L7 of the optical disk apparatus 700 having this configuration, when the head drive motor 760 is rotated to turn the ball screw 762, the bearing 764 is moved along the ball screw 762 in the direction in parallel with the radial direction. Since the bearing 764 is joined to the head supporting plate 754 through the joining member 766, the head supporting plate 754 is moved in the radial direction in association with the movement of the bearing 764. At this time, since the head drive shaft 757 is inserted into the head drive bearing member 756 disposed on the head supporting plate 754 through the bearing 756a, the head supporting plate 754 is guided by two head drive shafts 757 disposed in parallel with each other in the radial direction, and can be linearly moved in the direction in parallel with the radial direction.

Here, since the print head 750 is disposed so that the center thereof comes to the radial axis R, it can be freely moved on the radial axis in the inner radial direction and the outer radial direction of the optical disk in association with the movement of the head supporting plate 754, that is, the movement of the bearing 764.

As described above, in the optical disk apparatus 700 before, the print head 750 is configured to move on the radial axis R.

Figure 6:
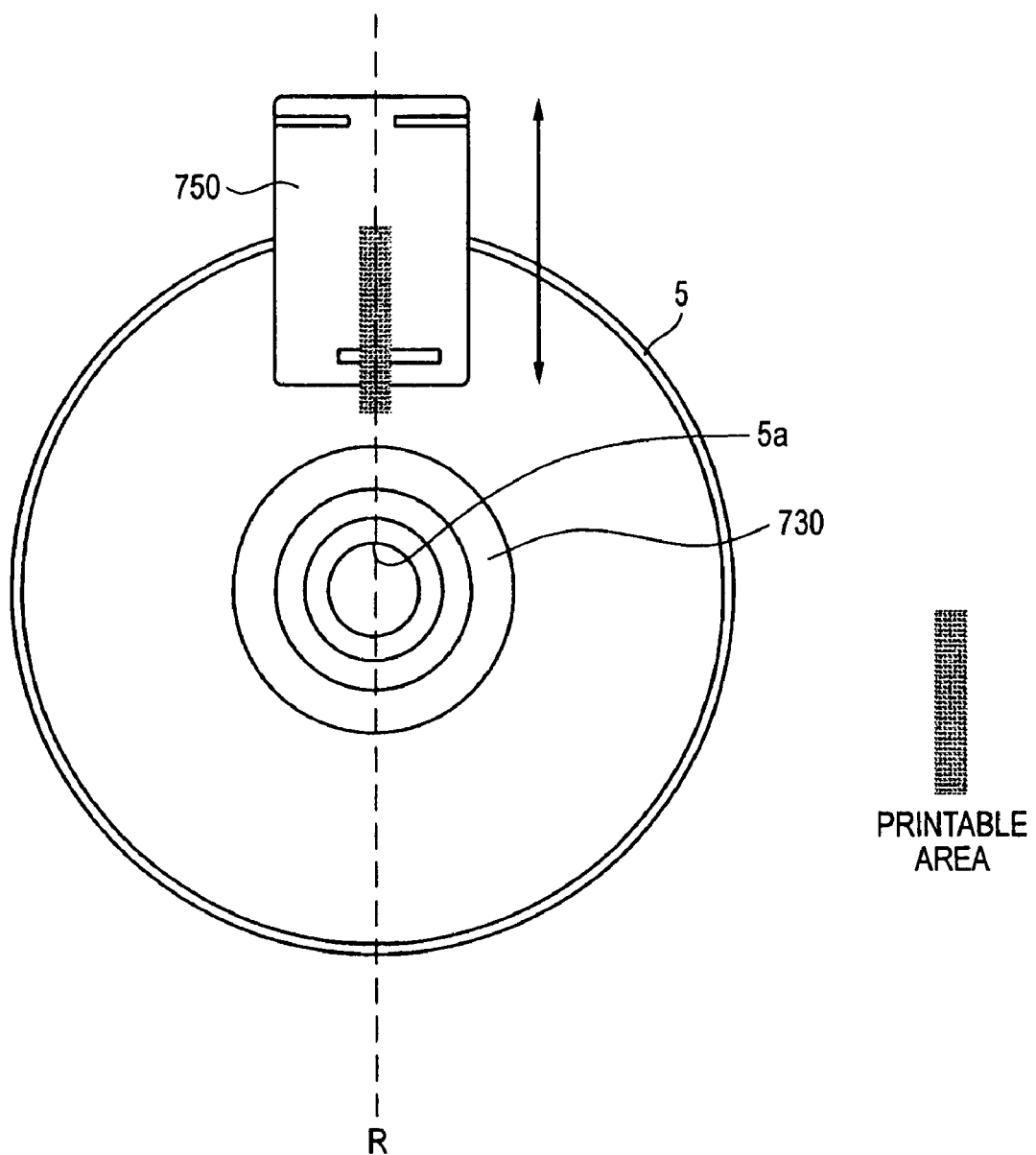
FIG. 6 shows an illustration depicting the printable area of the optical disk apparatus before having the function of printing a label.

However, since the chucking plate 730 is disposed at the center part of the optical disk 5, the print head 750 is moved on the radial axis R to come into contact with the chucking plate 730. Then, in order to avoid such a contact, it is difficult to move the print head 750 to near the inner radius of the optical disk 5 (around the opening 5a), which causes a problem that as shown in FIG. 6, in the optical disk apparatus 700 before, the printable area becomes narrow and it is difficult to print a label near the inner radius of the optical disk 5. In other words, when the optical disk apparatus 700 before is used to print a label, it is difficult to move the print head 750 to near the inner radius of the optical disk 5, and then as shown in an exemplary print in FIG. 7, it is difficult to print well in an area W near the inner radius of the optical disk 5 (around the opening 5a). In addition, for making a print on the label surface of the optical disk 5, original information desired to print is converted into the polar coordinates for print.

Figure 7:
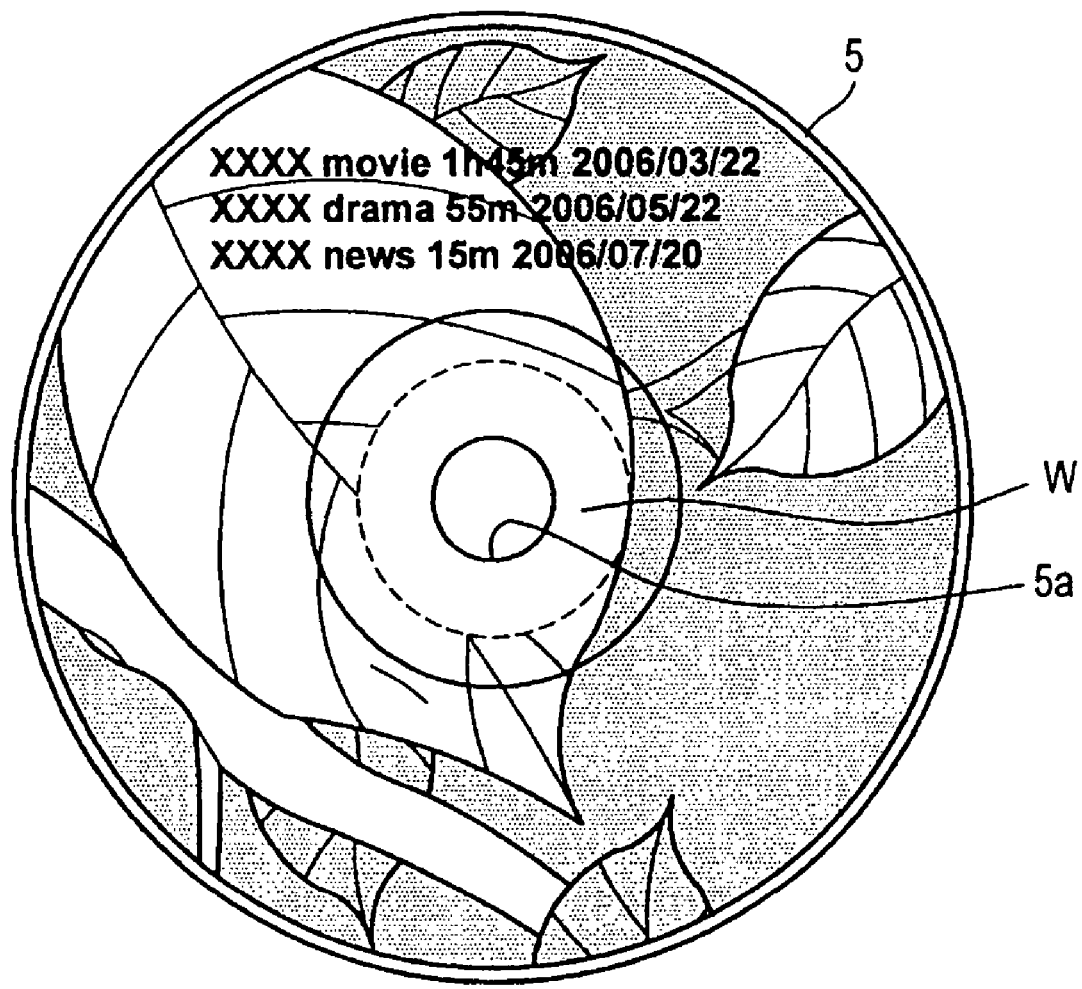
FIG. 7 shows an illustration depicting an exemplary print in the case of using the optical disk apparatus before having the function of printing a label.

In addition, for example, as shown in an exemplary print in FIG. 7, in the case in which it is desired to make a print solidly throughout the surface of the optical disk 5, a problem arises that it takes time for printing because the printable area is narrow as described above.

On the other hand, in order to avoid these problems, when the print head drive mechanism is disposed so as to move the print head 750 in the direction vertical to the radial direction of the optical disk 5 (the movable direction of the tray 720 to carry the optical disk 5), the overall breadth of the optical disk apparatus 700 is increased because the print head drive mechanism such as the head drive motor 760 is larger than the width of the optical disk 5, causing a problem that the apparatus is increased in size.

Then, in optical disk apparatus 100, 200, 300, 400, 500 and 600 according to first to sixth embodiments of an embodiment of the invention, the movable area of the print head is placed at the position shifted from the radial axis R for the purposes that information corresponding to data recorded on the optical disk 5 is easily printed on the label surface of the optical disk 5 for simple management of optical disk media as well as a print is easily made near the inner radius of the optical disk 5, in addition to these, a print can be made at high speed even in the case of making a print throughout the surface, or the maintenance of the apparatus is maintained easily. Hereinafter, the optical disk apparatus 100, 200, 300, 400, 500 and 600 according to the first to sixth embodiments of an embodiment of the invention will be described in detail.

Figure 8:
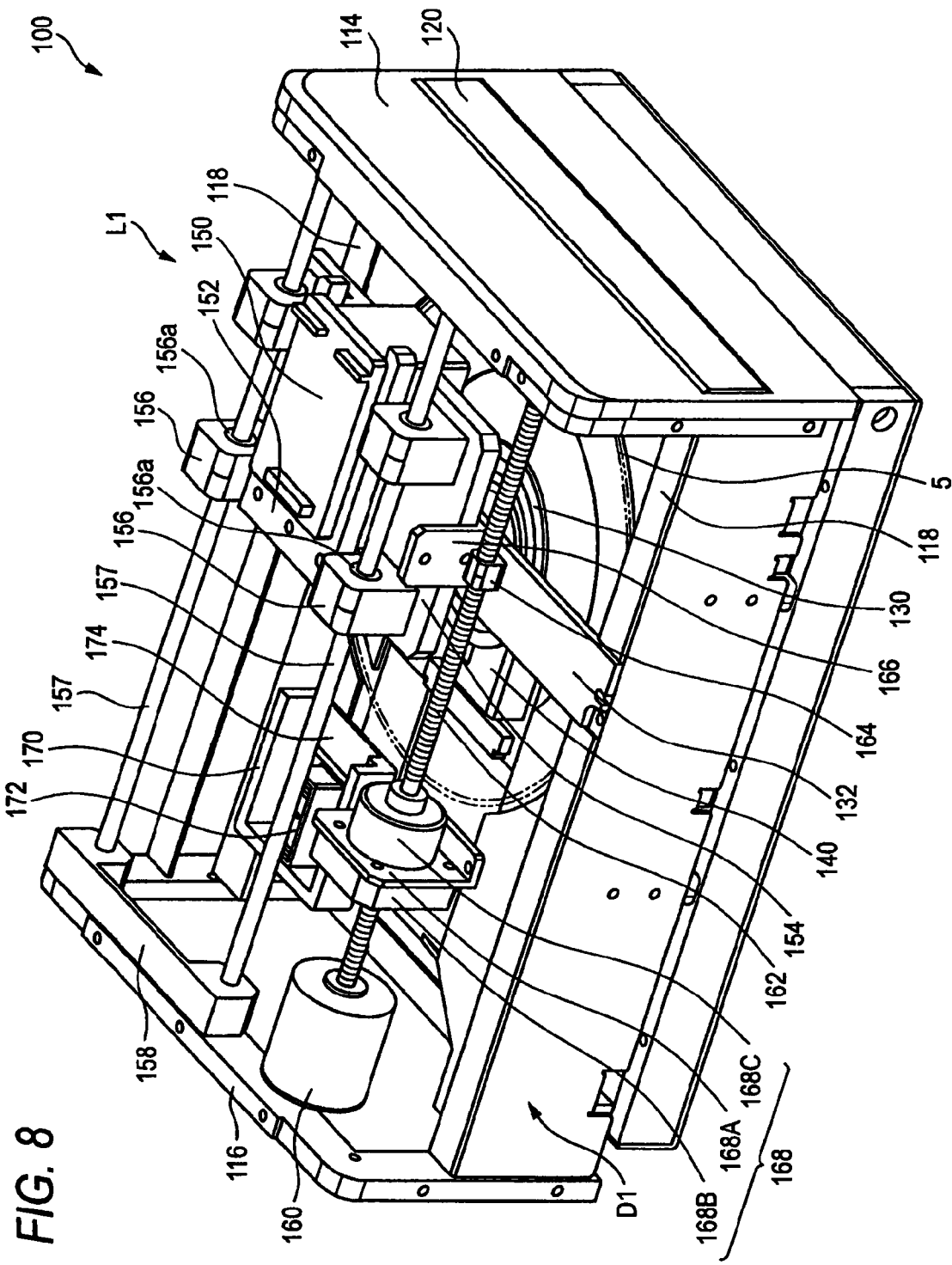
FIG. 8 shows a perspective view depicting the internal configuration of an optical disk apparatus according to a first embodiment of an embodiment of the invention.
Figure 9:
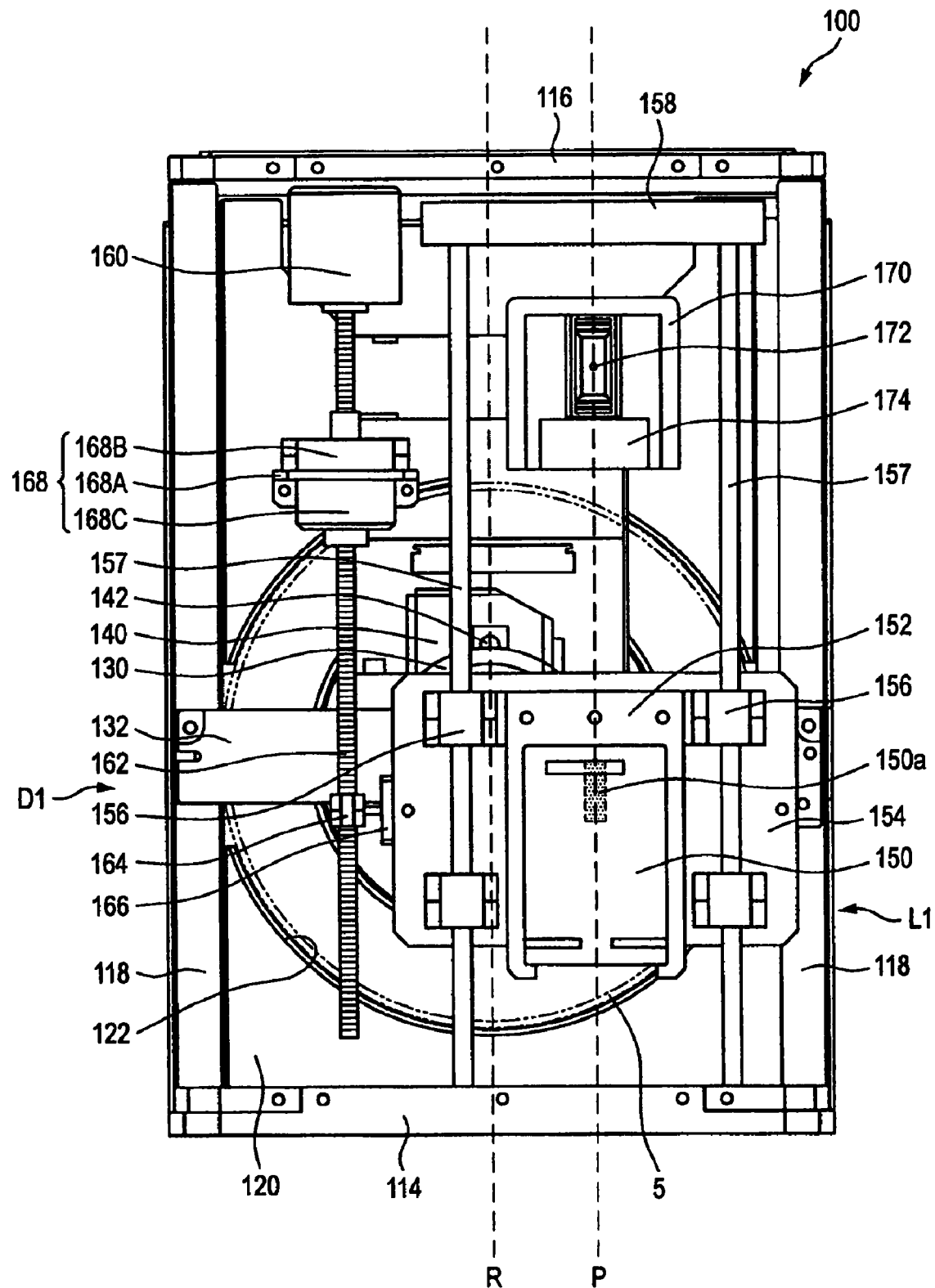
FIG. 9 shows a plan view depicting the internal configuration of the optical disk apparatus according to the same embodiment.

The Configuration and Operation of an Optical Disk Apparatus 100 According to a First Embodiment First, the configuration of the optical disk apparatus 100 according to the first embodiment of an embodiment of the invention as an exemplary information recording apparatus will be described with reference to FIGS. 8 and 9. In addition, FIG. 8 shows a perspective view depicting the internal configuration of the optical disk apparatus 100 according to the first embodiment of an embodiment of the invention, and FIG. 9 shows a plan view depicting the internal configuration of the optical disk apparatus 100 according to the first embodiment of an embodiment of the invention.

The optical disk apparatus 100 according to the embodiment is an apparatus in which an optical disk 5 as an information recording medium is loaded to print a label on the label surface of the loaded optical disk 5, and the apparatus mainly has a drive part D1 which uses the optical disk 5 to record and reproduce data, and a label printing part L1 which is disposed on the label surface (the printing surface) side on the opposite side of the data recording surface of the optical disk 5, that is, above the drive part D1 and prints a label.

The drive part D1 is placed in the area surrounded by a front panel 114, a rear panel 116, and two side panels 118 and 118, and mainly has a tray 120 which is movably disposed by a predetermined loading mechanism, a chucking plate 130 which is disposed above the center part of a disk mounting part 122 of the tray 120, and an optical pickup 140 as an information recording unit disposed below the tray 120 (on the data recording surface side of the optical disk 5 which is loaded into the optical disk apparatus 100).

The tray 120 is movably disposed in the radial direction of the optical disk 5 so as to move from inside to outside the optical disk apparatus 100 by a predetermined loading mechanism (not shown). In addition, on the top surface side of the tray 120, a disk mounting part 122 is formed that is a recessed part nearly in a circular shape having almost the same diameter as that of the optical disk 5. With this configuration, the tray 120 is moved to the outer radial side or the inner radial side in the radial direction in the state in which the optical disk 5 is placed on the disk mounting part 122, whereby the optical disk 5 can be loaded into the optical disk apparatus 100, or the optical disk 5 can be ejected from the front side (the front panel 114 side) of the optical disk apparatus 100 to outside.

The chucking plate 130 is a disk-shaped member that has a shaft at the center part, which is mounted on a chucking plate supporting plate 132 nearly in a rectangular plate through a bearing (not shown), and is supported from above by the chucking plate supporting plate 132. In addition, the chucking plate 130 catches the optical disk 5 together with the hub part of a spindle motor (not shown) which is disposed on the under surface side (the data recording surface side) of the optical disk 5 and rotates the optical disk 5, and the chucking plate is rotated together with the optical disk 5. On the other hand, one end of the chucking plate supporting plate 132 in the longitudinal direction is mounted on the top surface of the side panel 118, and the other end of the chucking plate supporting plate 132 supports the chucking plate 130.

At this time, the chucking plate supporting plate 132 may support the chucking plate 130 as cantilevered, or the other end may be joined to the side panel 118 by another member. Here, the configuration of the chucking plate supporting plate 132 will be described with reference to FIGS. 10 and 11. In addition, FIGS. 10 and 11 show a perspective view illustrative of an exemplary configuration of the chucking plate supporting plate 132 according to the embodiment.

Figure 10:
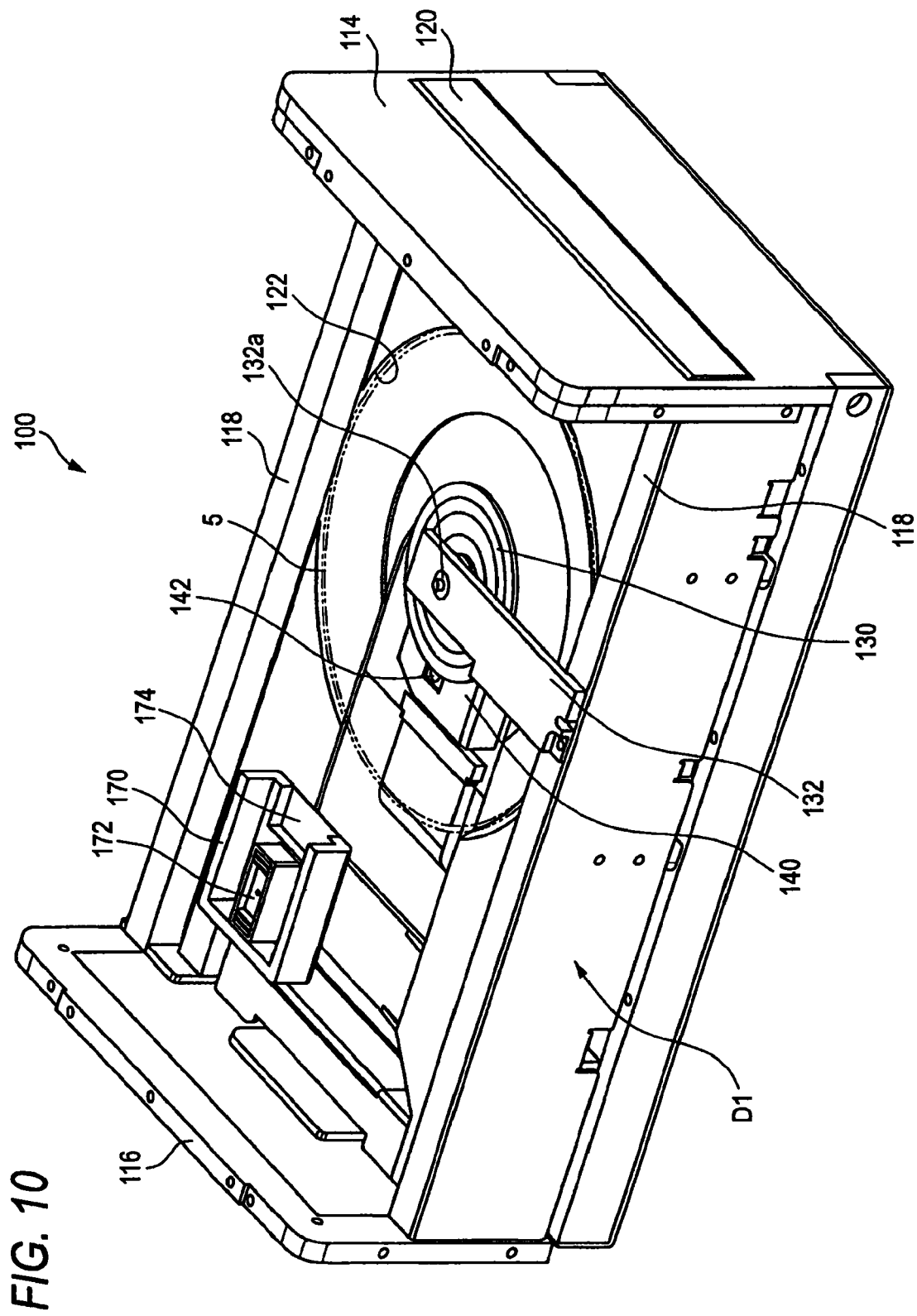
FIG. 10 shows a perspective view illustrative of an exemplary configuration of a chucking plate supporting plate according to the same embodiment.

First, as shown in FIG. 10, in the case in which the chucking plate supporting plate 132 supports the chucking plate 130 as cantilevered, the length of the chucking plate supporting plate 132 in the longitudinal direction is almost equal to the length from the side panel 118 to the rotational center of the optical disk 5, in which one end is mounted on the side panel 118 and the other end is mounted on the chucking plate 130 through a bearing 132a. Since a print head 150 according to the embodiment is moved at the position shifted from the rotational center of the optical disk 5, when the chucking plate supporting plate 132 is disposed so as to cross the inside of the optical disk apparatus 100, it hampers the print head 150 from moving. However, as described above, since the chucking plate supporting plate 132 exists up to the rotational center of the optical disk 5, the print head 150 can be moved over the optical disk 5 at the position shifted from the rotational center of the optical disk 5 in parallel with the radial direction without coming into contact with the chucking plate supporting plate 132.

However, as described above, in the state in which the chucking plate supporting plate 132 is cantilevered, the support is more unstable than the case in which both end parts of the chucking plate supporting plate are fixed and the chucking plate is supported at the center part as before. Therefore, as shown in FIG. 11, a bridge member 134 is disposed which bridges the chucking plate supporting plate 132 and the side panel 118 so as to avoid the area in which the print head 150 is moved (so as to join them above the moving path of the print head), whereby the support for the chucking plate 130 by the chucking plate supporting plate 132 can be made more stable and reliable. In addition, at this time, the chucking plate supporting plate 132 is joined to the bridge member 134 with a joining part 136, and the other end of the bridge member 134 is mounted on the side panel 118.

The optical pickup 140 is movably disposed under the tray 120, that is, on the recording surface side of the optical disk 5 in the radial direction. In addition, the optical pickup 140 has a lens 142 which applies a laser beam onto the recording surface of the optical disk, in which the lens 142 collects a laser beam and applies the laser beam onto the recording surface of the optical disk 5, whereby data can be recorded and reproduced.

In the drive part D1 of the optical disk apparatus 100 having this configuration, the optical disk 5 is placed on the disk mounting part 122 of the tray 120, the tray 120 is moved into the apparatus to retract the optical disk 5 inside the apparatus, the optical disk 5 is caught and clamped between the hub part of a spindle motor (not shown) and the chucking plate 130, and then the optical disk 5 is rotated. In the state in which the optical disk 5 is rotated, the optical pickup 140 comes close to the data recording surface of the optical disk 5 so as to collect and direct a laser beam there onto while the optical pickup is moving in the radial direction, and then data is read and written.

In addition, the other configurations of the drive part D1 are the same as those of the known optical disk apparatus, omitting the detailed descriptions.

The label printing part L1 according to the embodiment mainly has the print head 150, a print head moving unit which moves the print head 150 in parallel with the radial direction of the optical disk 5 at the position shifted from the rotational center of the optical disk 5, and a print head maintenance unit which caps and cleans the print head 150.

The print head 150 is disposed on the opposite side of the optical pickup 140 and the optical disk 5 (the label surface side of the optical disk 5), which is configured to move in parallel with the radial direction (the P-axis in FIG. 9) at the position shifted (offset) from a radial axis R. In addition, on the under surface side of the print head 150 (the label surface side of the optical disk 5), an ink discharge part 150a is disposed, in which ink is discharged from the ink discharge part 150a onto the rotating optical disk 5 while the print head 150 is moving on the P-axis in parallel with the radial direction shifted (offset) from the radial axis R, whereby a label can be printed on the label surface of the optical disk 5.

Although not shown in the drawing, for example, the ink discharge part 150a is formed of a plurality of nozzles (for example, 300 to 400 nozzles at a pitch of about 40 □m) arranged in the direction in parallel with the radial direction of the optical disk 5. The nozzles arranged in the direction in parallel with the radial direction may be arranged in a line, or may be arranged in a plurality of lines (for example, in two lines). In this case, the nozzles are arranged two dimensionally on the plane in parallel with the plane of the optical disk 5.

In addition, the print head 150 is held from three sides by a print head holder 152 nearly in a U-shape, and is mounted on a head supporting plate 154. On the top surface side of the head supporting plate 154, head drive bearing members 156 are disposed two each on the right and left sides of the print head 150. On each of the head drive bearing members 156, a bearing (linear bearing) 156*a* is disposed which penetrates in the direction in parallel with the radial direction. In addition, two head drive shafts 157 are disposed almost in parallel with each other (in parallel with the radial direction) so as to penetrate through the inner radius of two bearings 156*a* arranged in the radial direction. One ends of the two head drive shafts 157 (the end part on the front panel 114 side) are joined to the front panel 114 on the inner surface side of the apparatus, and the other ends of the two head drive shafts 157 (the end part on the rear panel 116 side) are supported by a same shaft support member 158 which is mounted on the rear panel 116.

The print head moving unit is mainly configured of a head drive motor 160, a ball screw 162 which is joined to the head drive motor 160, a ball screw nut 164 through which the ball screw 162 is inserted, a joining member 166 which joins the ball screw nut 164 to the head support member 154, and a ball screw support member 168 which is disposed in the midway part of the ball screw 164.

The head drive motor 160 rotates the ball screw 162 with its power. The ball screw 162 is extended in the direction in parallel with the radial direction, and the ball screw nut 164 is configured to move in the direction in parallel with the radial direction by the rotation of the ball screw 162. The joining member 166 joins the ball screw nut 164 to the head support member 154 to move the head support member 154 in the direction in parallel with the radial direction at the position shifted (offset) from the rotational center of the optical disk 5 in association with the movement of the ball screw nut 164.

The ball screw support member 168 is a member which supports the ball screw 162, formed of a ball screw supporting plate 168A, and ball screw support units 168B and 168C in which a bearing (not shown) is incorporated. In the embodiment, the ball screw support units 168B and 168C are configured in one piece. After the ball screw 162 is fit into the ball screw support units 168B and 168C through the bearing, it is clamped by a nut, not shown.

In addition, in the optical disk apparatus 100 according to the embodiment, for example, the movement of the print head 150 in the radial direction can be controlled by a limit sensor (not shown). Here, the limit sensor is a member that controls the print area, and preferably, it is disposed at the position at which the ink discharge part 150*a* of the print head 150 can at least reach the rim part of the optical disk 5 on the rear surface side. The limit sensor is placed at the position like this, whereby the printable area can be widened when the print head 150 makes a print on the label surface of the optical disk 5, and a print can be easily made near the inner radius of the optical disk 5.

The print head maintenance unit has a cap accommodating part 170 which accommodates a cap 172 and an ink reservoir 174. The cap 172 is used not to dry the print head, and the ink discharge part 150*a* of the print head 150 is capped by the cap 172 during the standby for printing. In addition, for example, in order to prevent such a print error that the ink discharge part 150*a* is clogged and ink is not discharged, the ink reservoir 174 is a place at which ink is discharged on purpose so that air does not enter the print head 150 (ink is discharged from the ink discharge part 150*a* without printing a label). The cap accommodating part 170 in which the cap 172 and the ink reservoir 174 are accommodated is disposed on the rear side (the rear panel 116 side) of the optical disk apparatus 100 on the opposite side of the eject side (the eject port side) of the optical disk 5.

Here, again with reference to FIGS. 10 and 11, as different from the manner before, since the print head 150 does not exist on the radial axis, the cap accommodating part 170 including the cap 172 and the ink reservoir 174 is also disposed at the position shifted (offset) from the radial axis. Therefore, even though the optical pickup 140 is moved to the rear surface side of the apparatus along the radial axis, it does not come into contact with the cap accommodating part 170 and the optical pickup 140. Thus, the cap accommodating part 170 can be placed at the position closer to the front surface side of the apparatus than before, and the length of the optical disk apparatus 100 in the radial direction can be reduced. In other words, the optical disk apparatus 100 can be reduced in size.

In the label printing part L1 of the optical disk apparatus 100 having this configuration, when the head drive motor 160 is rotated to turn the ball screw 162, the ball screw nut 164 is moved in the radial direction along the ball screw 162. Since the ball screw nut 164 is joined to the head supporting plate 154 through the joining member 166, the head supporting plate 154 is moved in the radial direction at the position shifted from the rotational center of the optical disk 5 in association with the movement of the ball screw nut 164. At this time, since the head drive shaft 157 is inserted into the head drive bearing member 156 disposed on the head supporting plate 154 through the bearing 156*a*, the head supporting plate 754 is guided by two head drive shafts 157 disposed in parallel with each other in the radial direction, and can be linearly moved in the direction in parallel with the radial direction at the position shifted from the rotational center of the optical disk 5. In addition, as different from the manner before, since the print head 150 is arranged so that the center thereof comes at the position offset from the radial axis R, it can be freely moved toward the inner radius and the outer radius of the optical disk 5 in the direction in parallel with the radial direction at the position offset from the radial axis R in association with the movement of the head supporting plate 154, that is, in association with the movement of the ball screw nut 164.

In addition, preferably, between two areas that are obtained by splitting the area including the optical disk 5 along the direction of moving the optical pickup 140 (that is, in the embodiment, the radial axis R), the print head 150 is placed in the area positioned more on the downstream side than the optical pickup 140 with respect to the direction of rotating the optical disk 5. Therefore, in the embodiment, suppose the optical disk 5 is rotating clockwise in FIG. 8 or FIG. 9, preferably, the print head 150 is placed on the right area of the areas obtained by splitting at the radial axis R.

This is because ink discharged from the print head 150 for floating is toward the outside of the optical disk 5 due to the flow generated in association with the rotation of the optical disk 5, but when the print head 150 is placed at the position offset more on the upstream side than the optical pickup 140 (on the left side of the radial axis R in FIGS. 8 and 9), the floating ink tends to be deposited on the optical pickup 140 side to smear the optical pickup 140. On the other hand, when the print head 150 is placed at the position offset more on the downstream side than the optical pickup 140 (on the right side of the radial axis R in FIGS. 8 and 9), ink flows in the direction toward the side panel 118. Thus, for example, an ink absorber is provided on the side panel 118 to facilitate preventing the optical pickup 140 from being smeared and retrieving the floating ink (mist).

Figure 13:
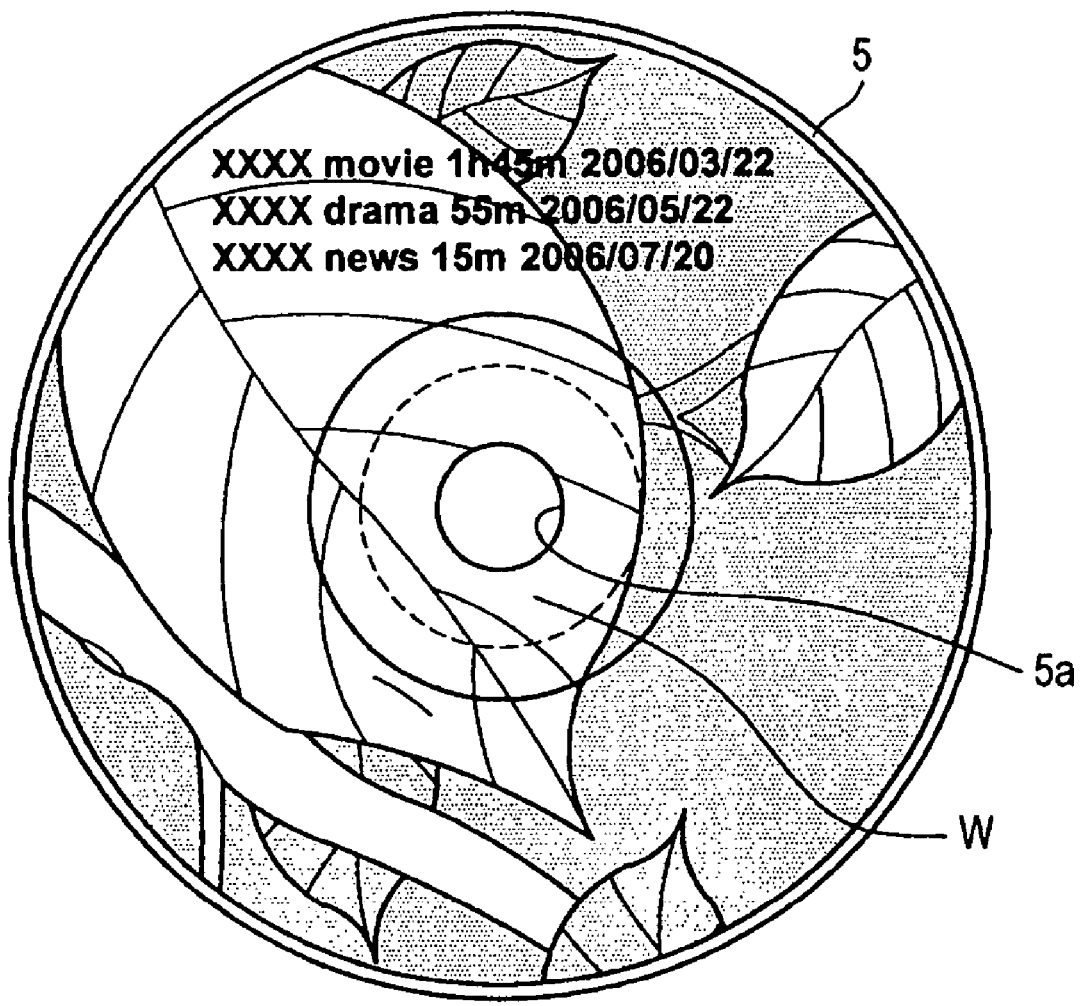
FIG. 13 shows an illustration depicting an exemplary print in the case of using the optical disk apparatus according to the first embodiment of an embodiment of the invention.

Here, the operation and advantages of the optical disk apparatus 100 according to the embodiment will be described with reference to FIGS. 12A, 12B and 13. In addition, FIGS. 12A and 12B show an illustration depicting the comparison of the printable area in the case of using the optical disk apparatus 700 before with the printable area in the case of using the optical disk apparatus 100 according to the embodiment; FIG. 12A shows the case of using the optical disk apparatus 700 before, and FIG. 12B shows the case of using the optical disk apparatus 100 according to the embodiment. In addition, FIG. 13 shows an illustration depicting an exemplary print in the case of using the optical disk apparatus 100 according to the embodiment.

As shown in FIG. 12A, in the optical disk apparatus 700 before, since the print head 750 is moved on the radial axis R, it is difficult to move to near the inner radius of the optical disk 5 in order to avoid coming into contact with the member such as the chucking plate 730, and it is difficult to make a print near the inner radius of the optical disk 5 as described above (see FIG. 6). However, as shown in FIG. 12B, in the optical disk apparatus 100 according to the embodiment, as different from the manner before, the print head 150 is disposed so that it passes through the rotational center of the optical disk 5, and the center thereof comes to the position shifted (offset) from the radial axis R in parallel with the radial direction of the optical disk 5, and thus the print head can be moved at the offset position. Therefore, since the print head 150 does not come into contact with the member such as the chucking plate 130, the printable area is more widened than before. Accordingly, in accordance with the optical disk apparatus 100 according to the embodiment, a print can be made easily near the inner radius of the optical disk 5 (the area W around the opening 5a). For example, as shown in FIG. 13, even though a print is made throughout the label surface of the optical disk 5, as different from the case of using the optical disk apparatus 700 before shown in FIG. 6, in accordance with the optical disk apparatus 100 according to the embodiment, patterns can be printed in the area W near the inner radius of the optical disk 5 as well. In addition, in accordance with the optical disk apparatus 100 according to the embodiment, since the print area is widened as described above, even though a print is made throughout the label surface of the optical disk 5, a print time can be reduced significantly, and a print can be made at high speed.

In addition, in the optical disk apparatus 100 according to the embodiment, a label may be printed by using the eject operation of the optical disk 5 by means of the tray 120 as a loading unit which loads or ejects the optical disk 5 out of the optical disk apparatus 100. For example, as shown in FIG. 14, in the case in which only text information about the descriptions of recorded data is printed on the optical disk 5, ink is discharged so that the print head 150 is controlled to print text information in the eject operation in which the optical disk 5 is ejected out of the front surface side of the optical disk apparatus 100 (in FIG. 14, the direction of ejecting the optical disk 5 is denoted by E), the printed result shown in FIG. 14 can be obtained easily.

In other words, in the embodiment, since the print head 150 is placed at the position offset from the center of the optical disk 5, the tray 120 moves the optical disk 5 in the outer radial direction thereof in order to eject the optical disk 5 out of the optical disk apparatus 100, whereby the print head 150 can be moved relatively to the optical disk 5. Therefore, for information of text or images that can be printed in passing the print head 150 over the optical disk 5 at one time or a plurality of times, the eject operation of the optical disk 5 can be used to print a label. In addition, although it is irrelevant whether to operate the print head 150 in the eject operation of the optical disk 5, when the print head 150 is moved in the direction opposite to the direction of ejecting the optical disk 5, a print can be made at higher speed than the case in which the print head 150 is not operated.

Figure 14:
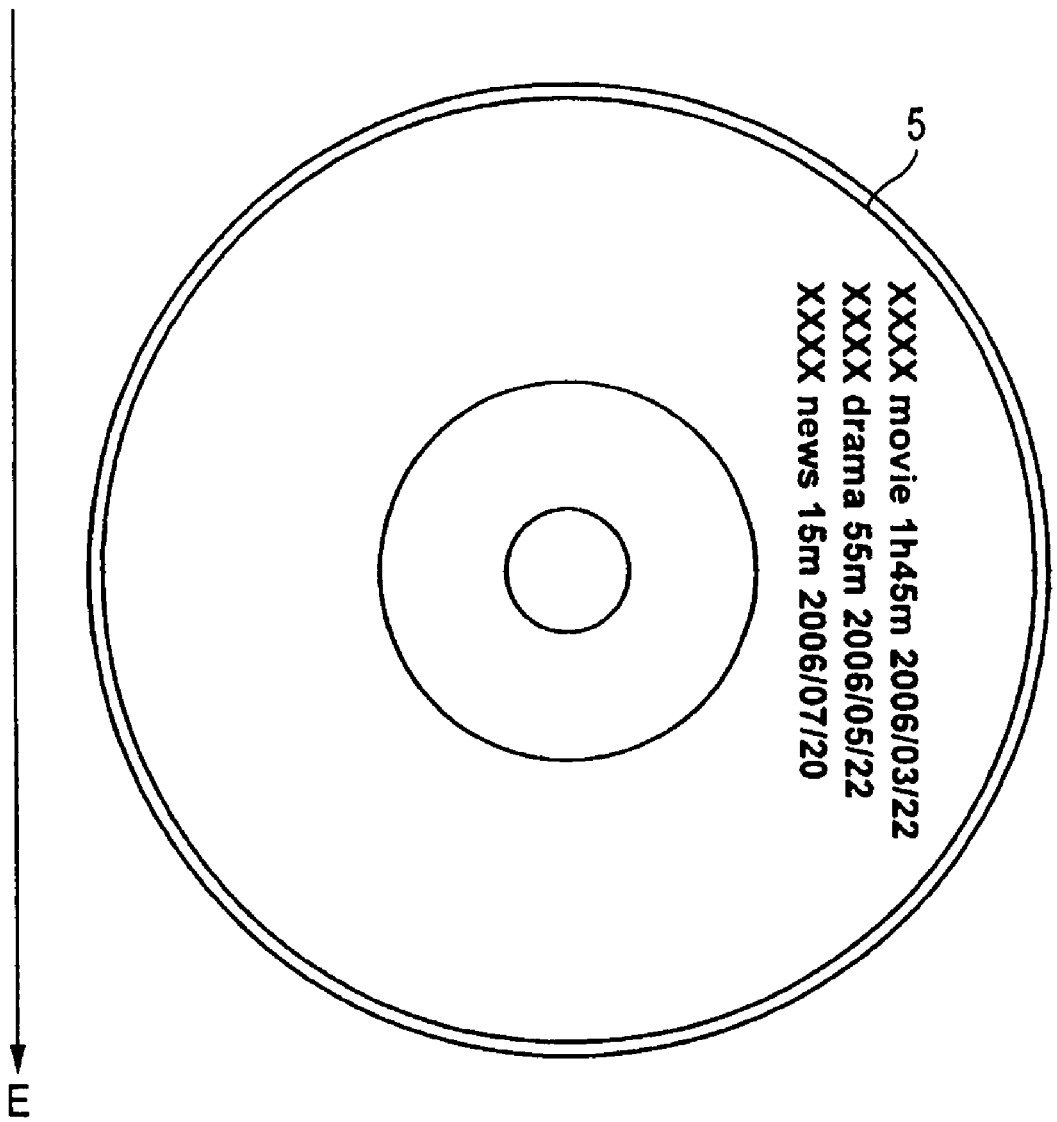
FIG. 14 shows an illustration depicting an exemplary printed result in the case in which the eject operation of an optical disk in the same embodiment is used to print a label.

In addition, in an exemplary print shown in FIG. 14, as the print head 150, such a print head is used that a plurality of nozzles is arranged in the direction in parallel with the radial direction of the optical disk 5 (for example, 300 to 400 nozzles are arranged at a pitch of about 40 □m in a single line or two lines), in which the print head 150 is moved over the optical disk 5 for one time or a plurality of times to print a label to obtain that exemplary print.

The operation and advantages of the optical disk apparatus 100 according to the first embodiment described above are the same as those of the optical disk apparatus 200, 300, 400, 500 and 600 according to the second to sixth embodiments, described later.

Next, an exemplary configuration of the print head of the ink jet system for use in printing a label will be described with reference to FIGS. 15a and 15B. In addition, FIG. 15A shows a perspective view depicting the schematic configuration of the print head 150 according to the first embodiment of an embodiment of the invention, and FIG. 15B shows a perspective view depicting the schematic configuration of a print head 250 according to the second embodiment of an embodiment of the invention, described later.

Figure 15A:
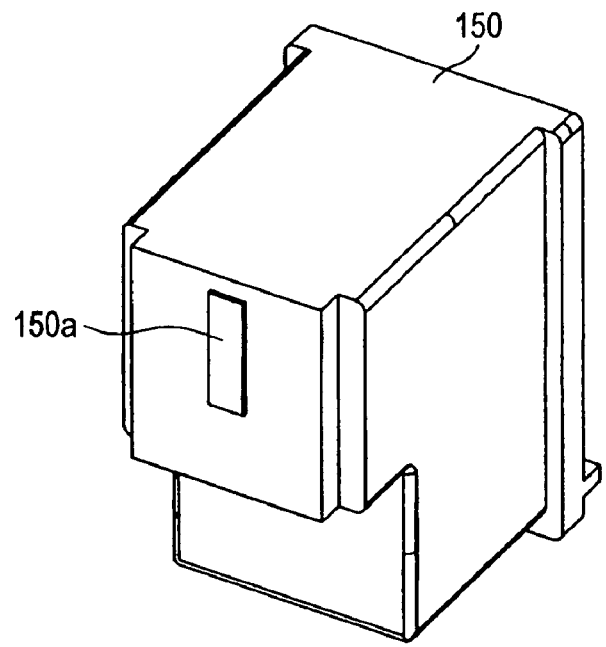
FIG. 15A shows a perspective view depicting the schematic configuration of a print head according to the first embodiment of an embodiment of the invention.
Figure 15B:
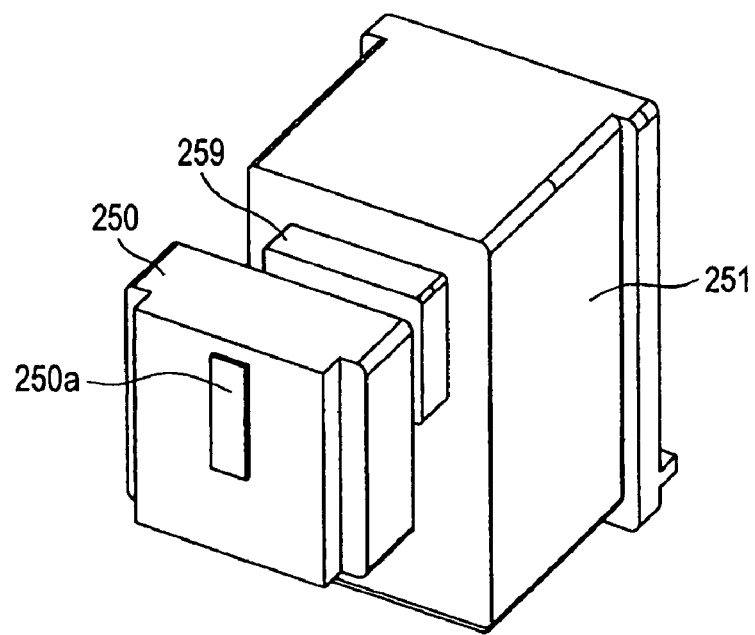
FIG. 15B shows a perspective view depicting the schematic configuration of a print head according to a second embodiment of an embodiment of the invention.

As shown in FIG. 15A, the print head 150 according to the first embodiment of an embodiment of the invention is an example in which the print head 150 having the ink discharge part 150a is formed in one piece with the ink tank part. On the other hand, as shown in FIG. 15B, the print head 250 according to the second embodiment of an embodiment of the invention is an example in which a print head 250 having an ink discharge part 250a is joined to an ink tank part 251 as separatable through a joining part 259. In addition, in both cases, the part that receives signals to control ink and discharge is omitted.

Figure 16:
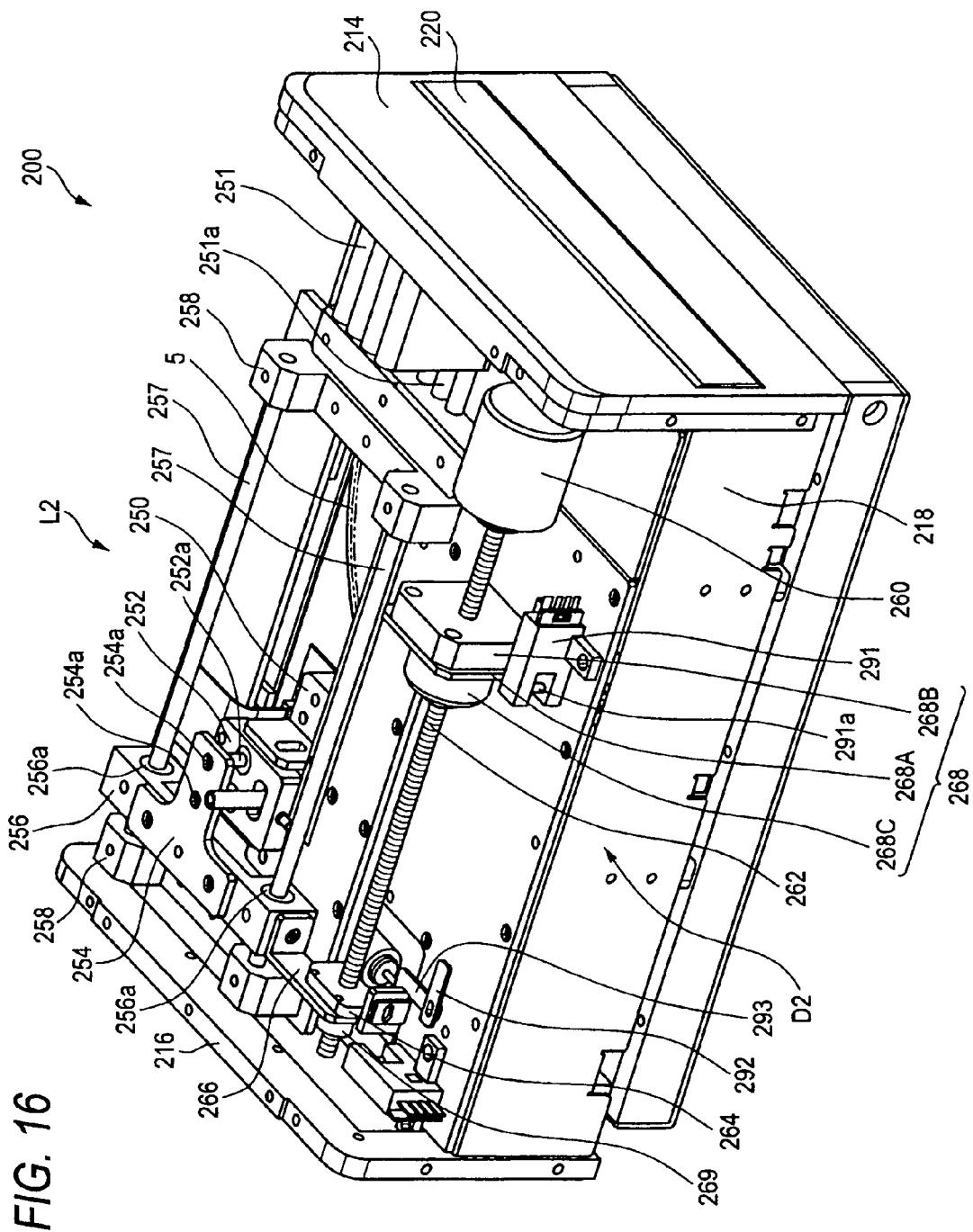
FIG. 16 shows a perspective view depicting the internal configuration of an optical disk apparatus according to the second embodiment of an embodiment of the invention.
Figure 17A:
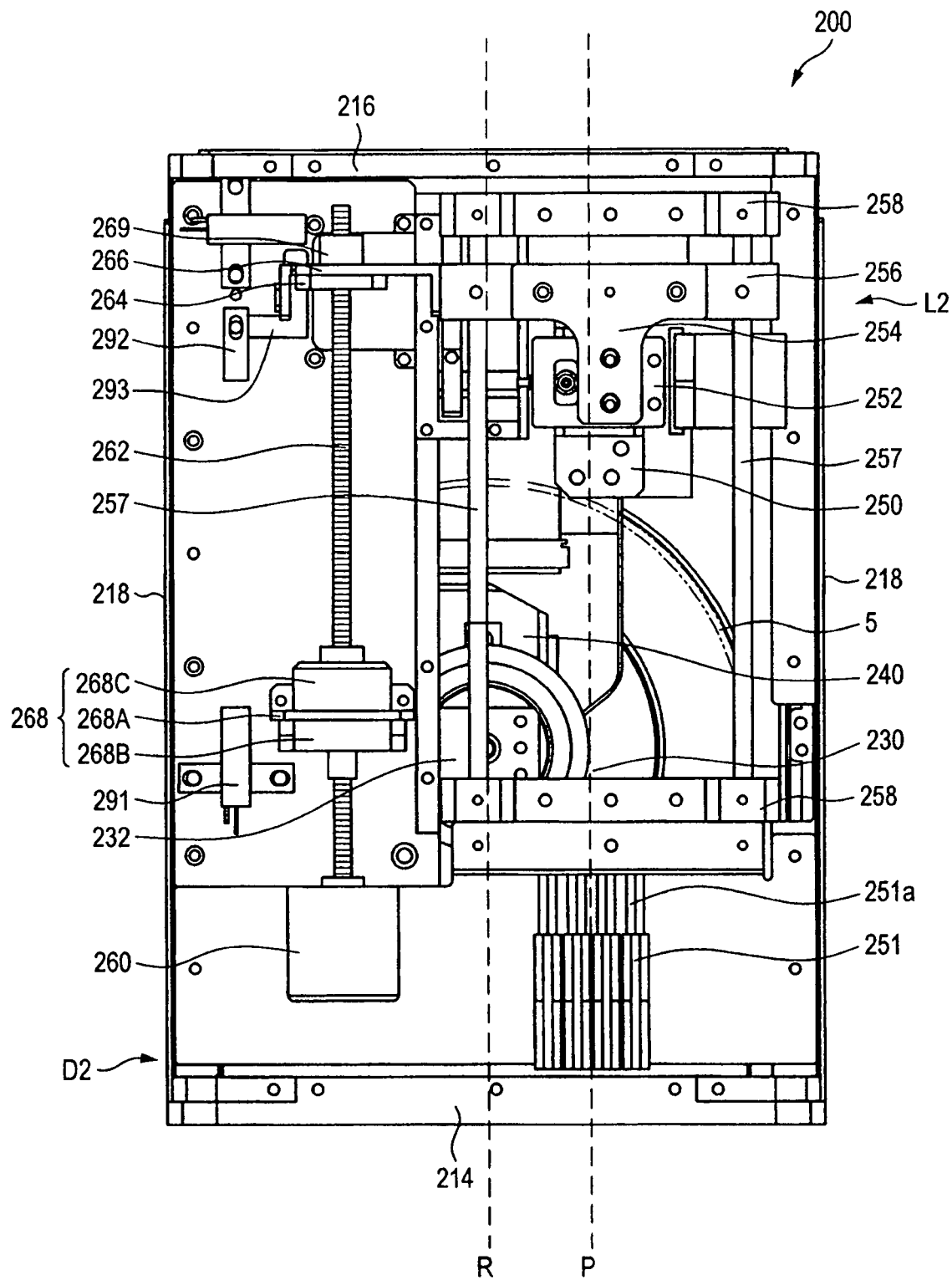
FIG. 17A shows a plan view depicting the internal configuration of the optical disk apparatus according to the same embodiment.

The Configuration and Operation of an Optical Disk Apparatus 200 According to the Second Embodiment Hereinafter, the configuration of the optical disk apparatus 200 according to the second embodiment of an embodiment of the invention as an information recording apparatus using such a print head in which the print head 250 having the ink discharge part 250a can be separated from the ink tank part 251 will be described with reference to FIGS. 16 and 17A. In addition, FIG. 16 shows a perspective view depicting the internal configuration of the optical disk apparatus 200 according to the second embodiment of an embodiment of the invention, and FIG. 17A shows a plan view depicting the internal configuration of the optical disk apparatus 200 according to the second embodiment of an embodiment of the invention.

The optical disk apparatus 200 according to the embodiment is an apparatus in which an optical disk 5 as an information recording medium is loaded to print a label on the label surface of the loaded optical disk 5, and the apparatus mainly has a drive part D2 which uses the optical disk 5 to record and reproduce data, and a label printing part L2 which is disposed on the label surface (the printing surface) side on the opposite side of the data recording surface of the optical disk 5, that is, disposed above the drive part D2 and prints a label.

The drive part D2 is placed in the area surrounded by a front panel 214, a rear panel 216, and two side panels 218 and 218, and mainly has a tray 220 which is movably disposed by a predetermined loading mechanism, a chucking plate 230 which is disposed above the center part of a disk mounting part (not shown) of the tray 220, and an optical pickup 240 as an information recording unit disposed below the tray 220 (on the side of the data recording surface of the optical disk 5 which is loaded into the optical disk apparatus 200). In addition, the configuration and operation of the drive part D2 of the optical disk apparatus 200 according to the embodiment are the same as those of the configuration and operation of the drive part D1 of the optical disk apparatus 100 according to the first embodiment, omitting the detailed descriptions here.

The label printing part L2 has the print head 250, a print head moving unit which moves the print head 250 in parallel with the radial direction of the optical disk 5 at the position shifted from the rotational center of the optical disk 5, and a print head maintenance unit which caps and cleans the print head 250.

The print head 250 is disposed on the opposite side of the optical pickup 240 and the optical disk 5 (the label surface side of the optical disk 5), which is configured to move in parallel with the radial direction (the P-axis in FIG. 17B) at the position shifted (offset) from a radial axis R. In addition, on the under surface side of the print head 250 (the label surface side of the optical disk 5), an ink discharge part 250a is disposed, in which ink is discharged from the ink discharge part 250a onto the rotating optical disk 5 while the print head 150 is moving on the P-axis in parallel with the radial direction shifted (offset) from the radial axis R, whereby a label can be printed on the label surface of the optical disk 5.

Here, as described above, the print head 250 according to the embodiment is disposed as it can be separated from the ink tank part 251, which is configured in which only the print head 250 is movable in parallel with the radial direction at the position shifted from the rotational center of the optical disk 5 as the position of the ink tank part 251 remains to fix to the front surface side of the optical disk apparatus 200. In the embodiment, the ink tank part 251 has the structure in which ink cartridges having ink of four colors, Y (yellow), M (magenta), C (cyan), and K (black), are arranged side by side, and each of the ink cartridges is joined to ink tubes 251a (four tubes in total). Ink is supplied from the ink tubes 251a to the print head 250 in printing a label.

In addition, the print head 250 is held from above by a print head holder 252 nearly in a rectangular parallelepiped. The print head holder 252 has two head elevating shafts 252a, in which the two head elevating shafts 252a are fit into two through holes 254a formed in a head supporting plate 254 nearly in a T-shape, and the upper part is fixed by a fastening screw (not shown). The head elevating shafts 252a guide the movement of the print head 250 in the vertical direction. On the under surface side of the head supporting plate 254, a head drive bearing member 256 is disposed which is extended laterally (in the direction vertical to the radial direction), and a bearing (linear bearing) 256a is provided to each of the both lateral ends of the head drive bearing member 256. The bearing 256a penetrates through in the direction in parallel with the radial direction, and two head drive shafts 257 are disposed which are arranged almost in parallel with each other (in parallel with the radial direction) so as to penetrate through the inner radius of the bearing 256a. The both ends of the two head drive shafts 257 are supported by identical shaft support members 258. In addition, the detailed configuration of the print head holder 252 will be described later.

The print head moving unit is mainly configured of a head drive motor 260, a ball screw 262 which is joined to the head drive motor 260, a ball screw nut 264 through which the ball screw 262 is inserted, a joining member 266 which joins the ball screw nut 264 to a head drive bearing member 256, a ball screw support member 268 which is disposed in the midway part of the ball screw 264, and limit sensors 291 and 294.

The head drive motor 260 rotates the ball screw 262 with its power. The ball screw 262 is extended in the direction in parallel with the radial direction, and the ball screw nut 264 is configured to move in the direction in parallel with the radial direction by the rotation of the ball screw 262. The joining member 266 joins the ball screw nut 264 to the head drive bearing member 256 to move the head drive bearing member 256 in the direction in parallel with the radial direction at the position shifted (offset) from the rotational center of the optical disk 5 in association with the movement of the ball screw nut 264.

The ball screw support member 268 is a member that supports the ball screw 262, which is formed of a ball screw supporting plate 268A, and ball screw support units 268B and 268C in which a bearing (not shown) is incorporated. In the embodiment, the ball screw support units 268B and 268C are configured in one piece. After the ball screw 262 is fit into the ball screw support units 268B and 268C through the bearing, it is clamped by a nut, not shown.

In addition, in the optical disk apparatus 200 according to the embodiment, for example, the movement of the print head 250 in the radial direction can be controlled by the limit sensor 291. More specifically, for example, the limit sensor 291 is configured as an optical sensor nearly in a U-shape, having a light emitting device and a light receiving device (not shown). The light emitting device and the light receiving device are disposed as facing to each other, in which the light emitted from the light emitting device passes through a recessed part 291a vertically, and received by the light receiving device. On the other hand, on the joining member 266 of the print head moving unit, a limit sensor light shielding plate 292 is disposed through a light shielding plate support member 293 nearly in an L-shape.

Here, the limit sensor 291 is a member that controls the print area, and preferably, it is disposed at the position at which the ink discharge part 250a of the print head 250 can at least reach the rim part of the optical disk 5 on the rear surface side. The limit sensor 291 is placed at the position like this, whereby the printable area can be widened when the print head 250 makes a print on the label surface of the optical disk 5, and a print can be easily made near the inner radius of the optical disk 5.

Figure 17B:
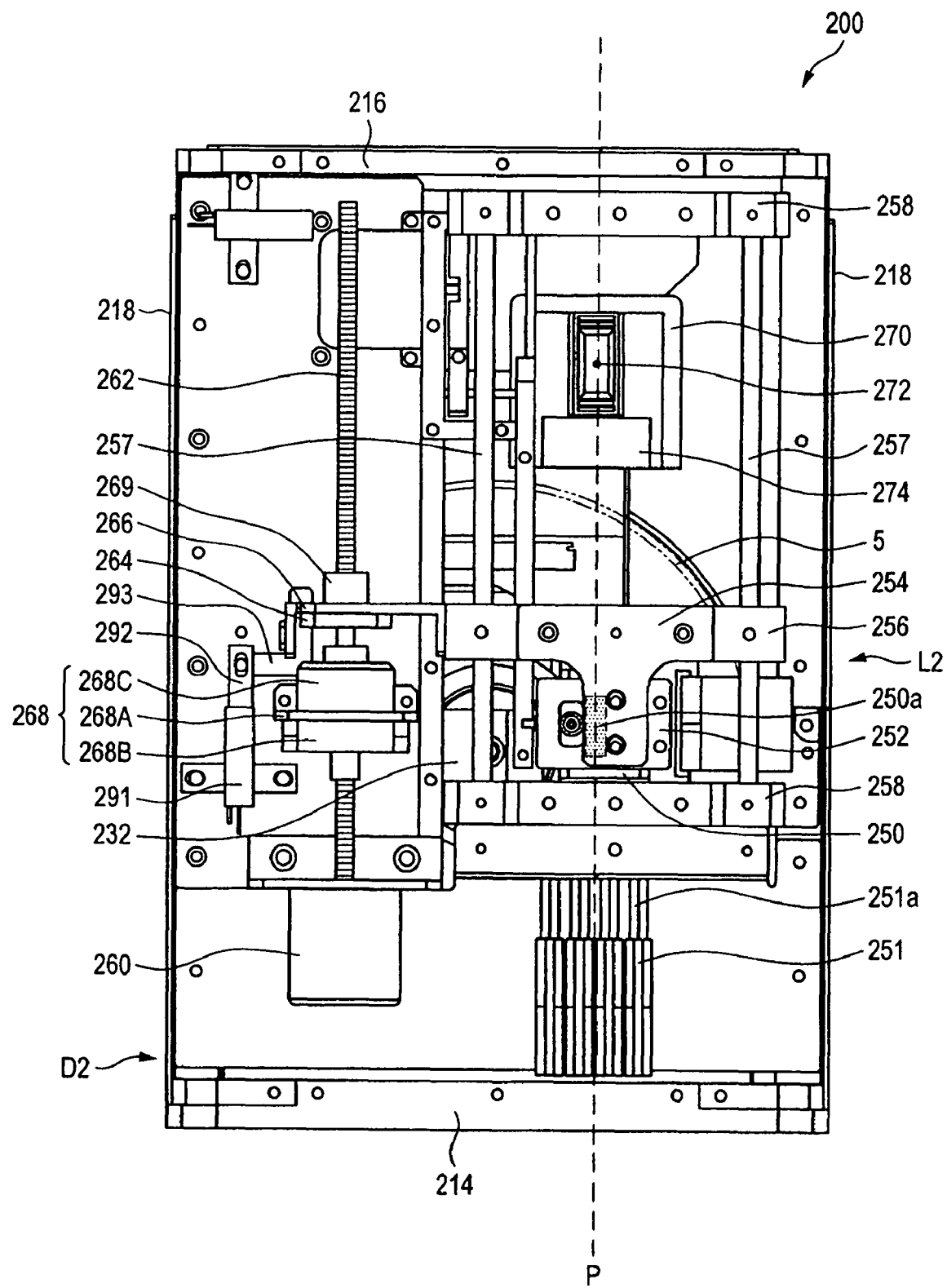
FIG. 17B shows a plan view depicting the internal configuration of the optical disk apparatus according to the same embodiment, showing the state in which the print head prints a label.

In FIGS. 16 and 17A, the print head maintenance unit is placed under the print head 250 and the print head holder 252, which is difficult to visually see, but has a cap accommodating part 270 which accommodates a cap 272 and an ink reservoir 274 (see FIG. 17B). The cap 272 is used not to dry the print head, and the ink discharge part 250a of the print head 250 is capped by the cap 272 during the standby for printing. In addition, for example, in order to prevent such a print error that the ink discharge part 250a is clogged and ink is not discharged, the ink reservoir 274 is a place at which ink is discharged on purpose so that air does not enter the print head 250 (ink is discharged from the ink discharge part 250a without printing a label). The cap accommodating part 270 in which the cap 272 and the ink reservoir 274 are accommodated is disposed on the rear side (the rear panel 216 side) of the optical disk apparatus 200 on the opposite side of the eject side (the eject port side) of the optical disk 5.

Here, since the print head 250 is not arranged on the radial axis, the cap accommodating part 270 including the cap 272 and the ink reservoir 274 is also placed at the position shifted (offset) from the radial axis. Thus, the optical disk apparatus 200 can be reduced in size, as similar to the case of the optical disk apparatus 100 according to the first embodiment.

As discussed above, the configuration of the optical disk apparatus 200 has been described. Next, the operation of the label printing part L2 of the optical disk apparatus 200 having this configuration will be described with reference to FIGS. 17A and 17B. In addition, FIG. 17B shows a plan view depicting the internal configuration of the optical disk apparatus 200 according to the second embodiment of an embodiment of the invention, showing the state in which the print head 250 is printing a label.

FIG. 17A shows the state in which the print head 250 waits at the retract position. In this state, when the head drive motor 260 is rotated to turn the ball screw 262, the ball screw nut 264 is moved in the radial direction along the ball screw 262. Since the ball screw nut 264 is joined to the head drive bearing member 256 through the joining member 266, the head drive bearing member 256 is moved in the radial direction at the position shifted from the rotational center of the optical disk 5 in association with the movement of the ball screw nut 264. At this time, since the head drive shaft 257 is inserted into the head drive bearing member 256 through the bearing 256a, the head drive bearing member 256 is guided by two head drive shafts 257 disposed in parallel with each other in the radial direction, and it can be moved linearly in the direction in parallel with the radial direction at the position shifted from the rotational center of the optical disk 5. Moreover, since the print head 250 is joined to the head drive bearing member 256 through the head support member 254, the print head 250 is eventually moved in the direction in parallel with in the radial direction at the position shifted from the rotational center of the optical disk 5 in association with the movement of the ball screw nut 264.

Here, as different from the manner before, since the print head 250 is placed so that the center thereof comes to the position offset from the radial axis R, the print head can be freely moved toward the inner radius and the outer radius of the optical disk 5 in the direction in parallel with the radial direction at the position offset from the radial axis R in association with the movement of the head drive bearing member 256, that is, the movement of the ball screw nut 264.

More specifically, as shown in FIG. 17A, the print head 250 is offset from the radial axis, and the print head 250 can be moved at the position with no interference with the chucking plate 230 and the optical pickup 240 (in FIG. 17A, a broken line is depicted at the position offset from the chucking plate 230 and the optical pickup 240 in parallel with the radial direction, and the print head 250 is placed at the position on the right side of the broken line).

In addition, preferably, between two areas that are obtained by splitting the area including the optical disk 5 along the direction of moving the optical pickup 240 (that is, in the embodiment, the radial axis R), the print head 250 is placed in the area positioned more on the downstream side than the optical pickup 240 with respect to the direction of rotating the optical disk 5. Therefore, in the embodiment, suppose the optical disk 5 is rotating clockwise in FIG. 16 or FIG. 17A, preferably, the print head 250 is placed on the right area of the areas obtained by splitting at the radial axis R.

This is because ink discharged from the print head 250 for floating is toward the outside of the optical disk 5 due to the flow generated in association with the rotation of the optical disk 5, but when the print head 250 is placed at the position offset more on the upstream side than the optical pickup 240 (on the left side of the radial axis R in FIGS. 16 and 17A), the floating ink tends to be deposited on the optical pickup 240 side to smear the optical pickup 240. On the other hand, when the print head 250 is placed at the position offset more on the downstream side than the optical pickup 240 (on the right side of the radial axis R in FIGS. 16 and 17A), ink flows in the direction toward the side panel 218. Thus, for example, an ink absorber is provided on the side panel 218 to facilitate preventing the optical pickup 240 from being smeared and retrieving the floating ink (mist).

Moreover, as described above, in the embodiment, the movement of the print head 250 in the direction in parallel with the radial direction is controlled by the limit sensor 291. In other words, as shown in FIG. 17B, when the print head 250 is moved on the front surface side of the apparatus and the limit sensor light shielding plate 292 is positioned at the recessed part 291a of the limit sensor 291, the limit sensor light shielding plate 292 blocks the light passing through inside the recessed part 291a. Then, it is difficult that the light receiving device of the limit sensor 291 receives the light from the light emitting device, and thus the print head 250 is controlled not to further move to the front surface side of the apparatus from this position.

Here, in the example above, the example is discussed that the print head 250 is always linearly moved in the direction in parallel with the radial direction, but the print head 250 is not always necessarily moved in the direction in parallel with the radial direction as long as it moves with no interference with the chucking plate 230 and the optical pickup 240. However, in order to efficiently print a label on the optical disk 5, the print head 250 may be moved in the direction in parallel with the radial direction of the optical disk 5 while it is moving over at least the optical disk 5, and may be moved in the direction not in parallel with the radial direction after it is off the optical disk 5. An exemplary movement of the print head 250 will be described with reference to FIG. 18. In addition, FIG. 18 shows an illustration depicting an exemplary trace of the movement of the print head 250 according to the second embodiment of an embodiment of the invention.

Figure 18:
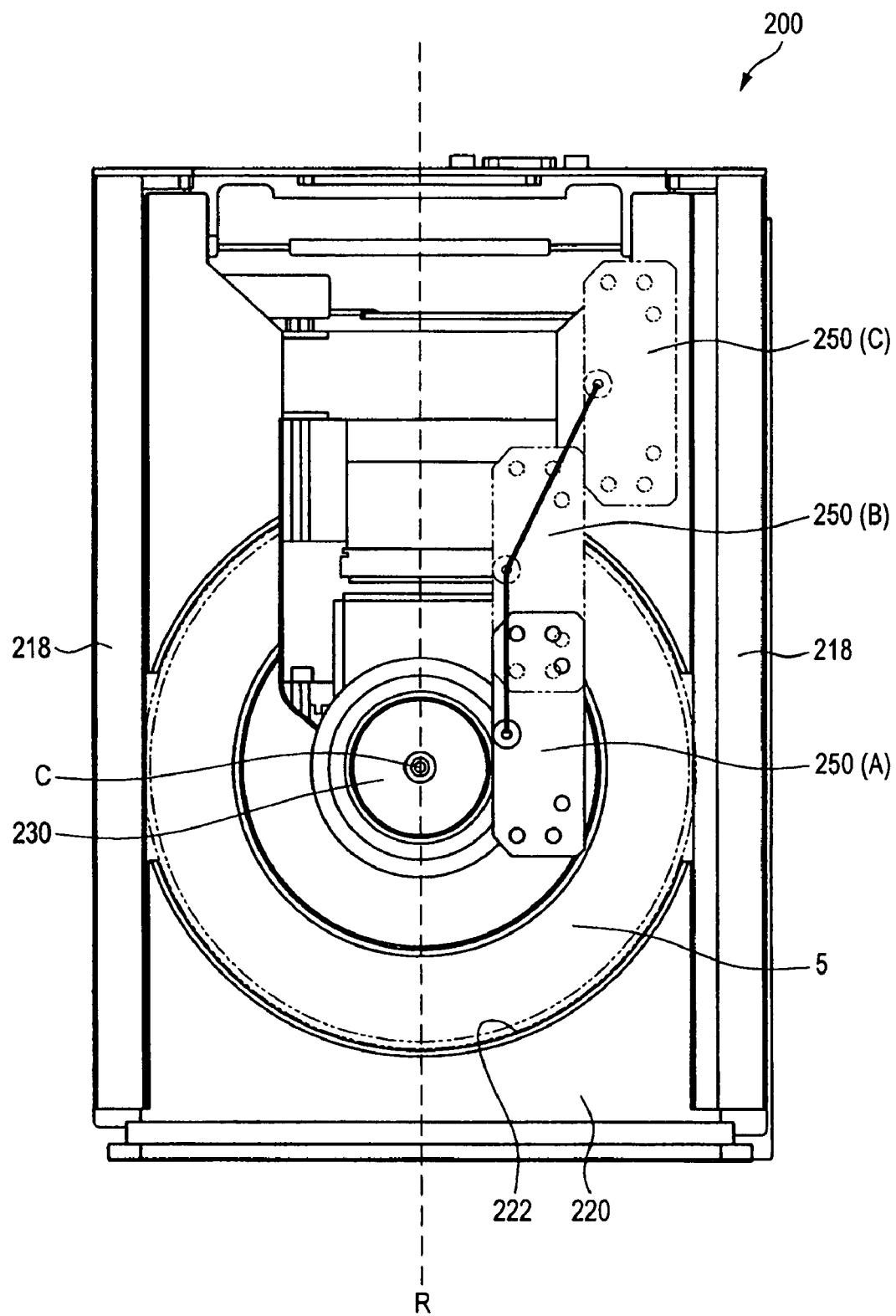
FIG. 18 shows an illustration depicting an exemplary trace of the movement of the print head in the same embodiment.

As shown in FIG. 18, suppose the print head 250 moves between position A (the position at which the print head 250 is depicted by a solid line) and position B (the position denoted by a two-dot chain line on position A) and prints a label. As described above, in the case in which the print head 250 prints a label over the optical disk 5, from the viewpoints of increasing the printable area and printing at high speed, the print head is preferably, linearly moved on the axis in parallel with at least the radial axis R. However, in the case in which the print head 250 is temporarily off the optical disk 5 and moves to the position at which a label is not printed (for example, it is moved from position B to position C in the drawing), the print head 250 is not necessarily moved linearly, and it may be moved in the direction not in parallel with the radial axis R.

In other words, the print head 250 is capped at the retract position for the purpose of maintenance such as cleaning or the purpose of preventing the ink discharge part 250a from drying in the case in which a label is not printed. It is necessary that the retract position is a position at which the print head does not interfere (not come into contact) with members such as the optical pickup (not shown) moving on the radial axis R. Therefore, preferably, the retract position is at the position closer to the outer radius (closer to the side panel 218) than the center part of the optical disk 5. Therefore, in the case in which the print head 250 is off the optical disk 5 to move to the retract position, it may be configured to move in the direction not in parallel with the radial axis R so as to move toward more outside than in the case in which a label is printed. In addition, without consideration of the easiness of printing a label and the print speed, even in the case in which the print head 250 is above the optical disk 5, it is not necessarily linearly moved on the axis in parallel with the radial axis R as long as it is moved so as not to interfere with members such as the chucking table 230.

Figure 19:
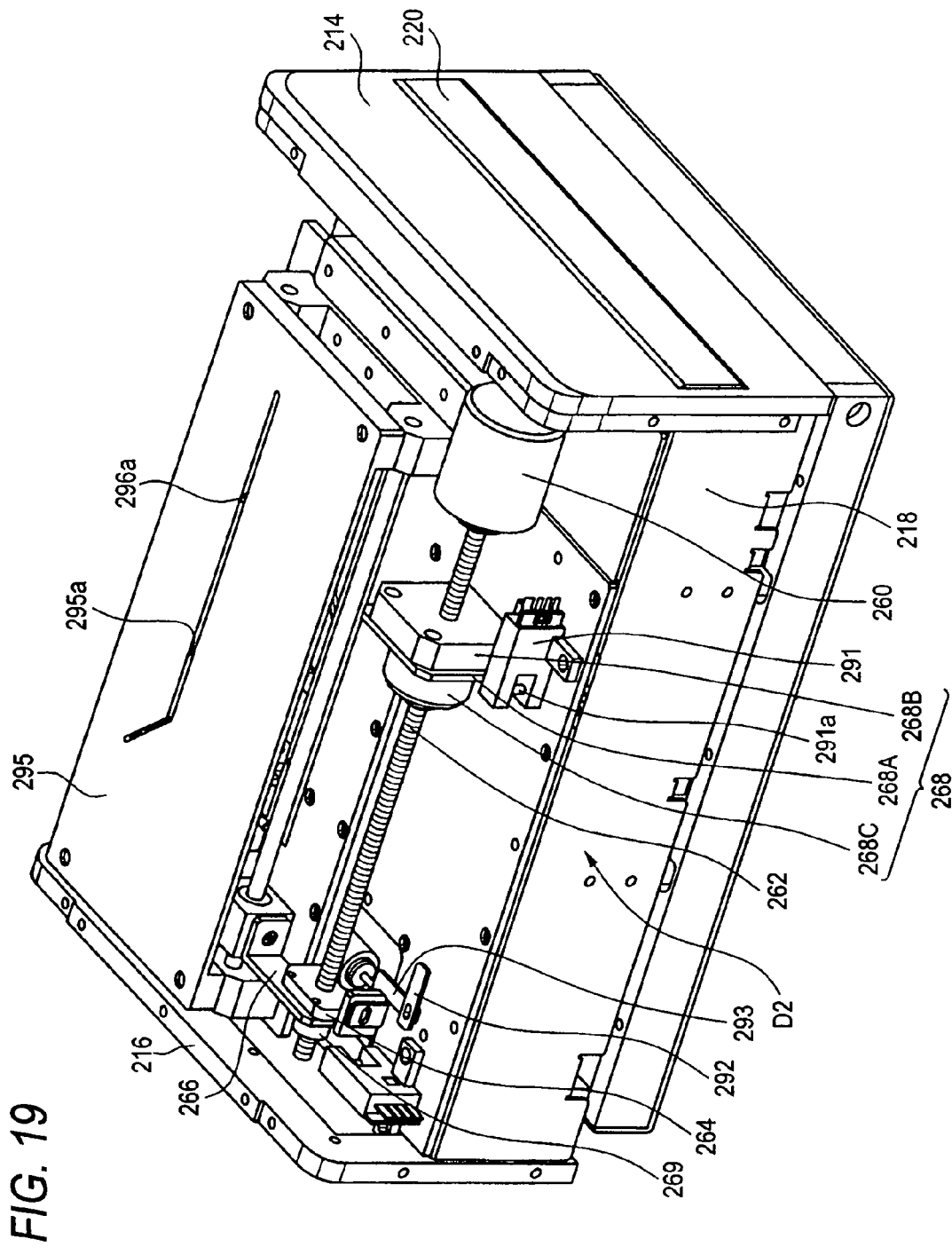
FIG. 19 shows a perspective view depicting the configuration of the optical disk apparatus an exemplary modification of the same embodiment.
Figure 20:
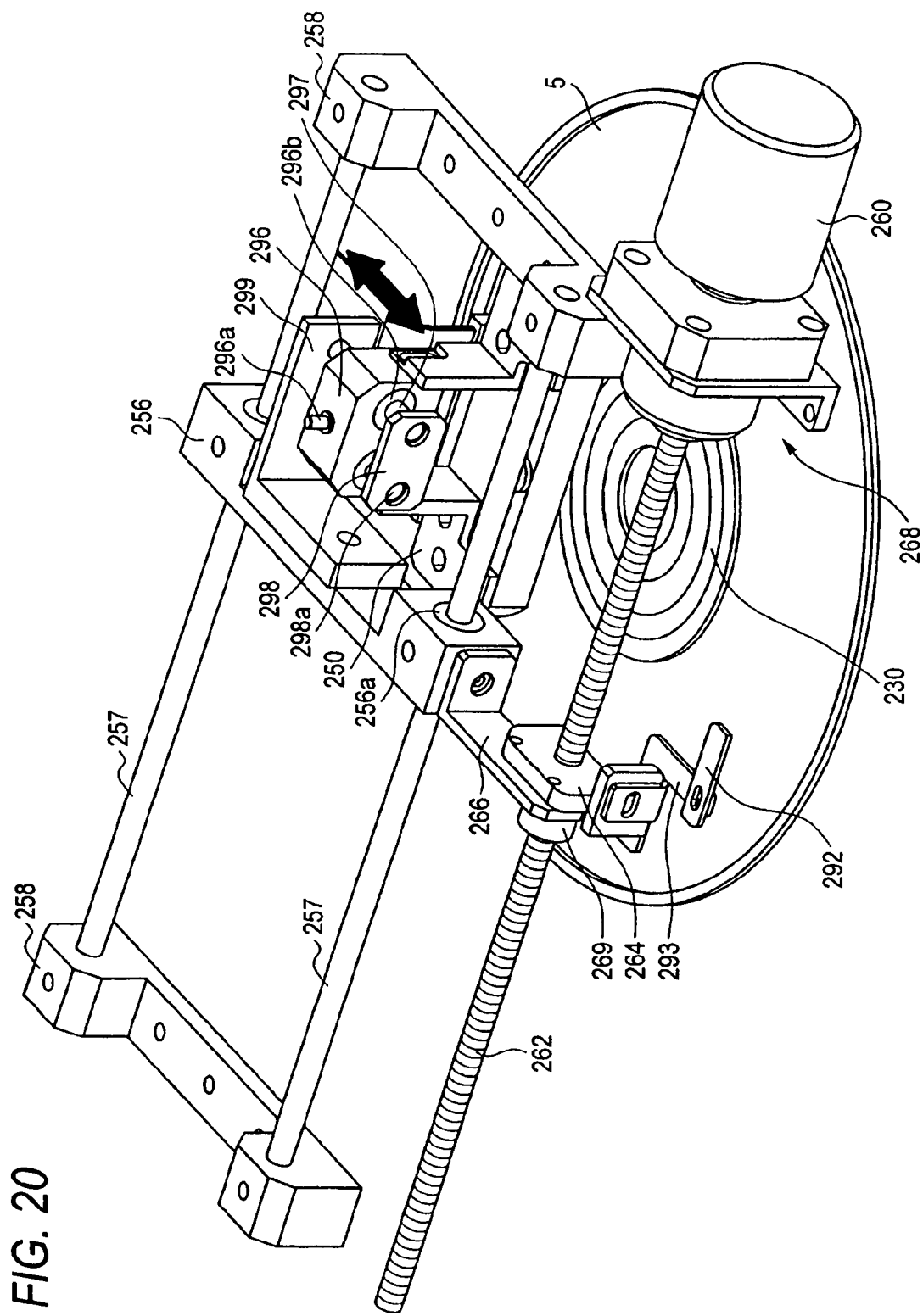
FIG. 20 shows a perspective view depicting the configuration of the essential part of the optical disk apparatus shown in FIG. 19.
Figure 21:
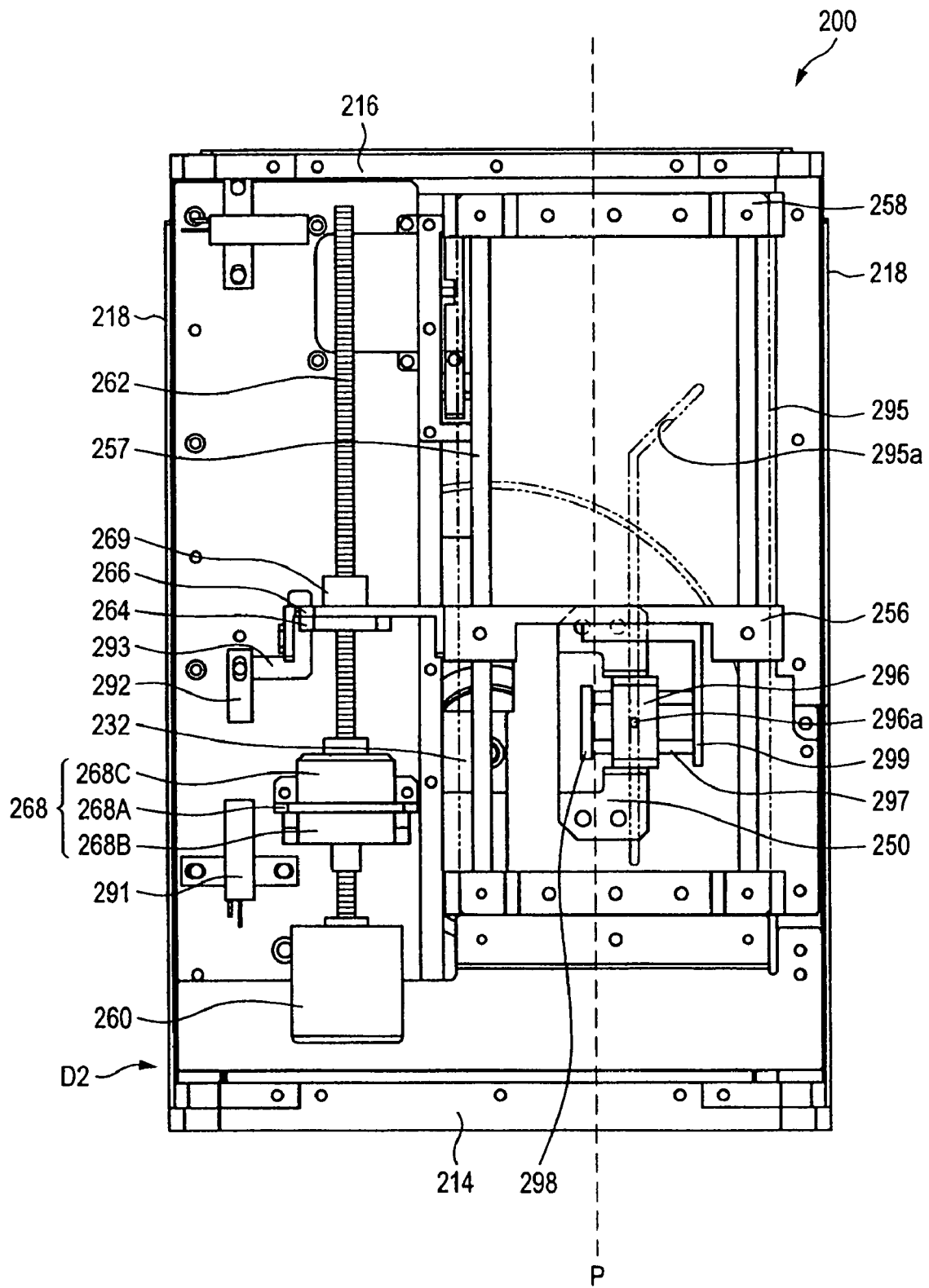
FIG. 21 shows a plan view depicting the configuration of the optical disk apparatus shown in FIG. 19.

Here, a more specific mechanism for moving the print head 250 in the trace shown in FIG. 18 will be described with reference to FIGS. 19 to 21. In addition, FIG. 19 shows a perspective view depicting the configuration of an optical disk apparatus according to a modification of the embodiment, FIG. 20 shows a perspective view depicting the configuration of the essential part of the optical disk apparatus shown in FIG. 19, and FIG. 21 shows a plan view depicting the configuration of the optical disk apparatus shown in FIG. 19. In addition, the descriptions for the same configurations as those of the second embodiment of an embodiment of the invention are omitted.

As shown in FIGS. 19 to 21, above a print head 250, a print head holder 296 is disposed which holds the print head 250, and on the top surface of the print head holder 296, a print head guide pin 296a is disposed which guides the movement of the print head 250. In addition, on the print head holder 296, a through hole (not shown) is provided so as to penetrate through the side surface thereof in the direction vertical to the radial direction, and into the through hole, a head transverse shaft 297 is inserted through a linear bearing 296b. One end of the head transverse shaft 297 is fit into a through hole 298a formed in a first shaft support member 298, and the other end is mounted on a second shaft support member 299. The second shaft support member 299 is a member nearly in an L-shape, which is mounted on the head drive bearing member 256.

In addition, a print head guide plate 295 is disposed so as to cover the area in which the print head 250 is moved from above the apparatus. The length of the print head guide plate 295 (the length in the direction in parallel with the radial direction) is almost the same as that of the head drive shaft 257, and the width of the print head guide plate 295 (the length in the direction vertical to the radial direction) is almost the same as the length of the shaft support member 258. The print head guide plate 295 is provided with a print head guide groove 295a which guides the movement of the print head 250, in which the print head guide pin 296 is fit into the print head guide groove 295a, whereby the print head 250 is guided by the print head guide groove 295a and moved along the print head guide groove 295a. In the modification, the print head guide groove 295a is formed in a linear shape in the direction in parallel with the radial direction over the optical disk 5, it is bent at a predetermined angle at a predetermined position more on the outer side than the outer radius of the optical disk 5, and it is formed in a linear shape in the direction not in parallel with the radial direction. Therefore, the print head 250 is moved in the direction in parallel with the radial direction when it is guided by the print head guide groove 295a and moved over the optical disk 5, and it is moved in the direction not in parallel with the radial direction after it is off the optical disk 5.

Again, with reference to FIGS. 17A and 17B, the discussion of the operation of the label printing part L2 of the optical disk apparatus 200 according to the second embodiment of an embodiment of the invention is continued. As shown in FIG. 17B, the ball screw nut 264 is moved to a certain position of the ball screw support member 268 toward the front surface side of the optical disk apparatus 200, and then it is retained at that position. Thus, the print head 250 can be moved to the position corresponding to the retain position of the ball screw nut 264. Therefore, the print head 250 discharges ink from the ink discharge part 250a while it is moved from the position shown in FIG. 17A to the position shown in FIG. 17B, whereby it can print a label on the optical disk 5.

Figure 24A:
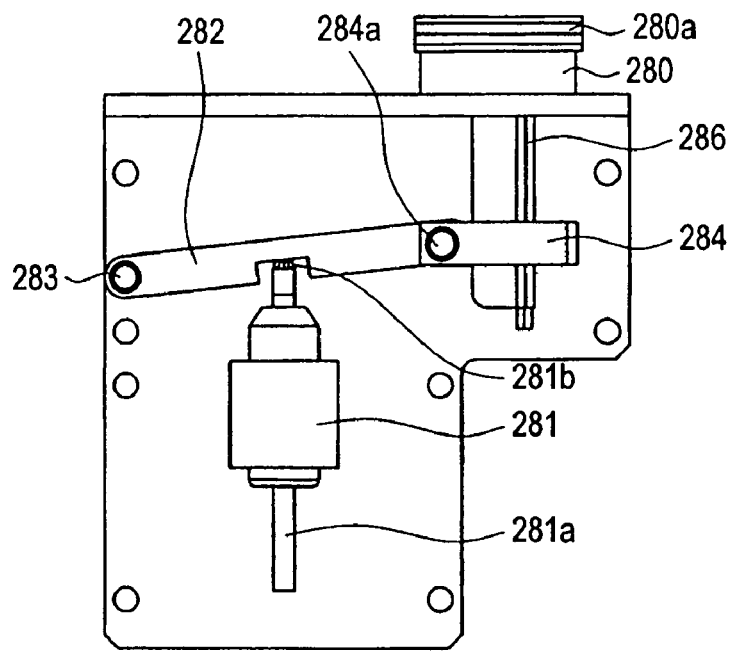
FIG. 24A shows a plan view depicting the configuration of the cleaning mechanism according to the same embodiment.
Figure 24B:
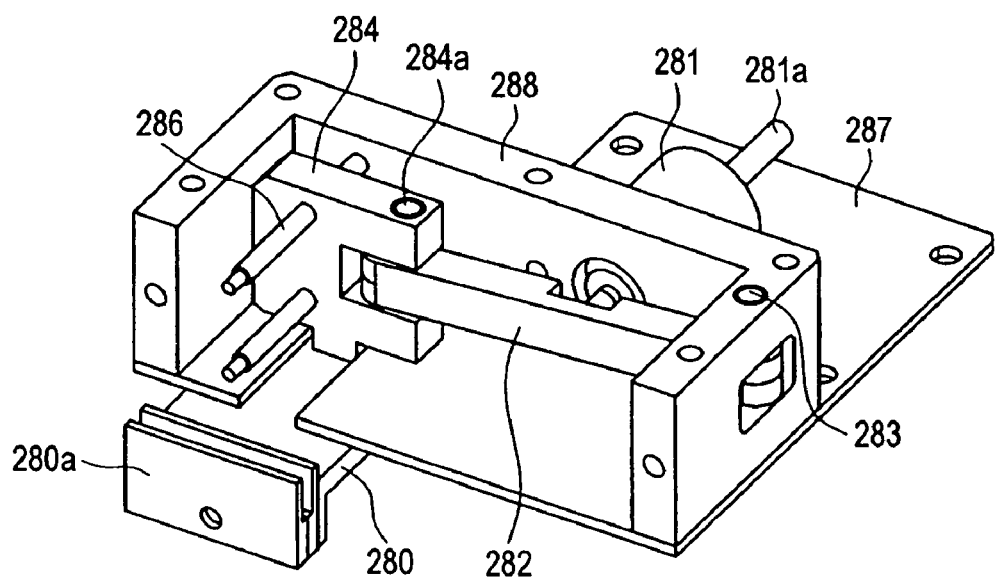
FIG. 24B shows a perspective view depicting the configuration of the cleaning mechanism according to the same embodiment.
Figure 25A:
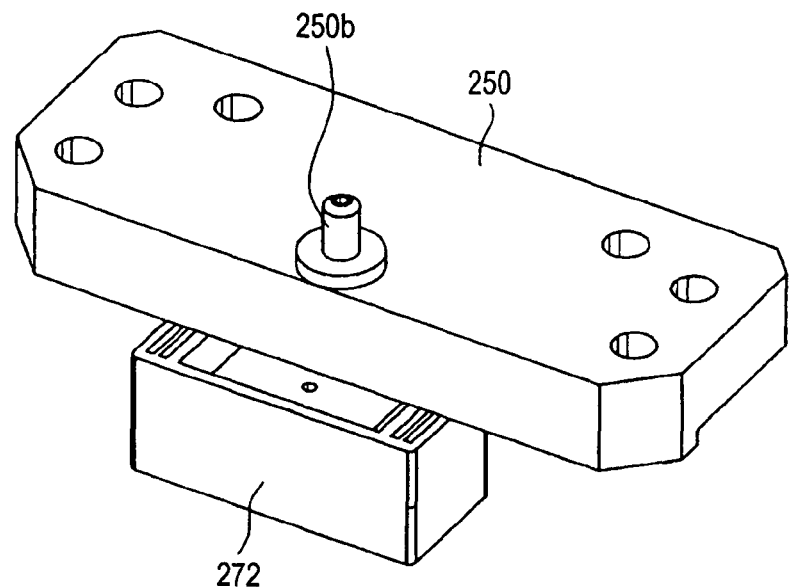
FIGS. 25A to 25C show a perspective view depicting the configuration of the cap according to the same embodiment.
Figure 25B:
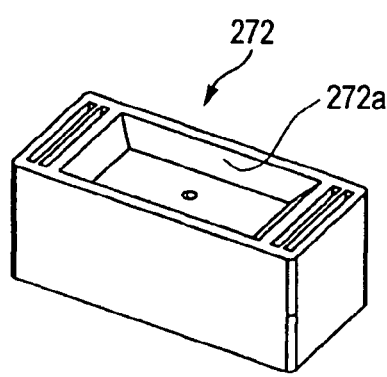
Figure 25C:
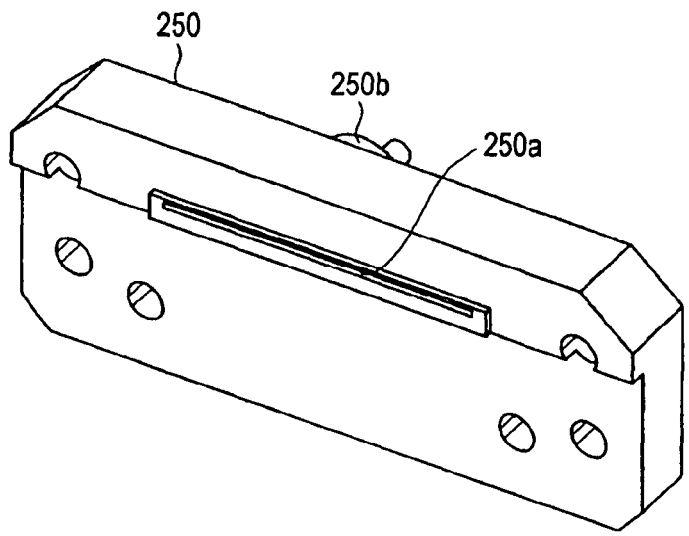

Next, the print head 250 according to the second embodiment of an embodiment of the invention is taken as an example and the configurations and operations of the cap mechanism which caps the print head and the cleaning mechanism for cleaning will be described with reference to FIGS. 22 to 25. In addition, FIG. 22 shows a perspective view depicting the configuration of the cap mechanism and the cleaning mechanism of the print head 250 according to the embodiment, FIG. 23 shows a perspective view depicting the print head 250, the cap mechanism and the cleaning mechanism according to the embodiment seen from the under surface side of the optical disk apparatus, FIG. 24A shows a plan view depicting the configuration of the cleaning mechanism according to the embodiment, FIG. 24B shows a perspective view depicting the configuration of the cleaning mechanism according to the embodiment, and FIGS. 25a to 25C show a perspective view depicting the configuration of the print head 250 and the cap 272 according to the embodiment.

Figure 22:
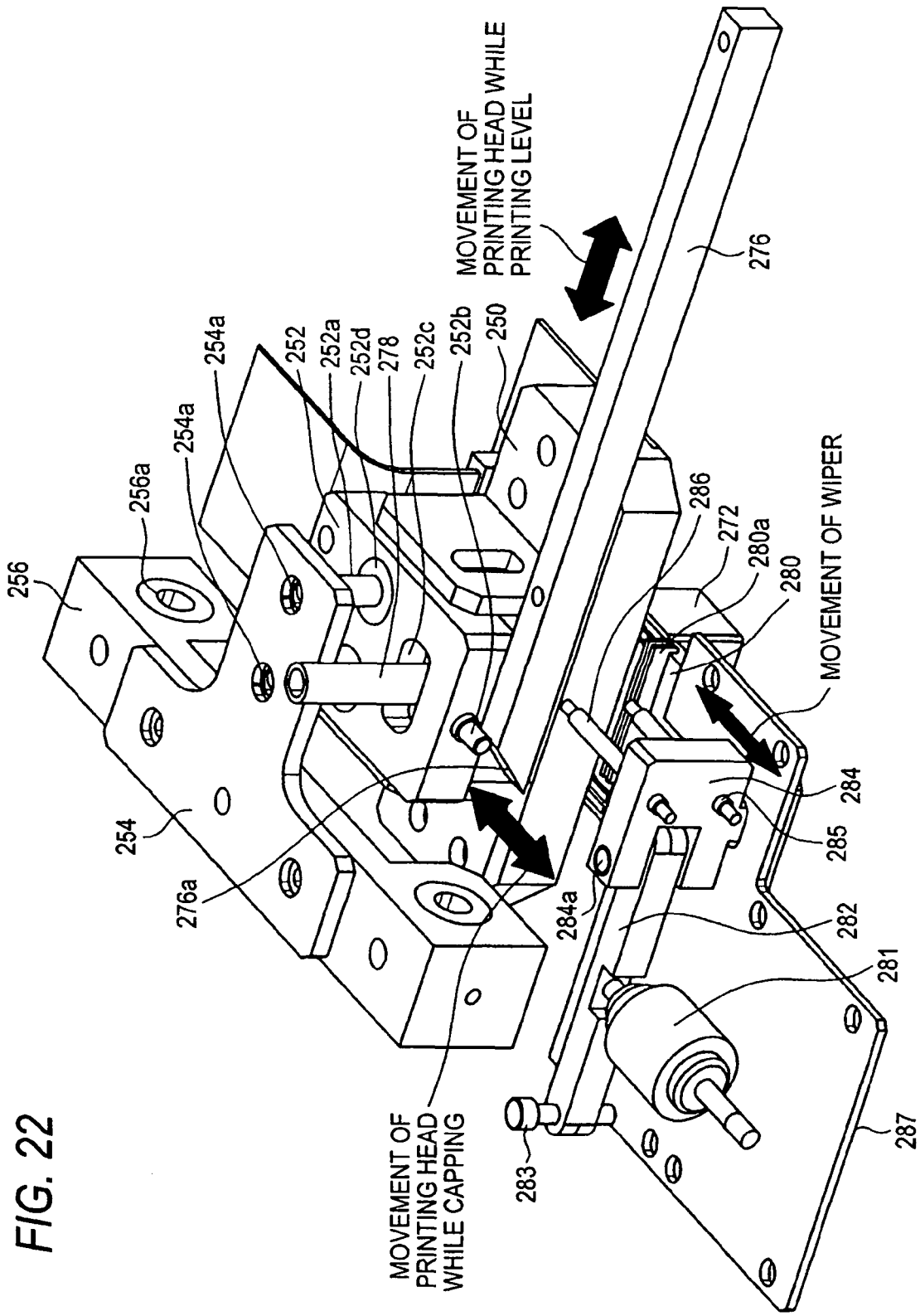
FIG. 22 shows a perspective view depicting the configuration of a print head, a cap mechanism and a cleaning mechanism according to the second embodiment of an embodiment of the invention.
Figure 23:
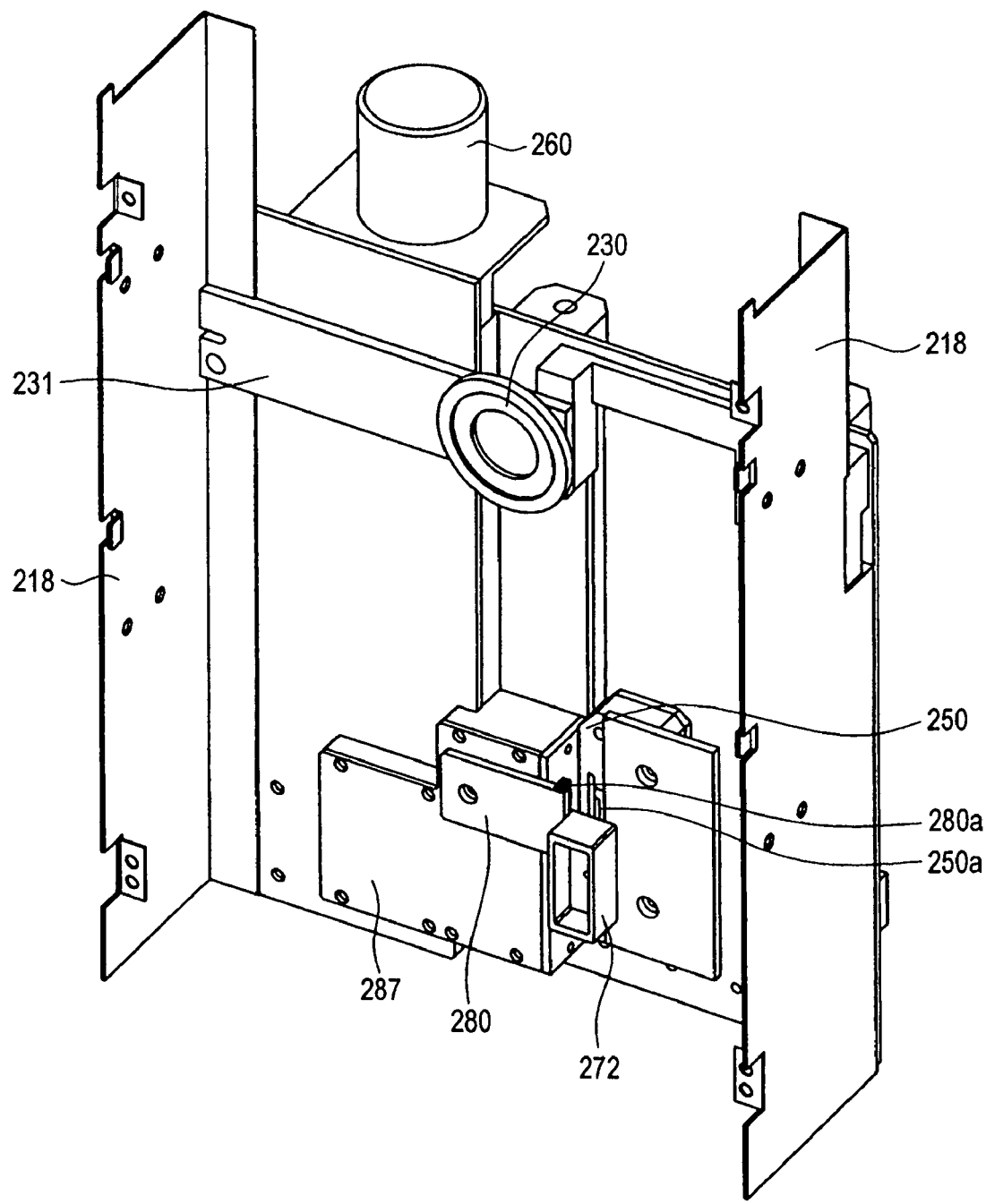
FIG. 23 shows a perspective view depicting the print head, the cap mechanism and the cleaning mechanism in the same embodiment seen from the under surface side of the optical disk apparatus.

As shown in FIGS. 22 and 23, under the print head 250, the ink cap 272 and a wiper 280 which is an exemplary cleaning mechanism are disposed. In addition, the configurations of the print head 250, the print head holder 252, the head support substrate 254, the head drive bearing member 256, and the bearing 256a are described above, omitting the detailed descriptions here.

As described above, through the print head holder 252, the two head elevating shafts 252a are inserted which are arranged in the direction in parallel with the radial direction, in which the upper part is fit into the two through holes 254a formed in the head support substrate 254, and is fixed to the head support substrate 254 by a fastening screw (not shown). The two linear ball bearings 252d are fit into the through hole (not shown) into which the head elevating shaft 252a of the print head holder 252 is inserted, in which the movement in the horizontal direction is restricted by the head elevating shaft 252a, and the movement is allowed only in the vertical direction. In addition, on the side surface of the print head holder 252, a guide pin 252b is disposed. In moving the print head 250, the guide pin 252b is moved on a guide rail 276 which is extended on the side surface side of the print head 250 in the direction in parallel with the radial direction, whereby the movement of the print head 250 is guided.

In addition, at the end part of the guide rail 276 on the rear surface side of the optical disk apparatus 200, an inclined surface 276a is formed. In capping the print head 250, first, the guide pin 252b is moved along the top surface of the guide rail 276 to the rear surface side of the apparatus in the direction in parallel with the radial direction, whereby the print head 250 held by the print head holder 252 is also moved to the rear surface side of the apparatus in the direction in parallel with the radial direction. Then, the guide pin 252b is moved downward in a slanting direction along the inclined surface 276a of the guide rail 276, whereby the print head 250 held by the print head holder 252 is also moved downward in a slanting direction, and the ink discharge part 250a is capped with the cap 272. Here, in moving the guide pin 252b along the inclined surface 276a of the guide rail 276, the movement of the print head is guided by the head drive shaft 257 in the direction in parallel with the radial direction, and the movement in the vertical direction is guided by the head elevating shaft 252*a*.

In addition, the print head holder 252 is formed with a long hole 252*c* whose longitudinal direction is in the direction in parallel with the radial direction, and through the long hole 252*c*, an ink tube 278 is penetrated which supplies ink to the print head 250. The ink tube 278 is connected to the ink tank part 251 in a free form (see FIGS. 15A and 15B).

Here, the structures of the print head 250 and the cap 272 will be described with reference to FIGS. 25A to 25C. As shown in FIG. 25A, on the top surface side of the print head 250, ink supply holes 250*b* are provided. The number of the ink supply holes 250*b* is one because the example is a monochrome example in the embodiment, but in the case of color, the number is three, cyan, magenta and yellow, or four as black added to them. In addition, as shown in FIG. 25C, on the under surface side of the print head 250, an ink discharge part 250*a* is formed along the longitudinal direction of the print head 250 (in the embodiment, the direction in parallel with the radial direction) so as to communicate with the ink supply hole 250*b*. The ink discharge part 250*a* has a nozzle (ink discharge port) arranged in the direction in parallel with the radial direction of the optical disk 5. The cap 272 caps the print head 250 so as to cover the ink discharge part 250*a* in order to prevent the ink discharge part 250*a* from drying ink. In addition, as shown in FIG. 25B, the cap 272 is formed nearly in a rectangular parallelepiped, having a head accommodating part 272*a* on the top surface side thereof (the print head 250 side) which is a recessed part to accommodate the ink discharge part. In addition, as shown in FIG. 23, in the cap 272 according to the embodiment, there is a cavity on the back surface side of the bottom part of the head accommodating part 272*a*, and the bottom surface of the cap 272 is opened. In addition, it is necessary to arrange the cap 272 at the position greatly distant from the optical pickup 240 to the rear side in order to avoid the interference of the print head 250 with the optical pickup 240. However, in the optical disk apparatus 200 according to the embodiment, since the print head 250 can be moved at the position offset from the radial axis R, it is unnecessary to arrange the cap 272 at the position greatly distant from the optical pickup 240 to the rear side. Therefore, the size of the optical disk apparatus 200 on the rear side can be reduced.

Next, the configuration of the cleaning mechanism according to the embodiment will be described with reference to FIGS. 24A and 24B, in addition to FIGS. 22 and 23. The cleaning mechanism according to the embodiment is configured of a wiper 280 which is moved in the direction vertical to the radial direction, and a drive mechanism thereof.

The wiper 280 has a wiper head 280*a* at the tip end part thereof. For example, the wiper head 280*a* has a structure in which an elastic member like rubber is laminated in two layers. In addition, the wiper 280 is driven by a wiper drive motor 281, and they are joined to each other through a wiper arm 282 and a wiper joining part 284.

The wiper 280 is disposed on the under surface side of the wiper part supporting plate 287, and the wiper joining part 284 disposed on the top surface side of the wiper part supporting plate 287 is joined to the wiper 280 so as to penetrate through a through hole or a notch (both are not shown) formed in the wiper part supporting plate 287. The wiper drive motor 281 is fixed on the wiper part supporting plate 287. In addition, as shown in FIGS. 24A and 24B, a wiper drive shaft 281*a* is disposed so as to penetrate through the wiper drive motor 281, and a pressing part 281*b* is disposed at one end of the wiper drive shaft 281*a* (at the end part on the wiper arm 282 side). A pin 283 penetrates through one end of the wiper arm 282, and one end of the pin 283 is fixed to the wiper part supporting plate 287. In addition, the other end of the wiper arm 282 is joined to the wiper joining part 284 through a hinge part 284*a*.

In addition, in the wiper joining part 284, two through holes 285 are formed in the vertical direction, for example, and two wiper drive shafts 286 are inserted through the through holes 285. The two wiper drive shafts 286 are extended in the direction vertical to the radial direction, and arranged in parallel with each other. Although not shown in FIGS. 22, 23 and 24A for the convenience of descriptions, as shown in FIG. 24B, the wiper drive shaft 286 is mounted on a wiper holding member 288 nearly in a U-shape, and a pin 283 is also held by the wiper holding member 288.

The operation of the cleaning mechanism according to the embodiment having this configuration will be described below. First, the wiper drive motor 281 is rotated to move the wiper drive shaft 281*a* in the direction toward the wiper arm 282, and then the pressing part 281*b* at the tip end part of the wiper drive shaft 281*a* presses the wiper arm 282 in the direction of moving the wiper drive shaft 281*a*. With the pressing force, the wiper arm 282 is rotated counterclockwise, for example, as the pin 283 is used as the fulcrum. Subsequently, in association with the rotation of the wiper arm 282, the wiper joining part 284 joined to the wiper arm 282 through the hinge part 284*a* is linearly moved along the shaft 286 in the direction vertical to the radial direction while it is guided by the wiper drive shaft 286. The wiper 280 is linearly moved toward the print head 250 side in the direction vertical to the radial direction in association with the movement of the wiper joining part 284.

On the other hand, in the case in which the wiper arm 282 is rotated clockwise, for example, it can be rotated by using the force of an elastic member such as a spring (not shown) that is elastically restored. In other words, for example, when the wiper drive motor 281 is rotated reversely to move the wiper drive shaft 281*a* toward the opposite side of the wiper arm 282, the pressing part 281*b* is separated from the wiper arm 282 and the pressing force caused by the pressing part 281*b* is not applied to the wiper arm 282. Therefore, for example, the wiper arm 282 can be rotated clockwise due to the restoration force of the elastic member described above. Then, the wiper 280 is moved toward the reverse direction before (toward the opposite side of the print head 250 side). By repeating the rotation and the reverse rotation of the drive motor 281, the wiper 280 can clean the ink discharge part of the print head 250 (not shown) with the wiper head 280*a*.

Figure 27:
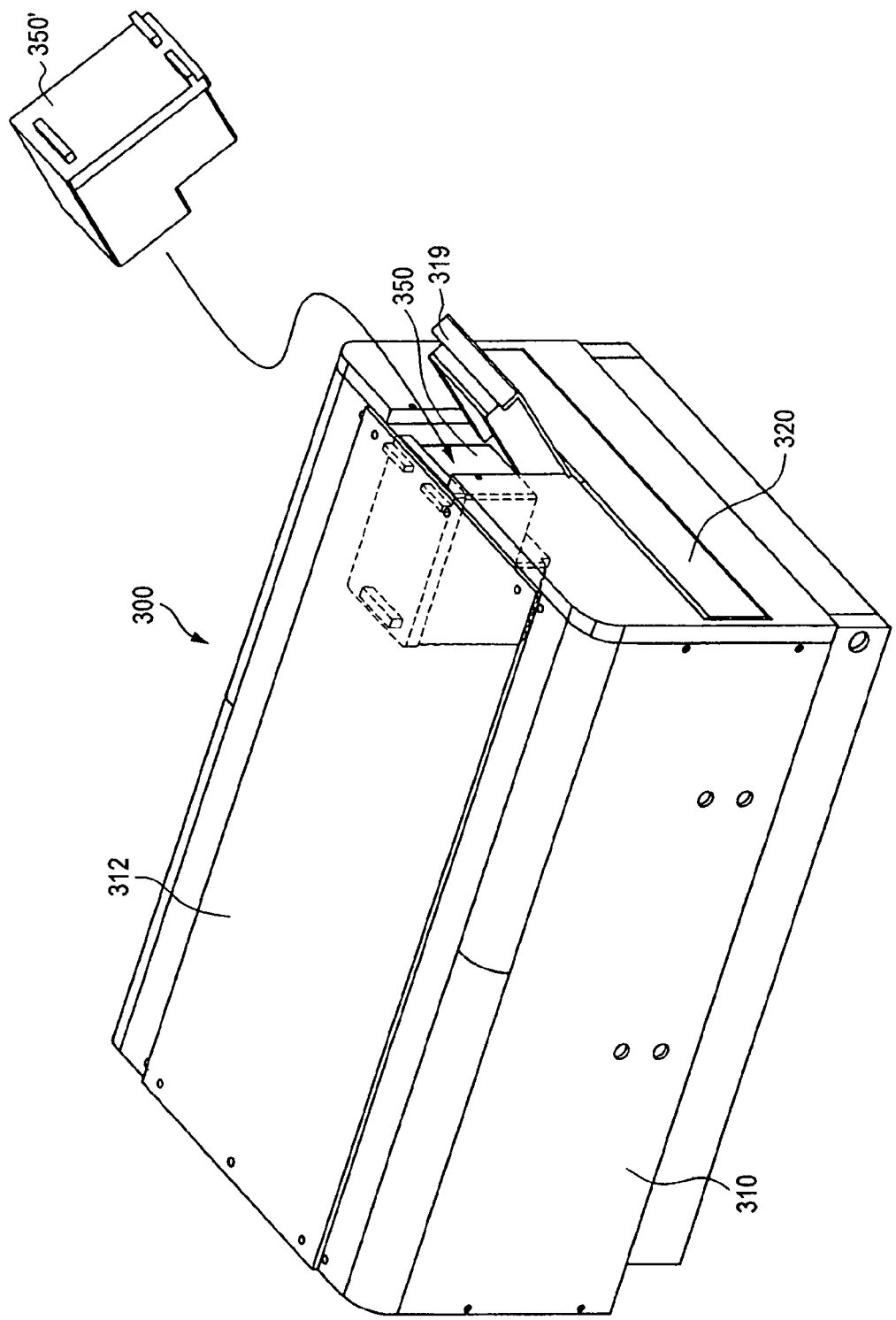
FIG. 27 shows an illustration depicting a method of replacing a print head of an optical disk apparatus according to a third embodiment of an embodiment of the invention.
Figure 28:
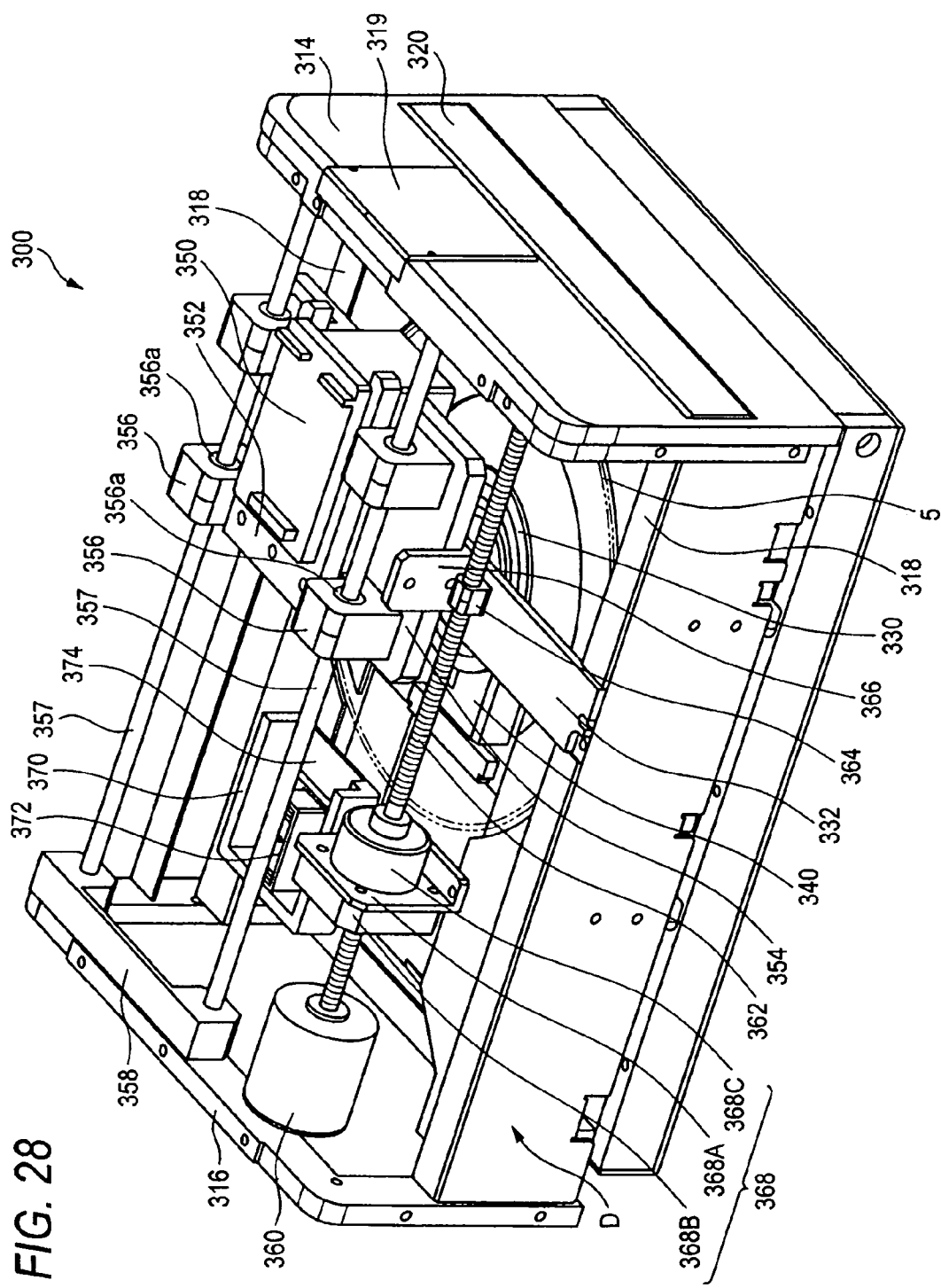
FIG. 28 shows a perspective view depicting the internal configuration of the optical disk apparatus according to the same embodiment.
Figure 29:
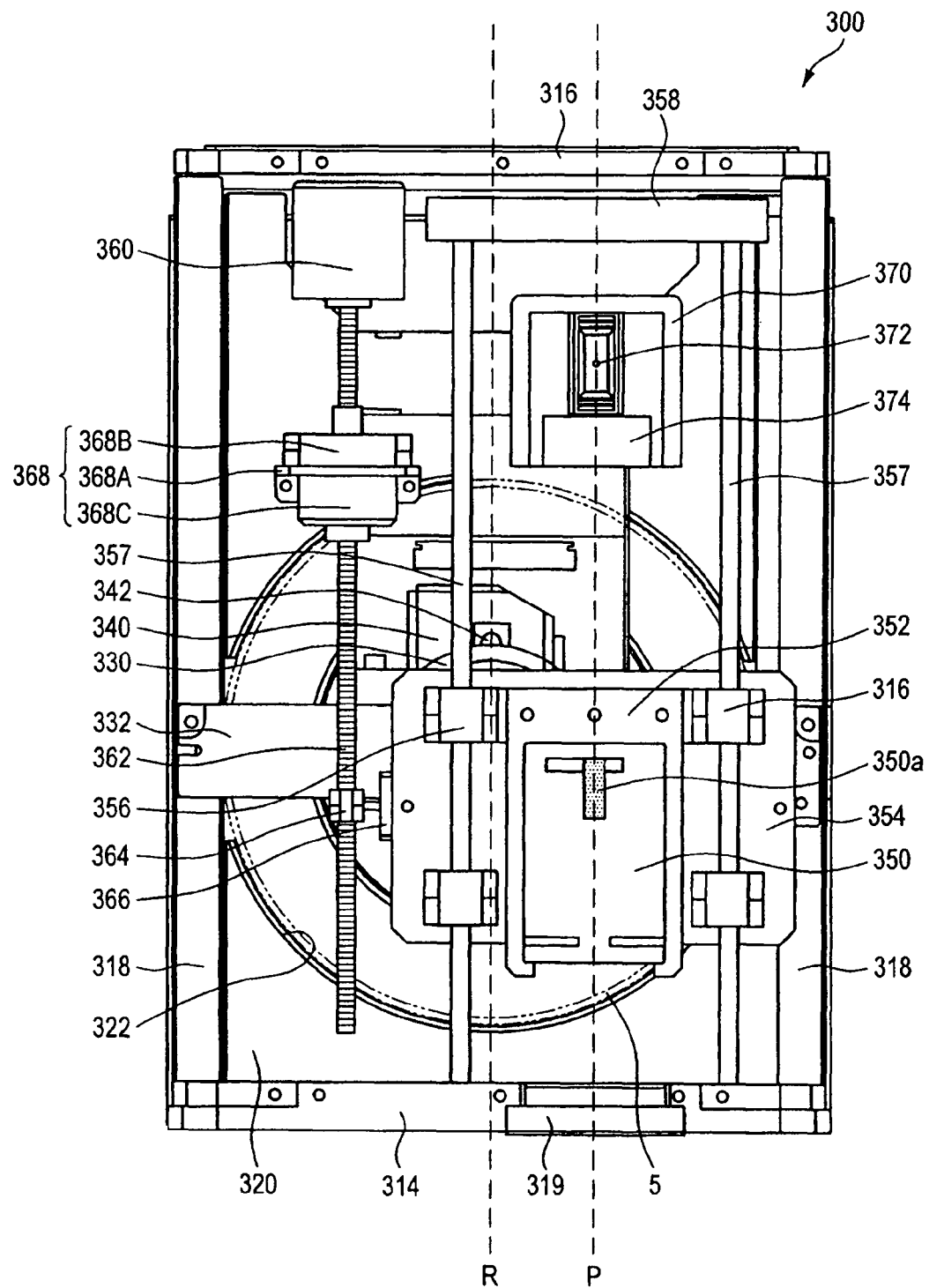
FIG. 29 shows a plan view depicting the internal configuration of the optical disk apparatus according to the same embodiment.
Figure 30:
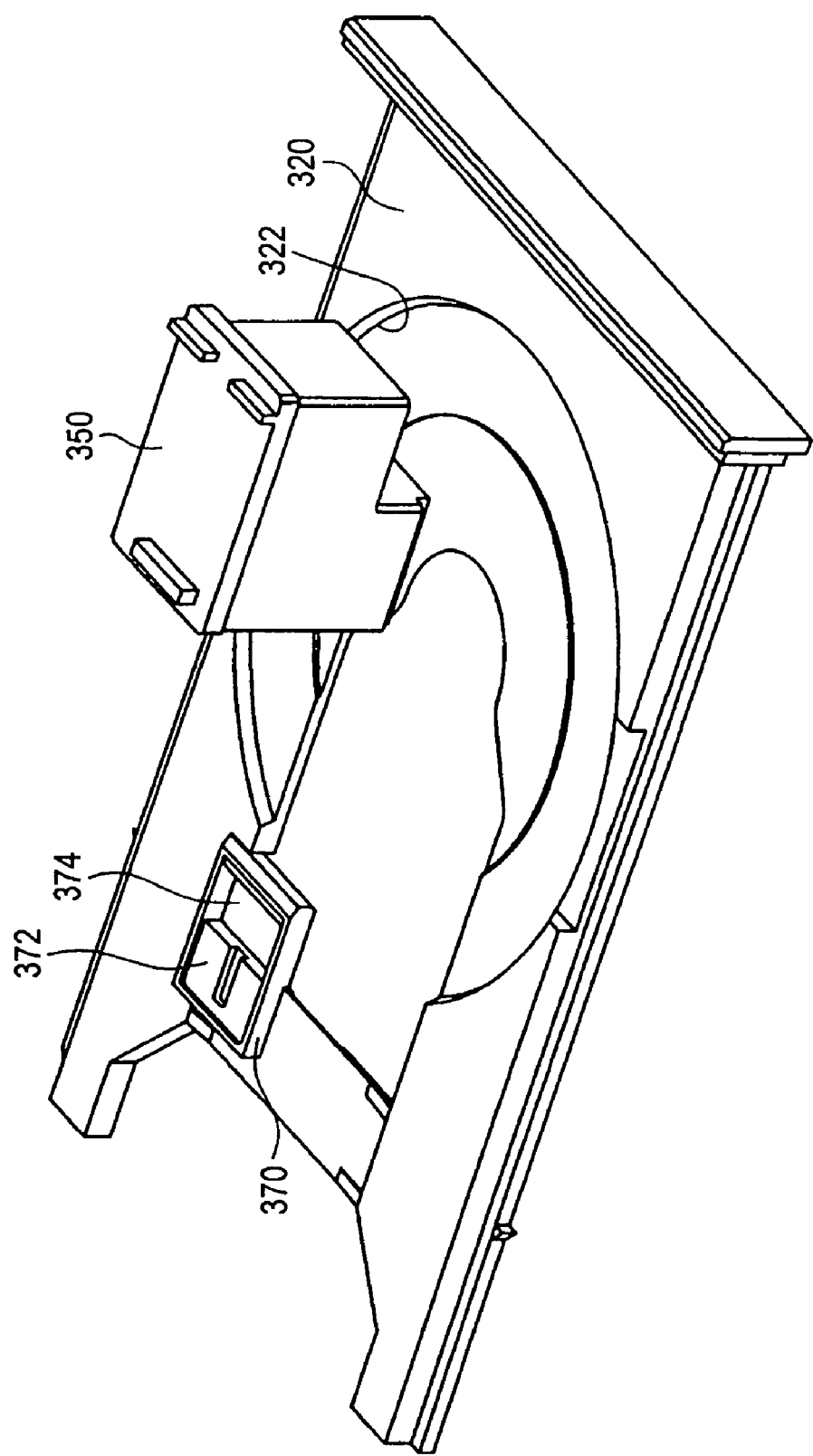
FIG. 30 shows a perspective view depicting the configuration of a tray as a loading unit of the optical disk apparatus according to the same embodiment.

The Configuration and Operation of an Optical Disk Apparatus 300 According to a Third Embodiment Next, the configuration and operation of the optical disk apparatus 300 according to the third embodiment of an embodiment of the invention will be described with reference to FIGS. 26 to 30. In addition, FIG. 26 shows an illustration depicting a method of replacing the print head 750 of the optical disk apparatus 700 before, FIG. 27 shows an illustration depicting a method of replacing a print head 350 of the optical disk apparatus 300 according to the embodiment, FIG. 28 shows a perspective view depicting the internal configuration of the optical disk apparatus 300 according to the embodiment, FIG. 29 shows a plan view depicting the internal configuration of the optical disk apparatus 300 according to the embodiment, and FIG. 30 shows a perspective view depicting the configuration of a tray 320 as a loading unit of the optical disk apparatus 300 according to the embodiment.

Figure 26:
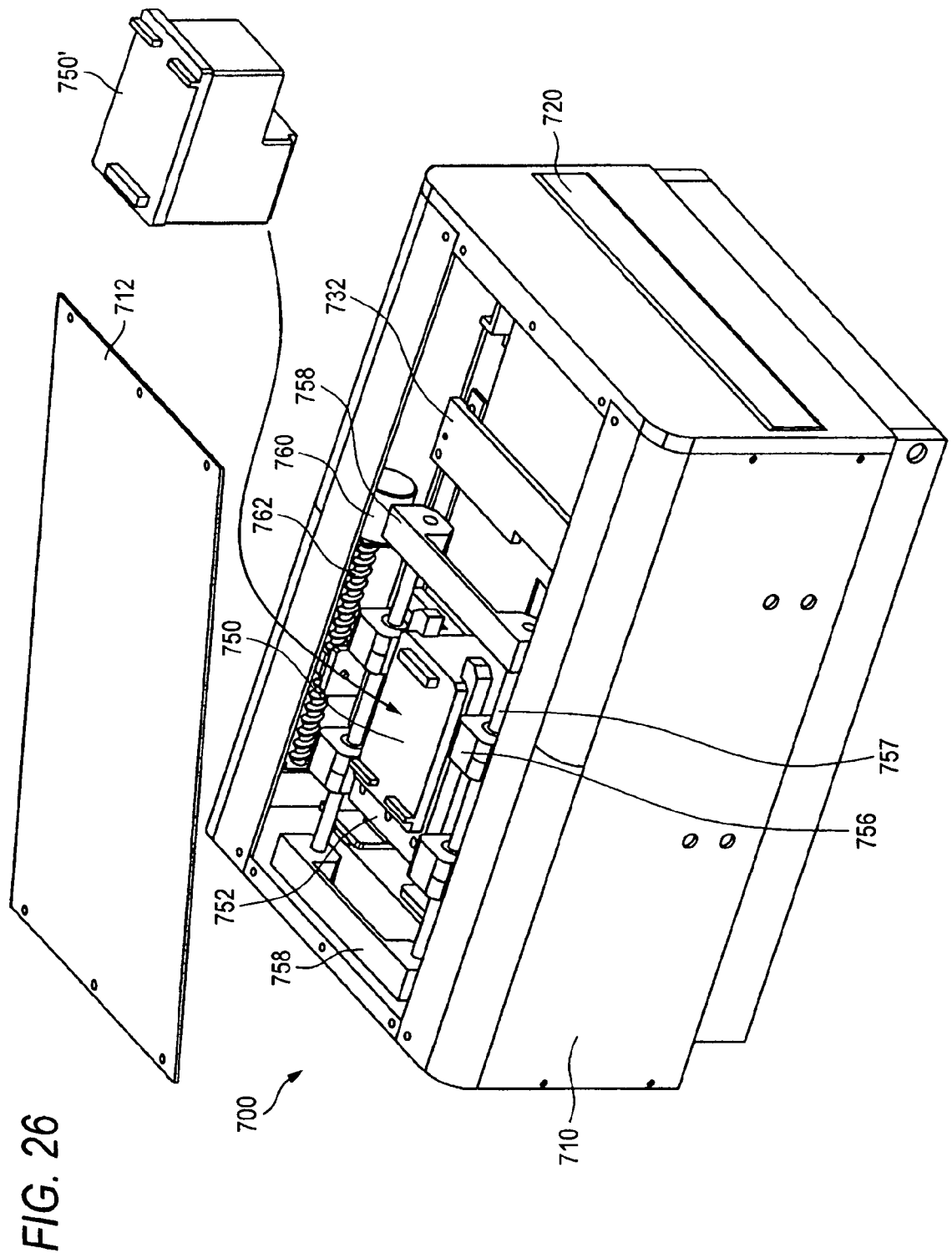
FIG. 26 shows an illustration depicting a method of replacing the print head of the optical disk apparatus before.

First, as shown in FIG. 26, in the optical disk apparatus 700 before, since the print head 750 is moved on the radial axis, it can be moved before the member placed on the radial axis such as the chucking plate (not shown) and the optical pickup (not shown) toward the front surface side of the apparatus. Then, in order to replace the print head 750 it is necessary that the top cover 712 of the housing 710 of the optical disk apparatus 700 is removed, an old print head 750 is removed from above the optical disk apparatus 700, and a new print head 750' is mounted to replace the print head.

Therefore, it is necessary to provide a space for replacing the print head on the top surface side of the optical disk apparatus 700. In addition, in the case in which there is no room for this space, it can be considered to draw the optical disk apparatus 700 frontward, but this is not so preferable because a power source cable, a USB cable for signals and other cables are usually wired on the rear part of the apparatus and it can be considered that cables might be disconnected in drawing the optical disk apparatus 700.

In addition, the discussions of the configuration of the optical disk apparatus 700 before are described above, which are omitted.

On the other hand, as shown in FIGS. 27 to 29, in the optical disk apparatus 300 according to the embodiment, the print head 350 can be moved at the position offset from the radial axis R. Therefore, since the print head 350 does not interfere with the members arranged on the radial axis R such as a chucking plate 330 and an optical pickup 340, the print head 350 can be moved to near a front panel 314 of the optical disk apparatus 300. Then, on the front panel 314, an opening (not shown) is disposed at the position corresponding to the axis P of moving the print head 350, and an openable print head replace cover 319 is provided on the opening, whereby the print head 350 can be replaced from the front surface side of the apparatus without removing a top cover 312 of the optical disk apparatus 300.

In other words, after the print head 350 is moved before the front panel 314 by a print head drive mechanism having a head drive motor 360, as shown in FIG. 27, the print head replace cover 319 is opened to remove an old print head 350 and a new print head 350' is mounted, whereby the print head 350 can be easily replaced from the front surface side of the optical disk apparatus 300. Therefore, it is unnecessary to provide a space for replacing the print head in the upper part of the optical disk apparatus 300 as the manner before, and even though there is no room for this space, it is unnecessary to draw the optical disk apparatus 300 frontward. Particularly, in the print head of the ink jet system, since it is inevitable to replace a print head in association with the maintenance of a clogged head and consumption of ink, it is significantly effective that a print head can be replaced from the front surface side of the apparatus.

In addition, in the configuration of the optical disk apparatus 300 according to the embodiment shown in FIGS. 27 to 29, the configurations other than that of the print head replace cover 319 disposed on the front surface of the apparatus are the same as the configurations of the optical disk apparatus 100 according to the first embodiment described above, omitting the descriptions.

In addition, as shown in FIG. 30, in the optical disk apparatus 300 according to the embodiment, for example, members used for maintenance such as a cap 372 and an ink reservoir 374 are detachably disposed with respect to the tray 320 on the rear side of the tray 320 (on the rear panel 316 side).

As described above, the members used for maintenance such as the cap 372 and the ink reservoir 374 are disposed on the tray 320, whereby the cleaning and maintenance of ink can be performed easily at the same time in drawing the tray 320 for taking out the optical disk 5. Therefore, the configuration of the optical disk apparatus can be simplified as well as the maintenance of the optical disk apparatus can be facilitated to enhance the convenience for users.

Moreover, the members for maintenance such as the cap 372 and the ink reservoir 374 are detachably disposed with respect to the tray 320, whereby the cap 372 and the ink reservoir 374 can be removed for cleaning in drawing the tray 320, and thus such an advantage can be also obtained that the inside of the optical disk apparatus tends to be more protected from contamination than before.

Figure 31:
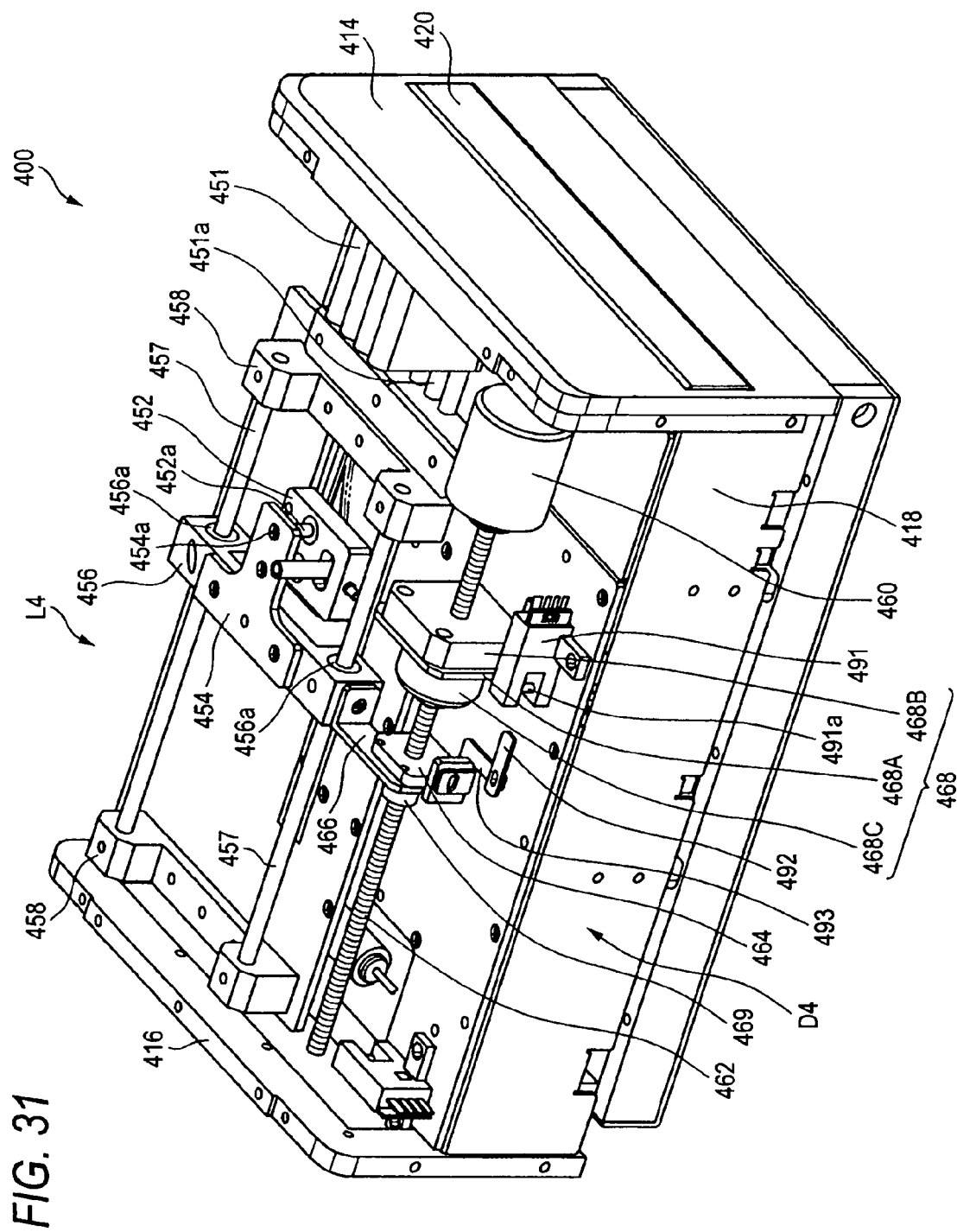
FIG. 31 shows a perspective view depicting the internal configuration of an optical disk apparatus according to a fourth embodiment of an embodiment of the invention.
Figure 32:
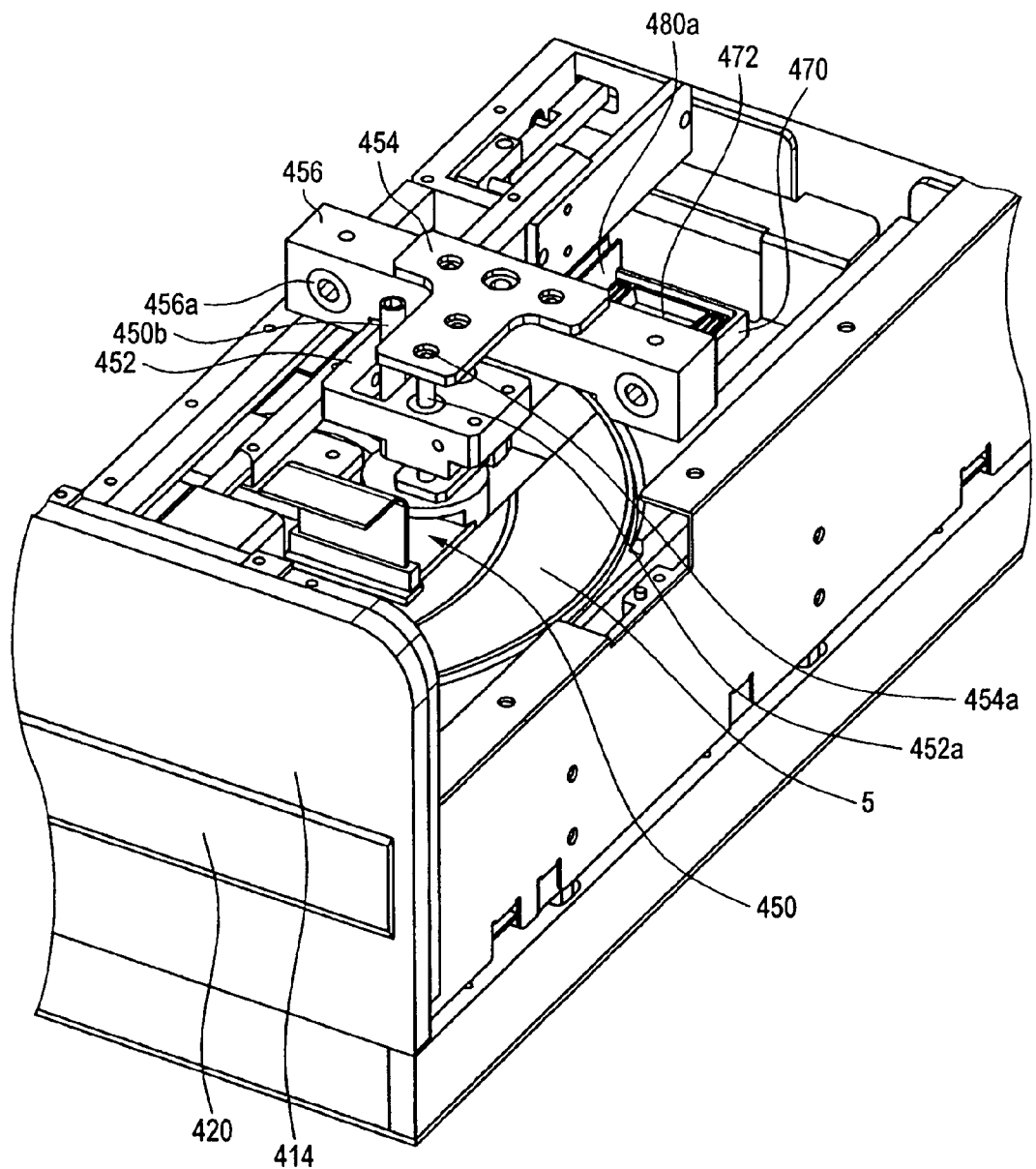
FIG. 32 shows an enlarged perspective view depicting the configuration of the essential part of the optical disk apparatus shown in FIG. 31.
Figure 33:
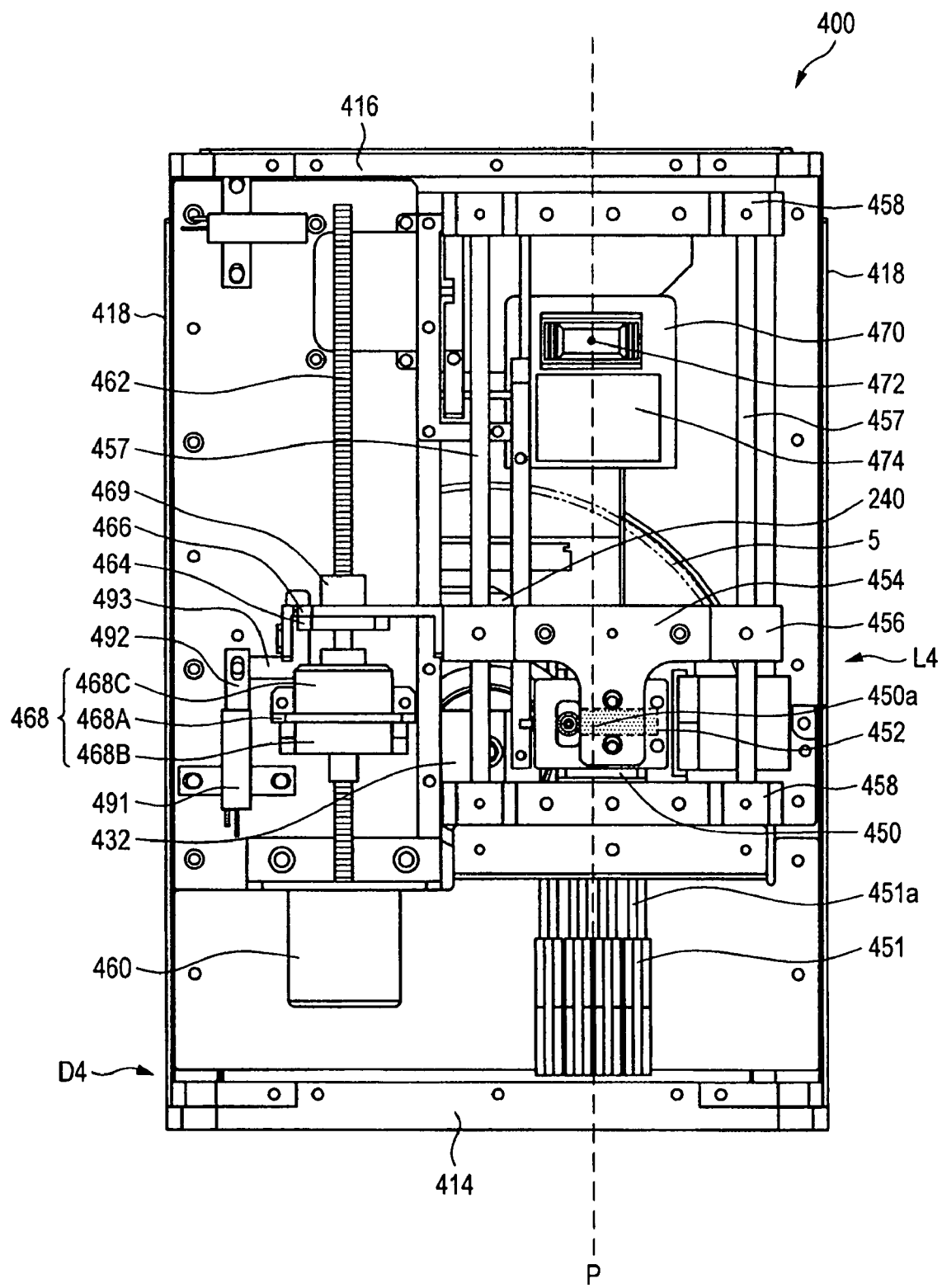
FIG. 33 shows a plan view depicting the internal configuration of the optical disk apparatus according to the same embodiment.
Figure 34:
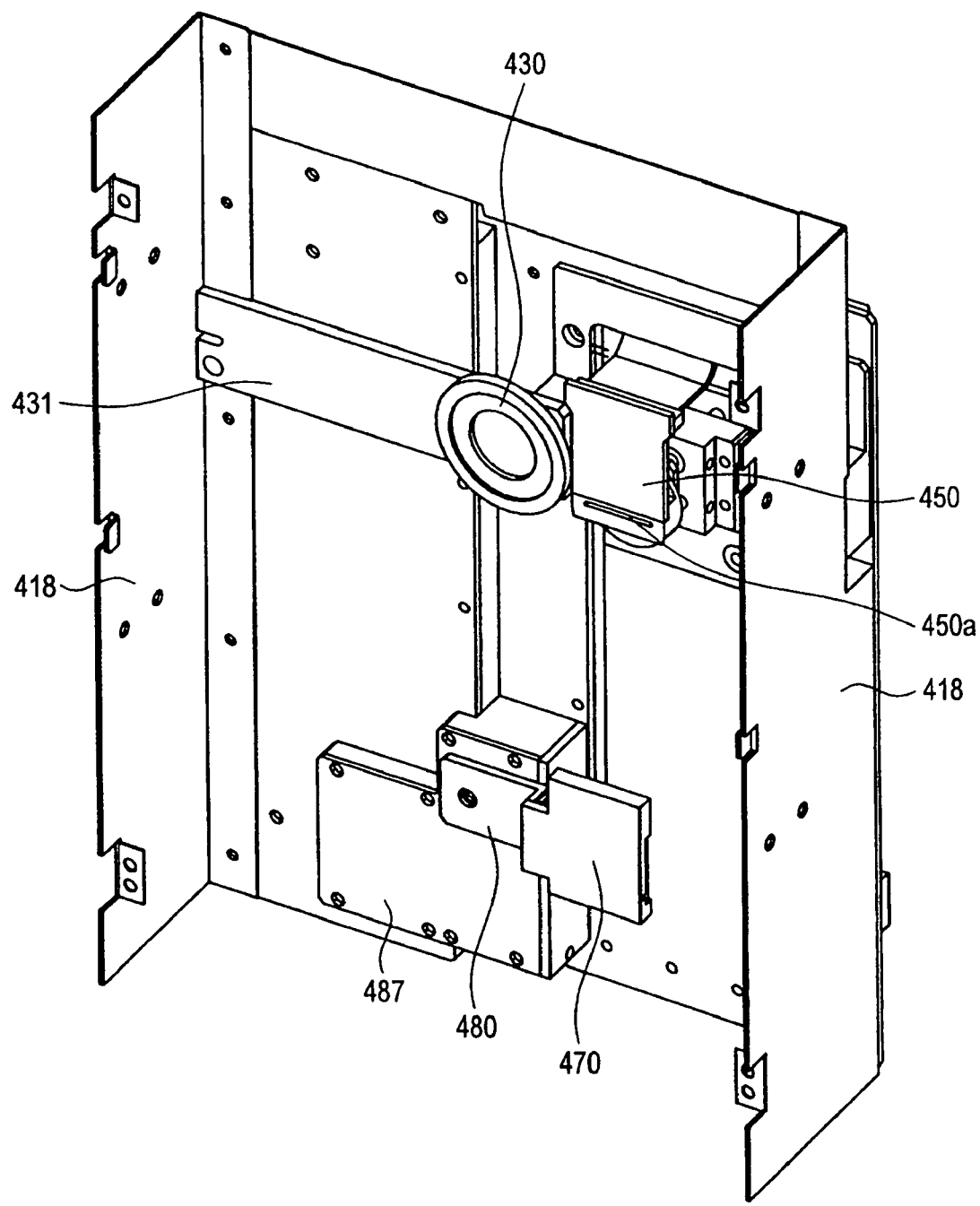
FIG. 34 shows a perspective view depicting the optical disk apparatus according to the same embodiment seen from the under surface side.

The Configuration and Operation of an Optical Disk Apparatus 400 According to a Fourth Embodiment Next, the configuration of the optical disk apparatus 400 according to the fourth embodiment of an embodiment of the invention as an information recording apparatus will be described with reference to FIGS. 31 to 35. In addition, FIG. 31 shows a perspective view depicting the internal configuration of the optical disk apparatus 400 according to the fourth embodiment of an embodiment of the invention, FIG. 32 shows an enlarged perspective view depicting the configuration of the essential part of the optical disk apparatus 400 shown in FIG. 31, FIG. 33 shows a plan view depicting the internal configuration of the optical disk apparatus 400 according to the same embodiment, and FIG. 34 shows a perspective view depicting the optical disk apparatus 400 according to the same embodiment seen from the under surface side.

Here, the optical disk apparatus 700 before and the optical disk apparatus 100, 200 and 300 according to the first to third embodiments described above have problems below that are caused because the longitudinal direction of the print head (the ink discharge part) is matched with the movable direction of the print head (that is, the radial axis R or the direction in parallel with the radial axis R).

In other words, when the longitudinal direction of the print head is matched with the radial axis R on which the print head is movable or in the direction in parallel with the radial axis R, it is possible to effectively use the print width in printing at one step, but areas for the print area are different in printing the outer radial side and in printing the inner radial side, and an area for the print area on the inner radial side is smaller than that on the outer radial side, causing a problem that the dot densities are varied unless otherwise print correction is performed.

In addition, when the print head is arranged so that the longitudinal direction of the print head is matched with the radial axis R or in the direction in parallel with the radial axis R, the longitudinal direction of the print head is in parallel with the movable direction of the print head. Thus, in the case in which a label is printed, it is always necessary to print while the optical disk is being rotated. On this account, since the optical disk is rotated in printing a label, it takes long time in simple printing in the case in which only text information about the descriptions of recorded data is printed on the optical disk, causing a problem that the convenience of the information recording apparatus for users is impaired.

Moreover, in the case in which the longitudinal direction of the print head is matched with the movable direction of the print head, ink discharged from the print head is dried to increase the viscosity for thickening the ink concentration when starting ink discharge because of the influence of a blow generated due to the rotation of the optical disk, which tends to cause streaks along the line along which the print head is moved at the place to start printing to raise a problem that the place becomes more conspicuous than the portions around the place to start printing.

Then, in the optical disk apparatus 400 according to the embodiment, in order to solve the problems above, the print head is moved at the position shifted and offset from the rotational center of the optical disk in the direction in parallel with the radial axis, and the print head is arranged so that the longitudinal direction of the print head is the direction vertical to the radial axis. Hereinafter, the configuration of the optical disk apparatus 400 will be described in detail.

The optical disk apparatus 400 according to the embodiment is an apparatus in which an optical disk 5 as an information recording medium is loaded to print a label on the label surface of the loaded optical disk 5, and the apparatus mainly has a drive part D4 which uses the optical disk 5 to record and reproduce data, and a label printing part L4 which is disposed on the label surface (the printing surface) side on the opposite side of the data recording surface of the optical disk 5, that is, disposed above the drive part D4 and prints a label.

The drive part D4 is placed in the area surrounded by a front panel 414, a rear panel 416, and two side panels 418 and 418, and mainly has a tray 420 which is movably disposed by a predetermined loading mechanism, a chucking plate 430 which is disposed above the center part of a disk mounting part (not shown) of a tray 220, and an optical pickup 440 as an information recording unit disposed below the tray 420 (on the side of the data recording surface of the optical disk 5 which is loaded into the optical disk apparatus 400). In addition, the configuration and operation of the drive part D4 of the optical disk apparatus 400 according to the embodiment are the same as those of the configuration and operation of the drive part D1 of the optical disk apparatus 100 according to the first embodiment, omitting the detailed descriptions here.

The label printing part L4 has a print head 450, a print head moving unit which moves the print head 450 in parallel with the radial direction of the optical disk 5 at the position shifted from the rotational center of the optical disk 5, and a print head maintenance unit which caps and cleans the print head 450.

The print head 450 is disposed on the opposite side of the optical pickup 440 and the optical disk 5 (the label surface side of the optical disk 5), which is configured to move in parallel with the radial direction (the P-axis in FIG. 33) at the position shifted (offset) from a radial axis R. In addition, on the under surface side of the print head 450 (the label surface side of the optical disk 5), an ink discharge part 450a is disposed, in which ink is discharged from an ink discharge part 450a onto the rotating optical disk 5 while the print head 450 is moving on the P-axis in parallel with the radial direction shifted (offset) from the radial axis R, whereby a label can be printed on the label surface of the optical disk 5. In addition, it is the same as the embodiments described above in that preferably, between two areas that are obtained by splitting the area including the optical disk 5 along the direction of moving the optical pickup 440 (that is, in the embodiment, the radial axis R), the print head 450 is placed in the area positioned on the downstream side more than the optical pickup 440 is positioned with respect to the direction of rotating the optical disk 5.

Here, the configuration of the print head 450 according to the embodiment will be described with reference to FIG. 35. In addition, FIG. 35 shows a perspective view depicting the configuration of the print head 450 according to the same embodiment.

Figure 35:
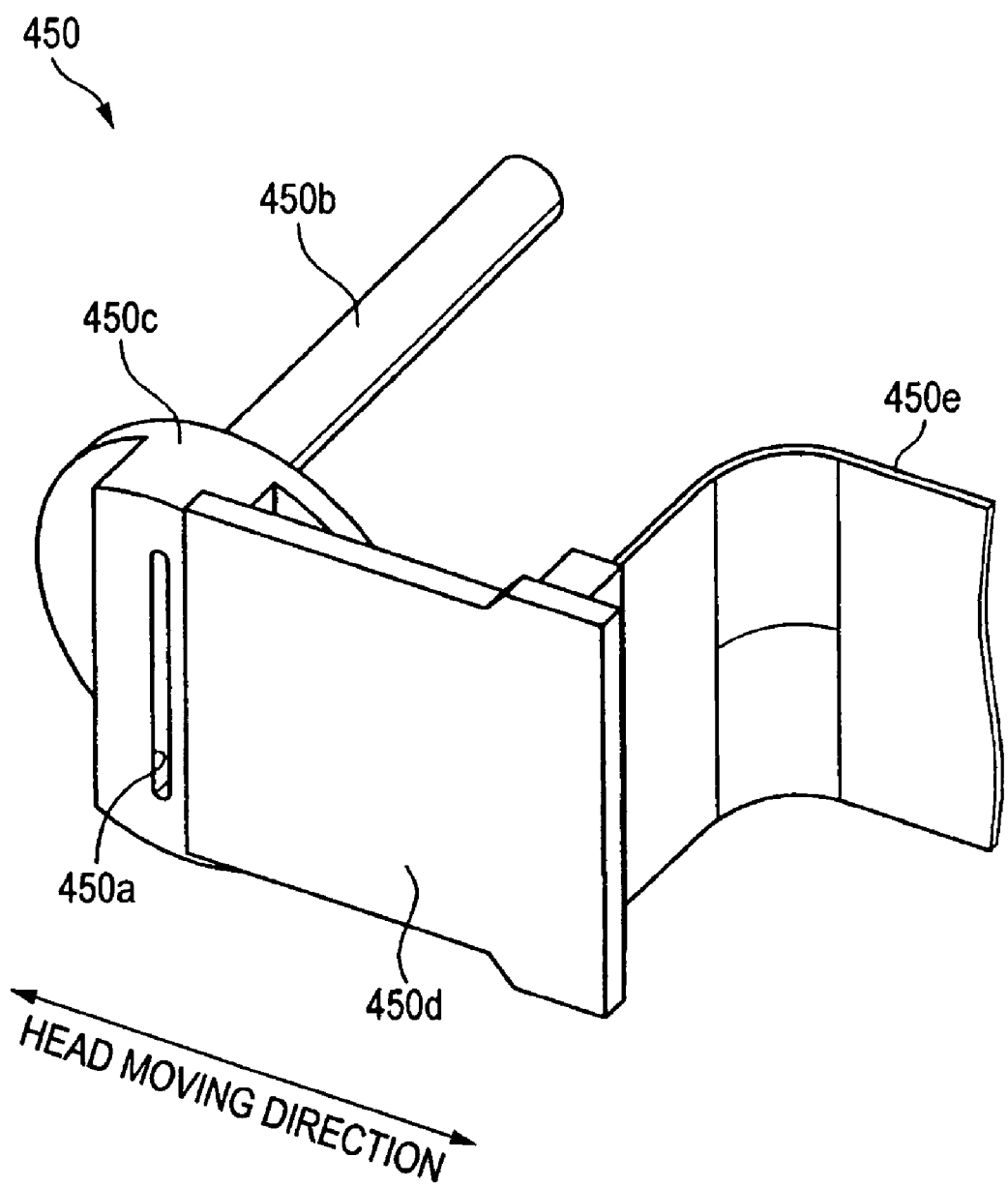
FIG. 35 shows a perspective view depicting the configuration of a print head according to the same embodiment.

As shown in FIG. 35, for example, the print head 450 is formed of an ink discharge part 450a which discharges ink toward the label surface of the optical disk 5, an ink supply tube 450b which supplies ink supplied from an ink tank part 451 through an ink tube 451a, described later, to the print head 450, a joining part 450c which joins the ink supply tube 450b to a print head main body part 450d, and a flexible cable 450e which is disposed on the opposite side of the joining part 450c of the print head main body part 450d.

The ink discharge part 450a is formed as a plurality of nozzles (ink discharge port) in a predetermined direction, for example, on the under surface side of the joining part 450c (on the side opposite to the label surface of the optical disk 5). In the embodiment, the longitudinal direction of the ink discharge part 450a formed as a plurality of the nozzles arranged in this predetermined direction (a predetermined direction in which a plurality of the nozzles is arranged) is matched with the direction vertical to the direction of moving the print head 450 (the direction in parallel with the radial direction). In addition, one end of the ink supply tube 450b communicates with the ink tube 451a, and the other end thereof communicates with the top surface side of the joining part 450c (on the opposite side of the ink discharge part 450a). In addition, at least a part of the inside of the joining part 450c is a hollow to form a passage through which ink passes. The print head main body part 450d is a member nearly in a rectangular plate, in which as described above, one side is joined to the ink supply tube 450b through the joining part 450c, and the other side is joined to the flexible cable 450e through which signals are inputted.

In addition, in the embodiment, as shown in FIGS. 32 and 34, for example, the print head 450 is disposed so that the longitudinal direction of the ink discharge part 450a formed as a plurality of the nozzles arranged in the direction vertical to the radial direction of the optical disk 5 on the under surface side of the print head 450 is vertical to the direction of moving the print head 450 on the P-axis in parallel with the radial axis. Thus, as described later, since areas for the print area can be the same in printing the outer radial side and in printing the inner radial side, it is unnecessary to perform print correction. In addition, since it is unnecessary to associate the rotation of the optical disk 5 in printing a label, the print speed is significantly improved in the case of simple printing of text. Moreover, since the portion at which starts printing is a sheet shape, not lines, streaks at the portion at which starts printing become inconspicuous.

In addition, as similar to the case of the optical disk apparatus 200 according to the second embodiment described above, the print head 450 according to the embodiment is disposed as detachable from the ink tank part 451, in which only the print head 450 is movable at the position shifted from the rotational center of the optical disk 5 in parallel with the radial direction while the position of the ink tank part 451 remains fixed to the front surface side of the optical disk apparatus 400. In the embodiment, the ink tank part 451 has the structure in which ink cartridges having ink of four colors, Y (yellow), M (magenta), C (cyan), and K (black), are arranged side by side, and each of the ink cartridges is joined to ink tubes 451a (four tubes in total). Ink is supplied from the ink tubes 451a to the print head 450 in printing a label.

In addition, the print head 450 is held from above by a print head holder 452 nearly in a rectangular parallelepiped. The print head holder 452 has two head elevating shafts 452a, in which the two head elevating shafts 452a are fit into two through holes 454a formed in a head supporting plate 454 nearly in a T-shape, and the upper part is fixed by a fastening screw (not shown). The head elevating shaft 452a guides the movement of the print head 450 in the vertical direction. On the under surface side of the head supporting plate 454, a head drive bearing member 456 is disposed which is extended laterally (in the direction vertical to the radial direction), and a bearing (linear bearing) 456a is provided to each of the both lateral ends of the head drive bearing member 456. The bearing 456a penetrates through in the direction in parallel with the radial direction, and two head drive shafts 457 are disposed which are arranged almost in parallel with each other (in parallel with the radial direction) so as to penetrate through the inner radius of the bearing 456a. The both ends of the two head drive shafts 457 are supported by identical shaft support members 458. In addition, the detailed configuration of the print head holder 452 is the same as the case of the second embodiment described above, omitting the descriptions.

The print head moving unit is mainly configured of a head drive motor 460, a ball screw 462 which is joined to the head drive motor 460, a ball screw nut 464 through which the ball screw 462 is inserted, a joining member 466 which joins the ball screw nut 464 to a head drive bearing member 456, a ball screw support member 468 which is disposed in the midway part of the ball screw 464, and limit sensors 491 and 494.

The head drive motor 460 rotates the ball screw 462 with its power. The ball screw 462 is extended in the direction in parallel with the radial direction, and the ball screw nut 464 is configured to move in the direction in parallel with the radial direction by the rotation of the ball screw 462. The joining member 466 joins the ball screw nut 464 to the head drive bearing member 456 to move the head drive bearing member 456 in the direction in parallel with the radial direction at the position shifted (offset) from the rotational center of the optical disk 5 in association with the movement of the ball screw nut 464.

The ball screw support member 468 is a member which supports the ball screw 462, formed of a ball screw supporting plate 468A, and ball screw support units 468B and 468C in which a bearing (not shown) is incorporated. In the embodiment, the ball screw support units 468B and 468C are configured in one piece. After the ball screw 462 is fit into the ball screw support units 468B and 468C through the bearing, it is clamped by a nut, not shown.

In addition, in the optical disk apparatus 400 according to the embodiment, for example, the movement of the print head 450 in the radial direction can be controlled by the limit sensor 491. More specifically, for example, the limit sensor 491 is configured as an optical sensor nearly in a U-shape, having a light emitting device and a light receiving device (not shown). The light emitting device and the light receiving device are disposed as facing to each other, in which the light emitted from the light emitting device passes through a recessed part 491a vertically, and received by the light receiving device. On the other hand, on the joining member 466 of the print head moving unit, a limit sensor light shielding plate 492 is disposed through a light shielding plate support member 493 nearly in an L-shape. In addition, for the position at which the limit sensor 491 is arranged, it is the same as that in the embodiments described above, omitting the detailed descriptions here.

Although not shown in FIG. 31, as shown in FIGS. 32 to 34, the print head maintenance unit has a cap accommodating part 470 which accommodates a cap 472 and an ink reservoir 474. The cap 472 is used not to dry the print head, and the ink discharge part 450a of the print head 450 is capped by the cap 472 during the standby for printing. In addition, for example, in order to prevent such a print error that the ink discharge part 450a is clogged and ink is not discharged, the ink reservoir 474 is a place at which ink is discharged on purpose so that air does not enter the print head 450 (ink is discharged from the ink discharge part 450a without printing a label). The cap accommodating part 470 which accommodates the cap 472 and the ink reservoir 474 is disposed on the rear side (the rear panel 416 side) of the optical disk apparatus 400 on the opposite side of the eject side (the side of taking out the disk) of the optical disk 5.

Here, since the print head 450 is not arranged on the radial axis, the cap accommodating part 470 including the cap 472 and the ink reservoir 474 is also placed at the position shifted (offset) from the radial axis. Thus, the optical disk apparatus 400 can be reduced in size, as similar to the case of the optical disk apparatus 100 according to the first embodiment.

In addition, as shown in FIG. 34, the optical disk apparatus 400 has a wiper 480 which is supported by a wiper part supporting plate 487, as an exemplary cleaning mechanism for the ink discharge part 450a of the print head 450, and as shown in FIG. 32, a wiper head 480a is disposed at the tip end part of the wiper 480. The other configurations and operations of the wiper 480 are the same as the case of the second embodiment described above, omitting the detailed descriptions here.

Figure 37A:
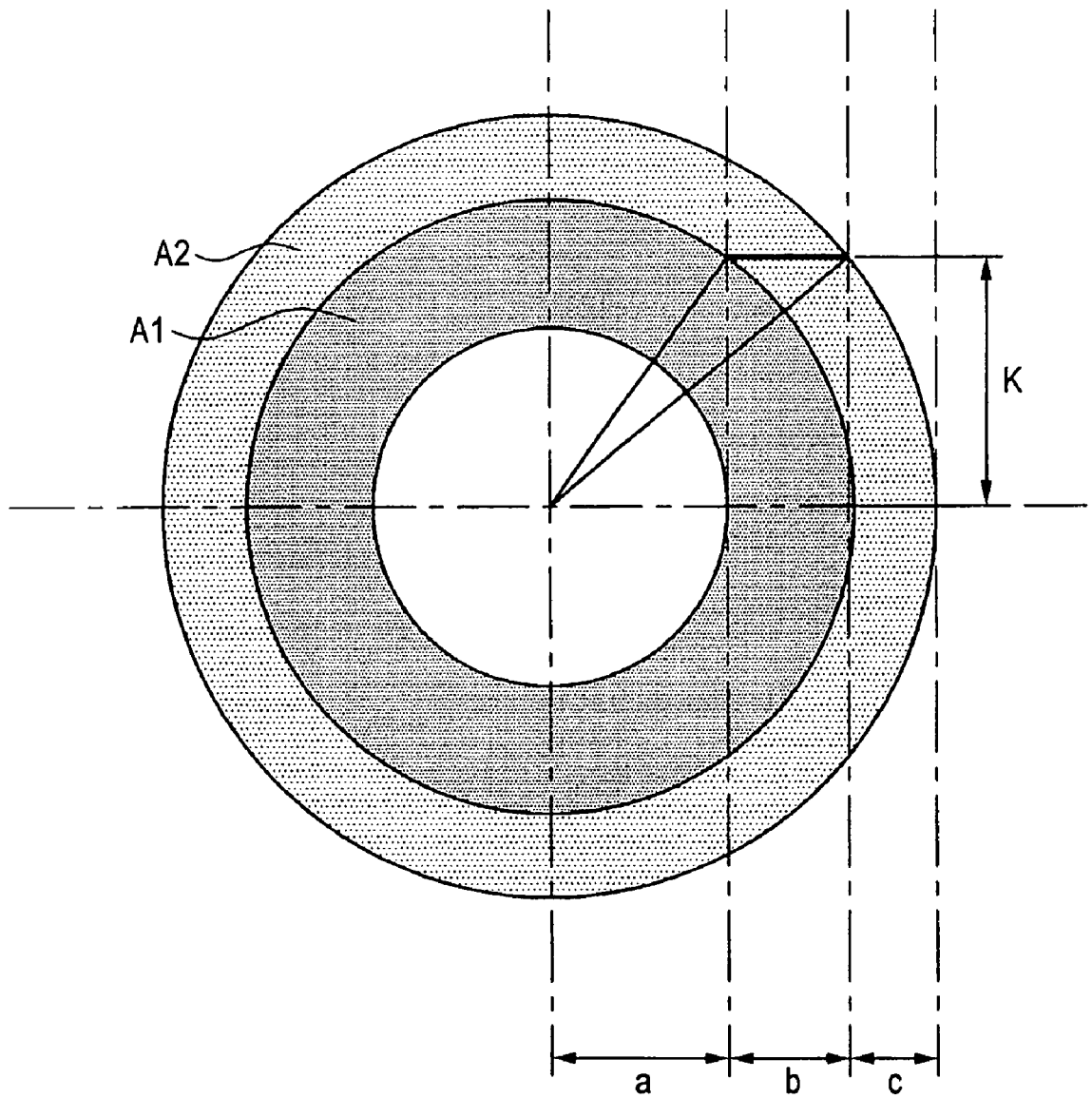
FIG. 37A shows an illustration depicting that areas for the print area become the same in printing the outer radial side and the inner radial side of the optical disk according to the fourth embodiment of an embodiment of the invention.
Figure 37B:
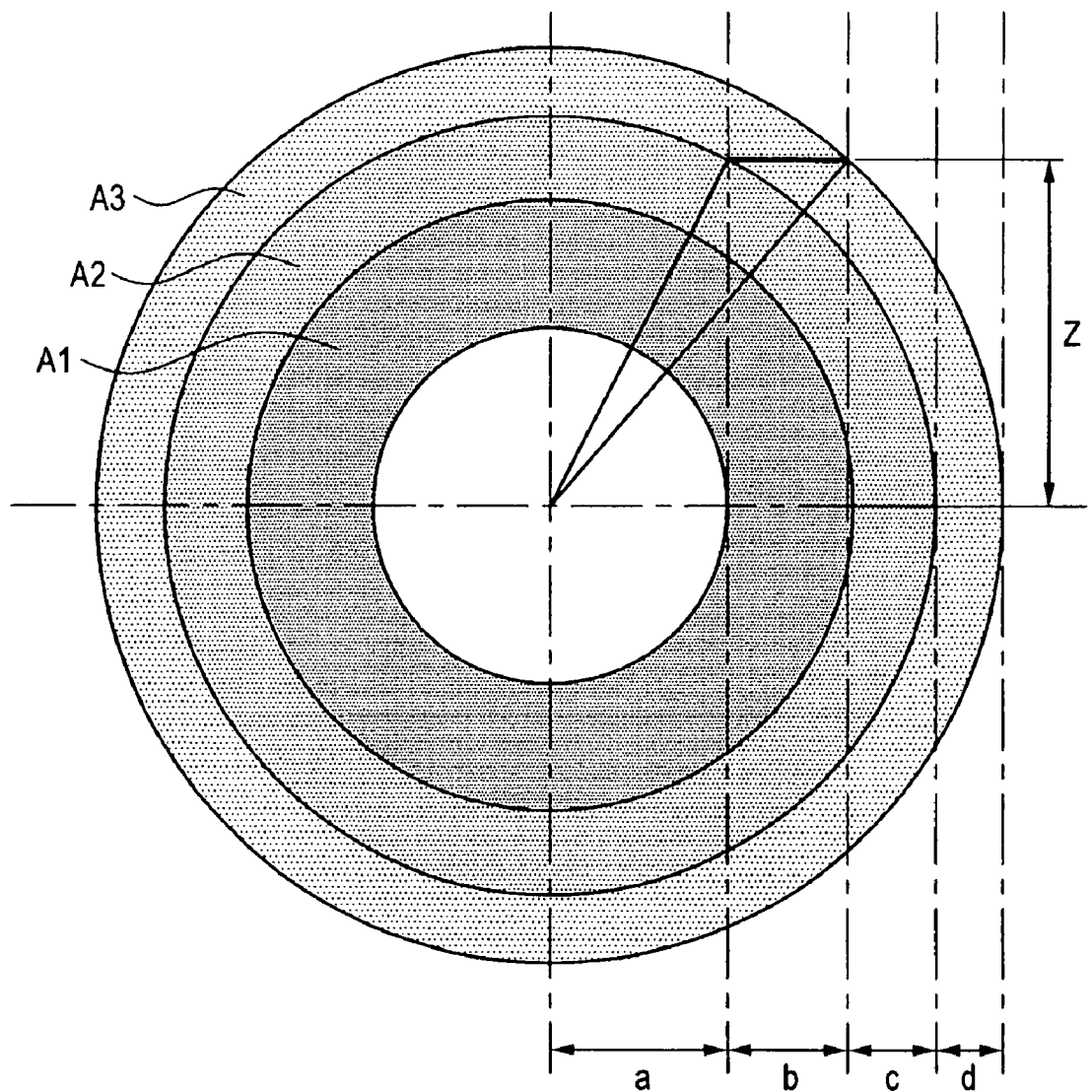
FIG. 37B shows an illustration depicting that areas for the print area become the same in printing the outer radial side and the inner radial side of the optical disk according to the same embodiment.

As described above, the configuration of the optical disk apparatus 400 has been described. Next, the operation of the label printing part L4 of the optical disk apparatus 400 having this configuration will be described with reference to FIGS. 36A to 36C, 37A and 37B. Here, FIGS. 36A to 36C show an illustration depicting exemplary movements of the print head in the case in which a label is printed, FIG. 36A shows the case in which a label is printed by the print head 750 before, FIG. 36B shows the case in which a label is printed by the print head 150 according to the first embodiment of an embodiment of the invention, and FIG. 36C shows the case in which a label is printed by the print head 450 according to the embodiment. In addition, FIGS. 37A and 37B show an illustration depicting that areas for the print area become the same in printing the outer radial side of the optical disk 5 and in printing the inner radial side. In addition, in the discussion below, the overlapping descriptions of the same operations as those described above in the optical disk apparatus 100, 200 and 300 according to the first to third embodiments are omitted. In addition, in the discussion below, as an exemplary optical disk apparatus in which the print head is moved at the position offset from the rotational center of the disk, the optical disk apparatus 100 according to the first embodiment is taken and described as an example, and the cases of the second and third embodiments are the same.

As described above, in the optical disk apparatus 700 before described above and the optical disk apparatus 100 according to the first embodiment, when the longitudinal direction of the ink discharge parts 750a and 150a of the print heads 750 and 150 is matched with the radial axis or the direction in parallel with the radial axis in which the print heads 750 and 150 are moved, areas for the print area are different in printing the outer radial side and in printing the inner radial side, and an area for the print area on the inner radial side is smaller than that on the outer radial side.

First, as shown in FIG. 36A, in the optical disk apparatus 700 before, since the print head 750 is moved on the radial axis, suppose the print width for a single time is the same (in the embodiment, the width in the radial direction in the print area for a single step), an area to be printed by a single step (in the case of the embodiment, a single discharge of ink) becomes smaller as the head more goes to the inner radial side of the optical disk 5. Therefore, in the case in which the timing for ink discharge is the same, the print density becomes higher in the inner radial side of the optical disk 5, and the print density becomes denser near the inner radius of the optical disk 5, but a print is made in thinner print density near the outer radius. Then, in this case, it is necessary that such print correction is performed that the print density is more roughened near the inner radius than that of the outer radius to make the dot density equal. In other words, in the configuration of the optical disk apparatus 700 before, it is difficult to fully exploit the performance of the print head 750.

In addition, as shown in FIG. 36B, in the optical disk apparatus 100 according to the first embodiment of an embodiment of the invention, the print head 150 is moved at the position offset from the rotational center of the optical disk 5 in the direction in parallel with the radial axis. In this case, as similar to the optical disk apparatus 700 before, an area to be printed by a single step becomes smaller as the head more goes to the inner radial side of the optical disk 5. Moreover, since the print width for a single time becomes narrower as the head goes to the inner radial side, the degree of shrinkage of the area is more noticeable than the case of the optical disk apparatus 700 before. Therefore, also in this case, it is necessary that such print correction is performed that the print density is more roughened near the inner radius than that of the outer radius to make the dot density equal.

On the other hand, as shown in FIG. 36C, in the optical disk apparatus 400 according to the embodiment, the print head 450 is moved at the position offset from the rotational center of the optical disk 5 in the direction in parallel with the radial axis, and the longitudinal direction of the ink discharge part 450a of the print head 450 is vertical to the radial axis (the direction of moving the print head 450). Thus, in this case, the print width for a single time becomes wider as the head more goes to the inner radial side, and the area to be printed by a single step is equal on the inner radial side of the optical disk 5 and on the outer radial side.

Here, the reason why the areas to be printed by a single step are equal in the optical disk apparatus 400 will be described with reference to FIGS. 37A and 37B. Before the discussion for the reason, Table 1 shows exemplary computations by the inventors for the area to be printed by a single step below.

TABLE 1

| Head width mm | Offset mm | | Outer radius mm | Inner radius mm | Print area mm² | Area ratio % |
|---|---|---|---|---|---|---|
| Case 1 | 13.6 | 0.0 | The head is on the radial axis | | | |
| | | Area 1 | 58.0 | 44.4 | 4,375 | 45.4 |
| | | Area 2 | 44.4 | 30.8 | 3,213 | 33.3 |
| | | Area 3 | 30.8 | 17.2 | 2,051 | 21.3 |
| | | Print area | 40.8 | | 9,639 | 100.0 |
| Case 2 | 13.6 | 20.0 | The orientation of the head is in parallel with the radial axis | | | |
| | | Area 1 | 58.0 | 45.4 | 4,082 | 43.8 |
| | | Area 2 | 45.4 | 33.8 | 2,905 | 31.2 |
| | | Area 3 | 33.8 | 24.2 | 1,743 | 18.7 |
| | | Area 4 | 24.2 | 20.0 | 581 | 6.2 |
| | | Print area | 38.0 | | 9,312 | 100.0 |
| Case 3 | 13.6 | 20.0 | The orientation of the head is vertical to the radial axis (1) | | | |
| | | Area 1 | 57.6 | 50.9 | 2,290 | 25.0 |
| | | Area 2 | 50.9 | 43.1 | 2,290 | 25.0 |
| | | Area 3 | 43.1 | 33.6 | 2,290 | 25.0 |
| | | Area 4 | 33.6 | 20.0 | 2,290 | 25.0 |
| | | Print area | 37.6 | | 9,160 | 100.0 |
| Case 4 | 17.5 | 20.0 | The orientation of the head is vertical to the radial axis (2) | | | |
| | | Area 1 | 58.5 | 49.1 | 3,161 | 33.3 |

TABLE 1-continued

| Head width mm | Offset mm | | Outer radius mm | Inner radius mm | Print area mm² | Area ratio % |
|---|---|---|---|---|---|---|
| | | Area 2 | 49.1 | 37.5 | 3,161 | 33.3 |
| | | Area 3 | 37.5 | 20.0 | 3,161 | 33.3 |
| | | Print area | 38.47 | | 9,484 | 100.0 |
| Case 5 | 10.0 | 20.0 | The orientation of the head is vertical to the radial axis (3) | | | |
| | | Area 1 | 58.3 | 53.9 | 1,571 | 16.7 |
| | | Area 2 | 53.9 | 49.0 | 1,571 | 16.7 |
| | | Area 3 | 49.0 | 43.6 | 1,571 | 16.7 |
| | | Area 4 | 43.6 | 37.4 | 1,571 | 16.7 |
| | | Area 5 | 37.4 | 30.0 | 1,571 | 16.7 |
| | | Area 6 | 30.0 | 20.0 | 1,571 | 16.7 |
| | | Print area | 38.31 | | 9,425 | 100.0 |

In Table 1, Case 1 is an example corresponding to the case of the optical disk apparatus 700 before (see FIG. 36A), Case 2 is an example corresponding to the case of the optical disk apparatus 100 according to the first embodiment of an embodiment of the invention (see FIG. 36B), and Cases 3 to 5 are examples corresponding to the case of the optical disk apparatus 400 according to the embodiment (see FIG. 36C for Case 3). In Cases 3 to 5, as described in Table 1, the width (mm) of the print head 450 in the longitudinal direction is varied, and the ink discharge part is that having about 300 to 400 ink discharge nozzles arranged in a line. In addition, for the offset amount, in Cases 1 and 2, it is the distance (mm) in the tangential direction from the radial axis of the optical disk 5 to the center of the print head 450, and in Cases 3 to 5, it is the distance (mm) in the tangential direction from the radial axis of the optical disk 5 to the left end of the ink discharge part 450a (the end part close to the radial axis).

As shown in Table 1, in Case 1, the area ratio of the print area is Area1:Area2:Area3=45.4%:33.3%:21.3%, and in Case 2, it is Area1:Area2:Area3:Area4=43.8%:31.2%:18.7%:6.2%. As described above, in Cases 1 and 2, an area for the print area becomes smaller as the head more goes to the inner radial side of the optical disk 5. Particularly, in Case 2, the reduced amount of an area for the print area is noticeable. On the other hand, in Cases 3 to 5, although the number of times of print (the number of the print areas) is different because the width of the print head 450 is varied, in any of the cases, it is revealed that an area for the print area is not different on the inner radial side of the optical disk 5 and on the outer radial side, and the area is the same in all the print areas. Therefore, in Cases 3 to 5, it is revealed that suppose the timing for ink discharge is the same, uniform print density can be obtained with no dot correction.

For theoretical confirmation, first, as shown in FIG. 37A, suppose the area printed by a first time print is A1, and the area printed by a second time print is A2 (a thick solid line shown in FIG. 37A denotes the position of the print head 450 to start the second time print). As shown in FIG. 37A, suppose the offset amount of the print head 450 is a, the width of the print head 450 is b, the print width at the second time print is c, and the position of the print head 450 in the radial direction to start the second time print is k, the space SA1 of the print area A1 is:

$$S_{A1} = \pi \times (a+b)^2 - \pi \times a^2$$

and, the space SA2 of the print area A2 is:

$$S_{A2} = \pi \times (a+b+c)^2 - \pi \times (a+b)^2 \quad (1)$$

Moreover, from the Pythagorean theorem, the following is held:

$$a^2+k^2=(a+b)^2 \quad (2)$$

$$(a+b)^2+k^2=(a+b+c)^2 \quad (3)$$

Equations (2) and (3) are substituted into Equation (1), and then the following is obtained:

$$\begin{aligned} S_{A2} &= \pi \times (a+b+c)^2 - \pi \times (a+b)^2 \\ &= \pi \times ((a+b)^2 + k^2) - \pi \times (a^2 + k^2) \\ &= \pi \times (a+b)^2 - \pi \times a^2 \\ &= S_{A1} \end{aligned}$$

Similarly, as shown in FIG. 37B, suppose the area printed by a third time print is A3, the print width of the third time print is d, and the position of the print head 450 in the radial direction to start the third time print is z, the space SA3 of the print area A3 is:

$$S_{A3} = \pi \times (a+b+c+d)^2 - \pi \times (a+b+c)^2 \quad (4)$$

and, from the Pythagorean theorem, the following is held:

$$a^2+z^2=(a+b+c)^2 \quad (5)$$

$$(a+b)^2+z^2=(a+b+c+d)^2 \quad (6)$$

Equations (5) and (6) are substituted into Equation (4), and then the following is obtained:

$$\begin{aligned} S_{A3} &= \pi \times (a+b+c+d)^2 - \pi \times (a+b+c)^2 \\ &= \pi \times ((a+b)^2 + z^2) - \pi \times (a^2 + z^2) \\ &= \pi \times (a+b)^2 - \pi \times a^2 \\ &= S_{A1} \end{aligned}$$

Similarly, suppose the area printed by an n-th time print is An, the following is obtained:

$$S_{A1}=S_{A2}=S_{A3}=\ldots=S_{An}$$

As described above, the longitudinal direction of the ink discharge part 450a of the print head 450 is the direction vertical to the direction of moving the print head 450, whereby the space of all the areas to be printed by a single step is identical. Then, suppose an area for the print area is identical and the timing for ink discharge is the same, the print density is also the same. In other words, in the case of the optical disk apparatus 400 according to the embodiment, as different from the apparatus before and the embodiments described above, a uniform print can be made with no dot correction. Therefore, in the embodiment, the performance of the print head 450 can be fully exploited.

In addition, when the timing for ink discharge is adjusted depending on the area ratio of the print area, that is, in the optical disk apparatus 700 before (FIG. 36A) and the optical disk apparatus 100 according to the first embodiment of an embodiment of the invention (FIG. 36B), when the discharge on the outer radial side of the optical disk 5 is delayed depending on the print space, a uniform print can be made with no dot correction (concentration correction). However, in order to fully exploit the performance of the print head, it is necessary to set the fastest timing for ink discharge. From the viewpoint, the optical disk apparatus 400 according to the embodiment (FIG. 36C) is most preferable.

Next, the effect of reducing streaks at the place to start printing in the case in which a label is printed by the optical disk apparatus 400 according to the embodiment will be described with reference to FIGS. 38A and 38B. In addition, FIGS. 38A and 38B show photographs comparing an exemplary state of the label surface after a label is printed in the embodiment (FIG. 38B) with an exemplary state of the label surface after a label is printed in the first embodiment of an embodiment of the invention (FIG. 38A).

Figure 38A:
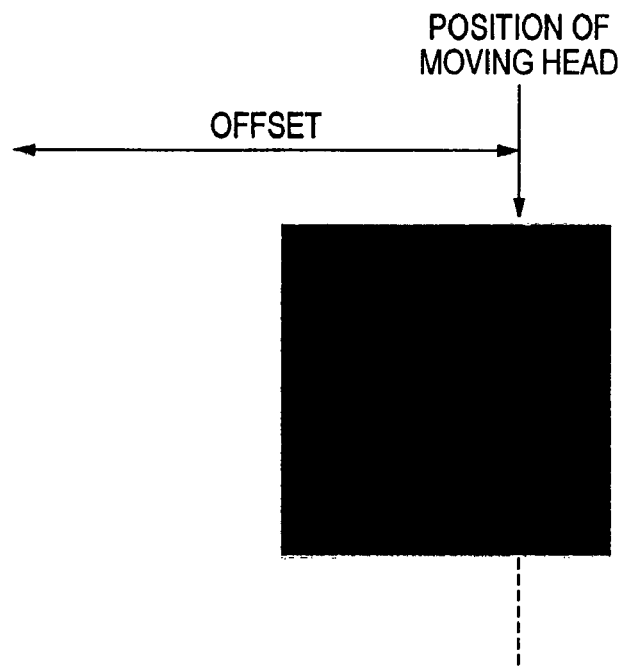
FIGS. 38A and 38B show photographs comparing an exemplary state of the label surface after a label is printed in the same embodiment with an exemplary state of the label surface after a label is printed in the first embodiment of an embodiment of the invention.
Figure 38B:
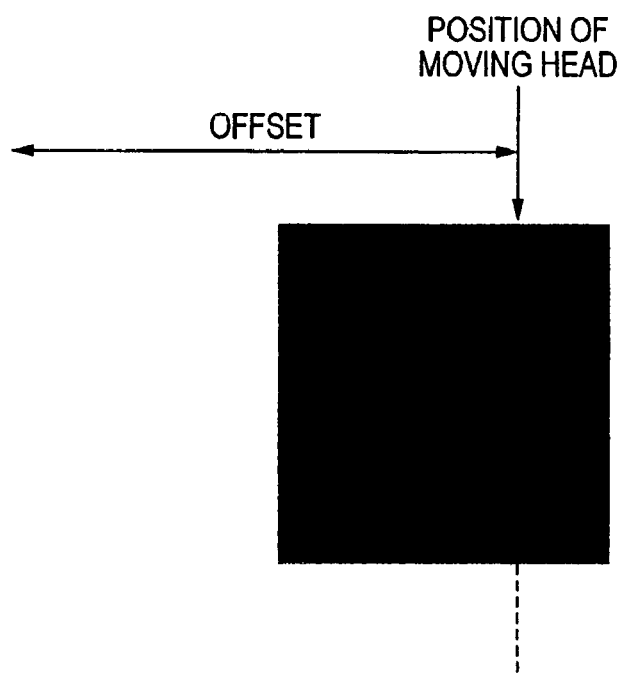

As shown in FIG. 38A, in the case in which a label is printed by using the optical disk apparatus 100 according to the first embodiment in which the longitudinal direction of the print head is matched with the direction of moving the print head, it is shown that streaks occur at the place to start printing along the line on which the print head 150 is moved. This is because ink discharged from the ink discharge part 150a of the print head 150 is dried to increase the viscosity to thicken the concentration of ink when ink discharge is started due to the influence of a blow caused by the rotation of the optical disk 5. On the other hand, as shown in FIG. 38B, in the case in which a label is printed by using the optical disk apparatus 400 according to the embodiment in which the longitudinal direction of the print head is vertical to the direction of moving the print head, it is shown that streaks at the place to start printing are inconspicuous. It can be considered that this is because since the longitudinal direction of the print head 450 is vertical to the direction of moving the print head 450, the portion to start printing is not formed in a linear shape different from the case shown in FIG. 38A and is in a sheet shape, which causes ink with an increased viscosity to be more dispersed.

Figure 39:
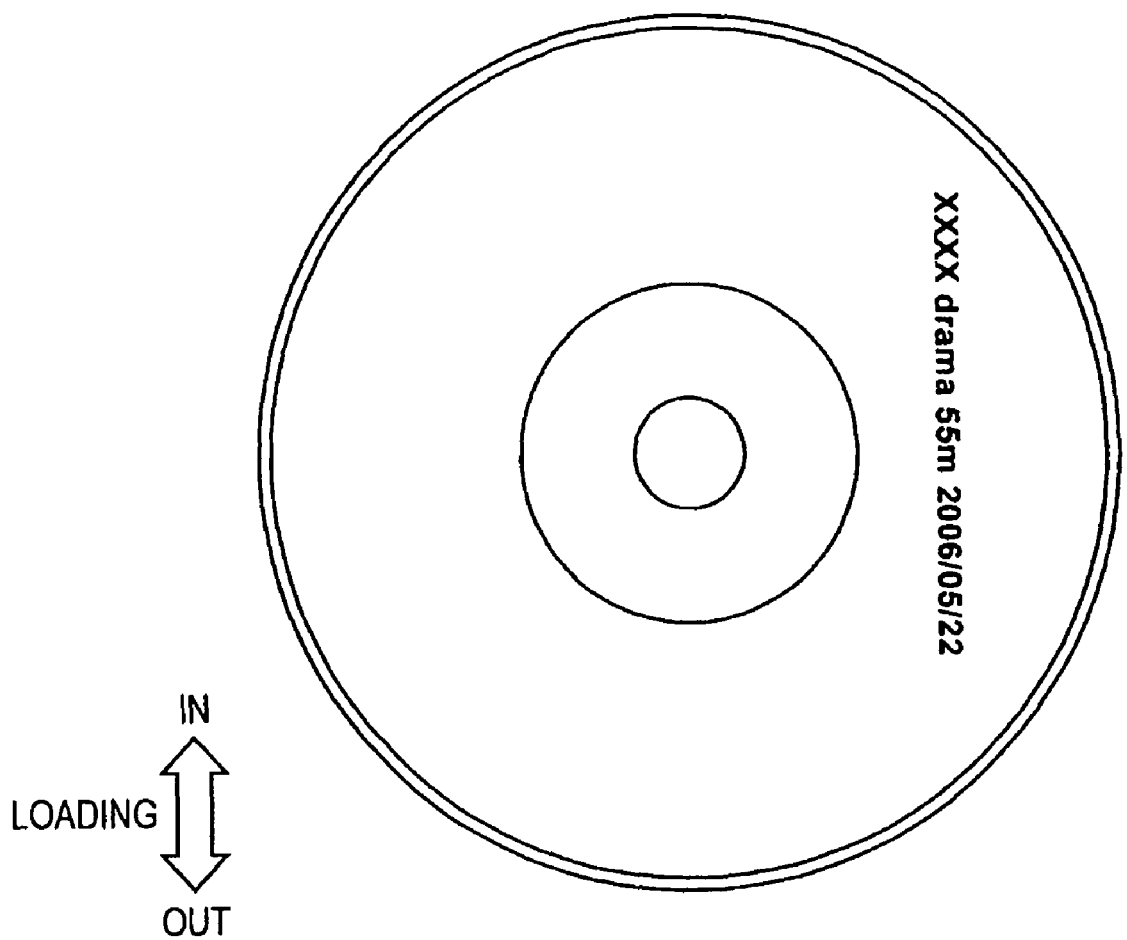
FIG. 39 shows an illustration depicting an exemplary printed result in the case in which a label is printed using the eject operation of the optical disk according to the same embodiment.

In addition, in the optical disk apparatus 400 according to the embodiment, a label may be printed by using the eject operation of the optical disk 5 by means of the tray 420 as a loading unit which loads the optical disk 5 into or ejects the disk out of the optical disk apparatus 400. For example, as shown in FIG. 39, in the case in which only text information about the descriptions of recorded data is printed on the optical disk 5, the print head 450 is controlled to discharge ink so that text information is printed in the eject operation in which the optical disk 5 is ejected from the front surface side of the optical disk apparatus 400 (FIG. 39 shows the direction of loading the optical disk 5), whereby the printed result shown in FIG. 39 can be obtained easily at high speed.

In other words, in the embodiment, since the print head 450 is arranged at the position offset from the center of the optical disk 5, the tray 420 moves the optical disk 5 in the outer radial direction in order to eject the optical disk 5 out of the optical disk apparatus 400, whereby the print head 450 can be relatively moved with respect to the optical disk 5. Therefore, for information of text or images that can be printed in passing the print head 450 over the optical disk 5 at one time, the eject operation of the optical disk 5 can be used to print a label. In addition, although it is irrelevant whether to operate the print head 450 in the eject operation of the optical disk 5, when the print head 450 is moved in the direction opposite to the direction of ejecting the optical disk 5, a print can be made at higher speed than the case in which the print head 450 is not operated. In other words, in the case in which a print is made throughout the label surface of the optical disk 5, it is necessary to convert print data for printing. For example, in the case in which only text data is printed, the discharge of the print head 450 is controlled at the timing of ejecting the optical disk 5 out of the optical disk apparatus 400, whereby the printed result shown in FIG. 39 can be obtained easily at high speed.

As described above, in accordance with the optical disk apparatus 400 according to the embodiment, since the print head 450 does not pass through the rotational center of the optical disk 5 and the longitudinal direction of the print head 450 is arranged vertical to the movable axis, the print area at each step can be made uniform or nearly uniform. Therefore, the following advantages can be obtained: (1) when the timing of ink discharge from the print head is the same, the print density in each print area becomes the same, (2) a label can be printed uniformly or nearly uniformly with no concentration correction, and (3) the performance of the print head can be fully exploited.

In addition, in accordance with the optical disk apparatus 400 according to the embodiment, the longitudinal direction of the ink discharge part 450a of the print head 450 is vertical to the movable axis of the print head 450. Thus, such advantages can be obtained that (1) streaks in a linear shape at the place to start printing are eliminated and the place becomes more inconspicuous than the other portions.

Moreover, since the longitudinal direction of the ink discharge part 450a of the print head 450 is vertical to the direction of moving the optical disk 5 for loading, the operation of ejecting the disk can be used to print simple data such as text. Thus, in the case in which there is a little print data, such advantages can be obtained that the time for printing can be reduced greatly and the convenience for users is increased.

In addition, the optical disk apparatus 400 according to the embodiment is not restricted to the examples described above. For example, various modifications can be considered such as the case in which the shape of the print head 450 is different from those described above, or in the case in which the cap 472 and the ink reservoir 474 have different shapes.

Figure 40:
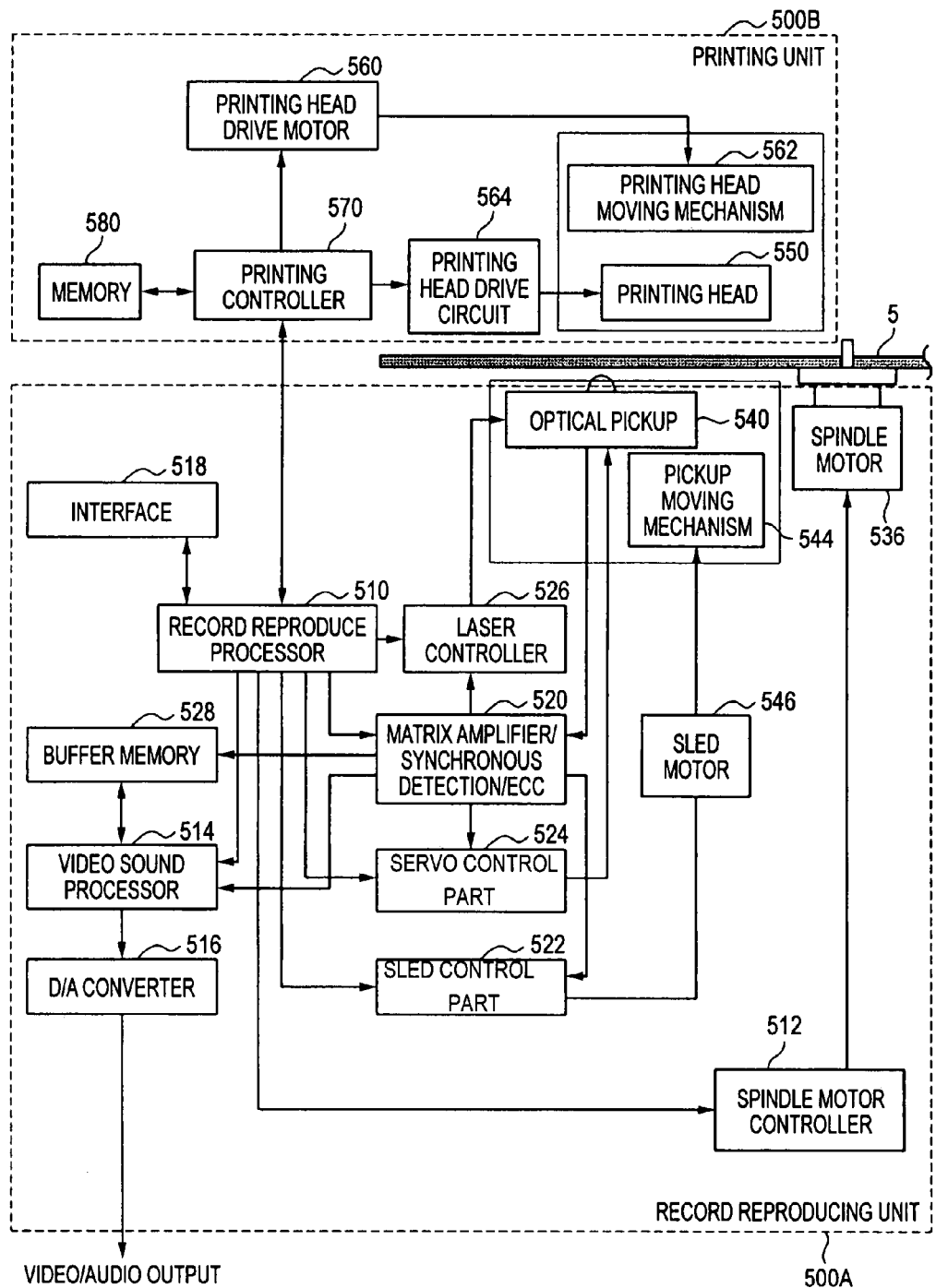
FIG. 40 shows a block diagram depicting the configuration of an optical disk apparatus having the function of printing a label according to a fifth embodiment of an embodiment of the invention.

The Configuration and Operation of an Optical Disk Apparatus 500 According to a Fifth Embodiment Next, the configuration of the optical disk apparatus 500 according to the fifth embodiment of an embodiment of the invention as an information recording apparatus will be described with reference to FIG. 40. In addition, FIG. 40 shows a block diagram depicting the configuration of the optical disk apparatus 500 according to the fifth embodiment of an embodiment of the invention having the function of printing a label. In addition, in the discussion below, the other structures of the optical disk apparatus 500 are the same as the case of the embodiments described above, omitting the detailed descriptions here.

Here, the optical disk apparatus 700 before and the optical disk apparatus 100, 200 and 300 according to the first to third embodiments described above have the problem below.

In other words, for example, it is effective that the print width of the print head is made greater (the width of the ink discharge part of the print head), but when the length of the ink discharge part of the print head in the longitudinal direction is made greater in order to increase the print width, the difference in the performance of the individual ink discharge nozzles configuring the print head appears noticeably. In other words, in the case in which the print width of the print head is great, the image quality of a printed image is inevitably degraded, whereas in the case in which the print width of the print head is small, it is difficult to print at high speed, which causes tradeoffs.

Then, in order to solve the problem above, the optical disk apparatus 500 according to the embodiment has a head control part which controls a print head moving unit so that the distance of a single movement of the print head can be changed, in which the head control part changes the distance of a single movement of the print head, whereby the modes can be selectively set: a single print mode in which the same region on the information recording medium is printed for one time; and a multiprint mode in which the same region on the information recording medium is printed for a plurality of times. Hereinafter, the configuration of the optical disk apparatus 500 will be described in detail.

As shown in FIG. 40, the optical disk apparatus 500 mainly has a recording and reproducing unit 500A which records information on an optical disk 5 or reproduces information recorded on the optical disk 5, and a print unit 500B which prints a label on the optical disk 5.

For example, the recording and reproducing unit 500A has a recording and reproducing control part 510, a spindle motor controller 512, a video and audio processing part 514, a D/A converting part 516, an interface 518, a matrix amplifier/synchronization detection/ECC part 520, a sled control part 522, a servo control part 524, a laser control part 526, a buffer memory 528, a spindle motor 536, an optical pickup 540, and a pickup moving mechanism 544.

The recording and reproducing control part 510 generally controls the individual control parts overall including the spindle motor controller 512 which inputs and outputs various signals, described later, the matrix amplifier/synchronization detection/ECC part 520, the sled control part 522, the servo control part 524, and the laser control part 526.

The spindle motor 536 functions as a rotation drive mechanism which rotates the optical disk 5. For example, the spindle motor 536 is controlled to have a proper number of revolutions by the spindle motor controller 512 into which a signal is inputted from the recording and reproducing control part 510.

The optical pickup 540 has a laser source, an objective lens which collects the laser beam emitted from the laser source onto the disk, and a photo detector (PD) which detects the light reflected and returned from the disk (they are not shown). For example, a semiconductor laser, particularly a laser diode (LD) is used as the laser source, which is not restricted thereto. In addition to this, the optical pickup 540 has an optical system (not shown) which guides the laser beam emitted from the laser source to the objective lens.

The matrix amplifier in the matrix amplifier/synchronization detection/ECC part 520 computes and generates a focus error signal, a tracking error signal, and an RF signal based on various signals outputted from PD of the optical pickup 540. Similarly, an actuator (not shown) mounted on the optical pickup 540 is mounted with an objective lens, which moves the objective lens in the tracking direction, the focusing direction and the tilt direction. In addition, the synchronization detecting part (and an A/D converter, not shown) generates clocks based on synchronization signals recorded on the optical disk 5 at predetermined intervals, and converts analog signals to digital signals. Moreover, the ECC part (and a signal modulator/demodulator) performs signal modulation and demodulation, ECC addition, and an error correcting process based on ECC (Error Correcting Code: error correcting signal).

The sled control part 522 outputs a signal that controls the movement of the optical pickup 540 in the radial direction of the optical disk 5 to control the position for recording and reproduction (the sled servo). More specifically, the signal outputted from the sled control part 522 is inputted to the sled motor 546, the sled motor 546 moves the pickup moving mechanism 544 based on the inputted signal, and the pickup moving mechanism 544 moves the optical pickup 540 to the position for recording and reproduction.

The servo control part 524 outputs various servo signals to the actuator mounted on the optical pickup 540 described above to properly control the attitude of the objective lens based on the focus error signal, the tracking error signal and the RF signal. In addition, the servo control part 524 may output the control signal for the sled servo described above and the control signal for the number of revolutions of the spindle motor 536.

The laser control part 526 receives the modulation signal from the matrix amplifier and the ECC part (and a signal modulator/demodulator, not shown) in the matrix amplifier/synchronization detection/ECC part 520 to modulate the laser power of the laser source for writing signals on the optical disk 5, and to control the laser power based on the RF signal.

The buffer memory 528 temporarily stores data processed in the signal modulator/demodulator and the ECC part. The video and audio processing part 514 performs necessary video and audio processing, and outputs video and sounds in an analog manner through the D/A converting part 516 (for example, outputs video/sounds). The interface 518 is an interface that connects an external computer and video and sound sources, not shown.

For example, the print unit 500B has a print head 550, a head drive motor 560, a print head moving mechanism 562, a head moving circuit 564, a print controller 570, and a memory 580.

The print head 550 and the head drive motor 560 are the same as those described in the embodiments, omitting the detailed descriptions. The print head moving mechanism 562 is driven by the head drive motor 560, and moves the print head 550 at the position offset from the center axis of the optical disk 5 in the direction in parallel with the radial direction. Generally, the head moving circuit 564 is formed in one piece with the print head 550, which controls ink discharge from the print head 550.

The print controller 570 receives signals from the recording and reproducing control part 510, and outputs signals to the recording and reproducing control part 510. In addition, the print controller 570 controls the print head moving mechanism 562 and the head drive motor 560 which drives the print head moving mechanism.

The memory 580 stores data of print information that is information about print descriptions (hereinafter, referred to as print data). For example, the memory 580 temporarily stores print data from a personal computer, a memory card and the other external devices.

Hereinafter, the operation of the optical disk apparatus 500 having this configuration will be described. In recording data, digital data inputted from an external computer, not shown, to the interface is added with error correcting codes (ECC) and modulated in the signal modulator/demodulator and the ECC part. Based on the modulated digital data, pulses are generated by the laser control part 526, and a laser beam is applied onto the optical disk 5 through the optical pickup 540, whereby digital data is recorded. In recording data, the servo is controlled properly by the servo control part 524, the spindle motor controller 512, and the sled control part 522 for laser control.

On the other hand, in reproducing data, when a laser beam is applied onto the optical disk 5, the light reflected and returned is detected by the PD of the optical pickup 540. For the reflected light detected by the PD, amplification and waveform equalization are computed by the matrix amplifier to reproduce the RF signal, and the synchronization detecting part and the A/D converter generate bit strings that the RF signal is binarized. The generated bit strings are subjected to signal demodulation and error correction by the signal modulator/demodulator and the ECC part. The video and audio processing part 514 separates video data and audio data from the demodulated signal, and the D/A converting part 516 subjects the data to D/A conversion for analog output. Also in reproducing data, the servo is properly controlled by the servo control part 524, the spindle motor controller 512, and the sled control part 522 for laser control.

Generally, for printing a label, the spindle motor 536 is controlled based on the signal from the disk surface of the optical disk 5 as well as printing is controlled as similar to data reproduction, and a label is printed while the optical disk 5 is being rotated at a certain number of revolutions. In addition, a label may be printed while data is being recorded, or a print is made while the number of revolutions of the optical disk 5 is varied, not restricted thereto. In this case, for example, the print controller 570 can control the print head moving unit so that a single movement of the distance of the print head 550 is the maximum print width of the print head 550, in the embodiment, it is 1/n of the width of the ink discharge part (n is a natural number).

Figure 43A:
FIGS. 43A and 43B show photographs comparing an exemplary state of the label surface after a label is printed by single printing with an exemplary state of the label surface after a label is printed by multiprint.
Figure 43B:
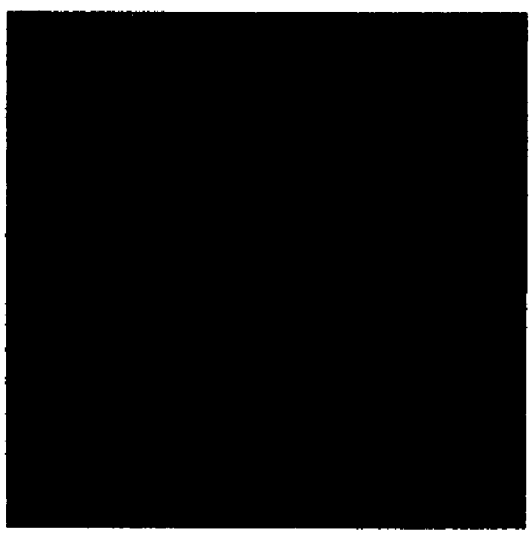

As described above, the configuration of the optical disk apparatus 500 has been discussed. Next, the operation of the optical disk apparatus 500 having this configuration in printing a label will be described with reference to FIGS. 41A to 41C, FIGS. 42A to 42C and FIGS. 43A and 43B. In addition, FIGS. 41A to 41C show an illustration depicting the operation in which a print is made in the single print mode, FIG. 41A shows the case of using the optical disk apparatus 700 before, and FIG. 41B shows the case of using the optical disk apparatus 500 according to the embodiment. FIGS. 42A to 42C show an illustration depicting the operation in which a print is made in the multiprint mode, FIG. 42A shows the case of using the optical disk apparatus 700 before, and FIG. 42B shows the case of using the optical disk apparatus 500 according to the embodiment. FIGS. 43A and 43B show photographs comparing an exemplary state of the label surface after a label is printed by single printing with an exemplary state of the label surface after a label is printed by multiprint. In addition, in the discussion below, the overlapping descriptions of the same operations as those described above in the optical disk apparatus 100, 200 and 300 according to the first to third embodiments are omitted.

First, the case in which a label is printed by the single print mode will be described. As described above, the single print mode is that the same region on the information recording medium such as the optical disk 5 is printed for one time. More specifically, as shown in FIG. 41C, the print controller 570 moves the print head by the same distance (the advance amount) as the print width (the width of the ink discharge part) by a single print step for printing (in the drawing, (1) to (3) denote the first step to the third step). Therefore, a single dot is printed for a single time.

FIG. 41A shows the case in which the print head is moved on the radial axis, and FIG. 41B shows the case in which the print head is moved at position shifted and offset from the rotational center of the optical disk 5 in the direction in parallel with the radial axis. In the ink discharge part, for example, 300 to 400 ink discharge nozzles are arranged, and the arrangement of the individual nozzles becomes nonuniform due to variations in fabrication, which leads to color irregularity. Therefore, in the case of single printing, in both cases shown in FIGS. 41A and 41B, the difference in the performance of nozzles directly affects image quality, and as shown in FIG. 43A, concentric streaks tend to occur on the optical disk 5. Moreover, a print with a great influence of the difference in the performance of nozzles is repeated at every step, and then concentric streaks become more conspicuous.

Next, the case in which a label is printed by the multiprint mode will be described. The multiprint mode is that as described above, the same region on the information recording medium such as the optical disk 5 is printed for a plurality of times (two times or grater). More specifically, as shown in FIG. 42C, the print controller 570 moves the print head by the same distance as 1/n (n is a natural number of two or greater) of the print width (the width of the ink discharge part) at a single print step for printing (in the drawing, (1) to (6) denote the first step to the sixth step). Therefore, a single dot is printed for two times or above. In addition, FIG. 42C shows the case in which the print head is moved by n=2, that is, ½ of the width of the ink discharge part at a single step.

FIG. 42A shows the case in which the print head is moved on the radial axis, and FIG. 42B shows the case in which the print head is moved at position shifted and offset from the rotational center of the optical disk 5 in the direction in parallel with the radial axis. It is the same as the case of single printing that the arrangement of the individual nozzles becomes nonuniform due to variations in fabrication, which leads to color irregularity. However, in the case of multiprint, since the print head is moved at a single step by every 1/n of the case of single printing (for example, in the embodiment, by every ½), the same region on the optical disk 5 (for example, a single pixel) is printed with two or more nozzles (in the embodiment, two nozzles). Therefore, the influence of the difference in the performance of nozzles is more difficult to appear than the case of single printing, and as shown in FIG. 43B, and concentric variations become inconspicuous on the optical disk 5 (variations are averaged). In other words, a label is printed by multiprint, whereby an image of higher image quality can be printed. Moreover, when the movement of the print head for a single step is made smaller and smaller such as ¼, ⅛ and so on in the case of single printing, the number of nozzles to print the same region on the optical disk 5 (for example, a single pixel) grows to four, eight and so on. Thus, the influence of the difference in the performance of nozzles is much more difficult to appear (the allowance of the difference in the performance of nozzles is widened), and an image of higher image quality can be printed. Moreover, the image quality of a printed image can be improved as well as the improvement of yields and a reduction in costs can be intended.

However, as shown in FIG. 42A, in the case in which the print head is moved on the radial axis, since the print head interferes with the member such as the chucking plate, it is difficult to perform sufficient multiprint up to the inner radial side of the optical disk 5. Therefore, for example, as shown in an enlarged photograph in FIG. 42A, on the outer radial side, the multiprint area is formed in which multiprint is possible, and on the inner side thereof, a single print area is formed in which only single printing is possible (that is, a print can be made only for a single time) because of the interference with the member such as the chucking plate, and a no-label area is formed in which no print can be made. On the other hand, in the case in which the print head is moved at the position shifted and offset from the rotational center of the optical disk 5 in the direction in parallel with the radial axis, the print head can be moved as it avoids the member such as the chucking plate. Thus, as shown in FIG. 42B, multiprint can be made to near the center of the optical disk 5 on the inner radial side.

As described above, in accordance with the optical disk apparatus 400 according to the embodiment, the print head does not pass through the rotational center of the disk, and multiprint is performed in which the movement of the print head is smaller than the width of the ink discharge part, whereby such advantages can be obtained that the printable area is increased more than before, and a print is made easily to near the inner radius of the disk as well as the image quality of a printed image can be improved.

In addition, as described above, in the case of the single print mode before, streaks occur to degrade the image quality of a printed image. In addition to such streaks, for example, suppose the case in which a particular pattern is repeatedly printed, in the case of single print mode, a nozzle to be used is the same all the time, which tends to degrade the nozzle. Contrary to this, there is a problem that for nozzles not used, ink is dried to cause errors such as clogs. Particularly, in the ink jet system using heat, it is thought that nozzles tend to degrade. In contrast to this, in the multiprint mode, since nozzles are used evenly, it is possible to suppress the occurrence of these problems.

Moreover, in the case in which a label is printed on a disk, since the moving speed of (the label of) the disk to be printed is faster than a print for a normal paper sheet, a relative print load against nozzles is high, and a blow caused by the disk is affected as well, which lead to a problem that ink is dried to cause nozzles to easily clog. In contrast to this, in the case of the multiprint mode, since the frequency in use of the individual nozzles can be lowered, advantages are significant that reduce a print load and that prevent nozzles from clogging due to dried ink.

In addition, in the case of a normal ink jet printer, since a paper sheet to be printed is fixed in printing and only a print head is reciprocated, the relative speed of the print head to the print target can be increased only to some extend. However, in the case in which a label is printed on a disk, an encoder is sometimes used to drop the rotating speed. For example, in the case in which a print is made while data is being read as in the embodiment, since the speed is increased to 10 to 15 times, it is thought that the advantages of the multiprint mode are significant.

In addition, the optical disk apparatus 400 according to the embodiment is not restricted to the examples described above. For example, in the case in which the movement of the print head by a single step is set differently from the examples described above, various modifications can be considered such as the case in which only the multiprint mode is used with no single print mode.

Figure 44:
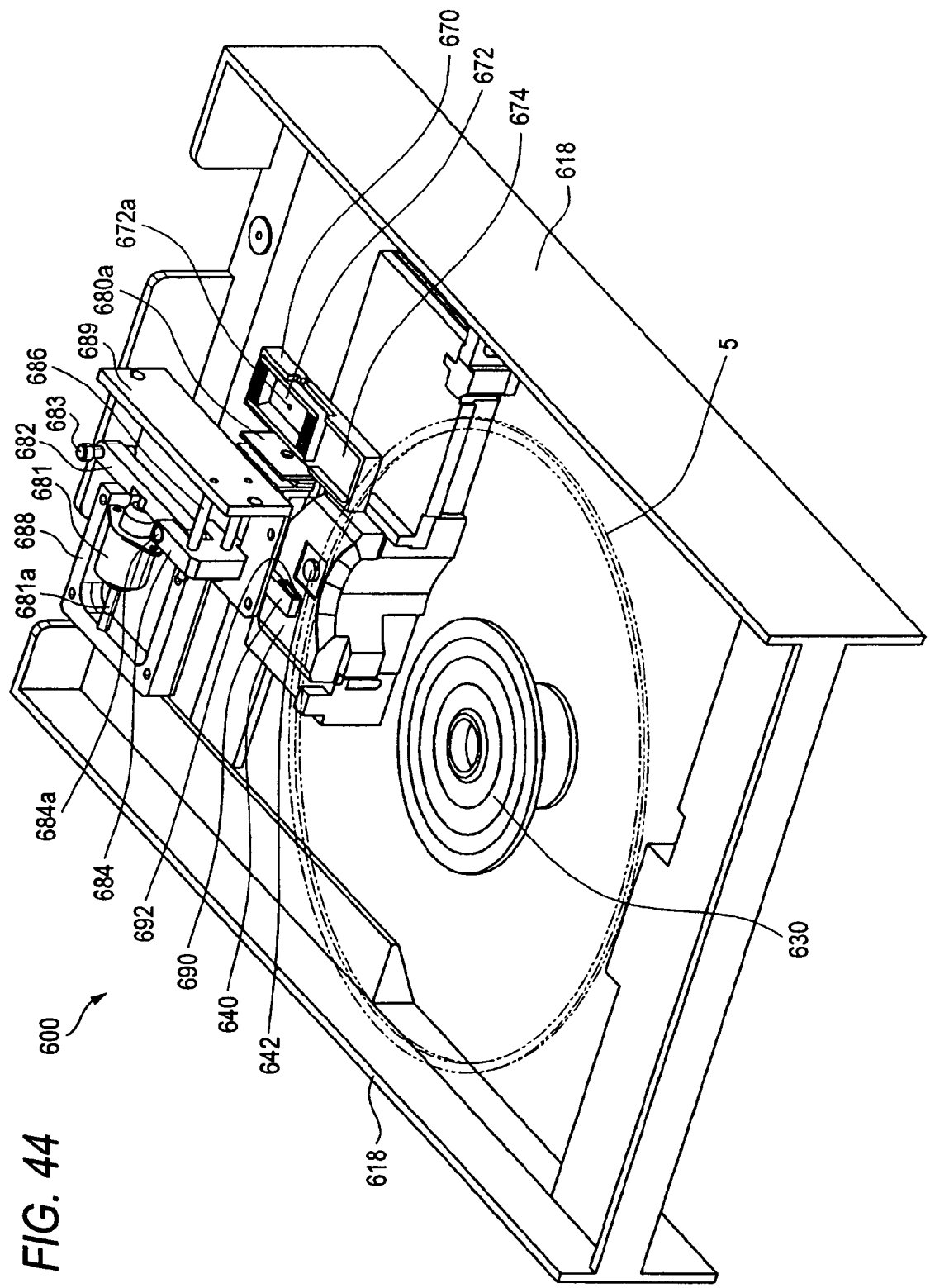
FIG. 44 shows a perspective view depicting the internal configuration of an optical disk apparatus according to a sixth embodiment of an embodiment of the invention.
Figure 45:
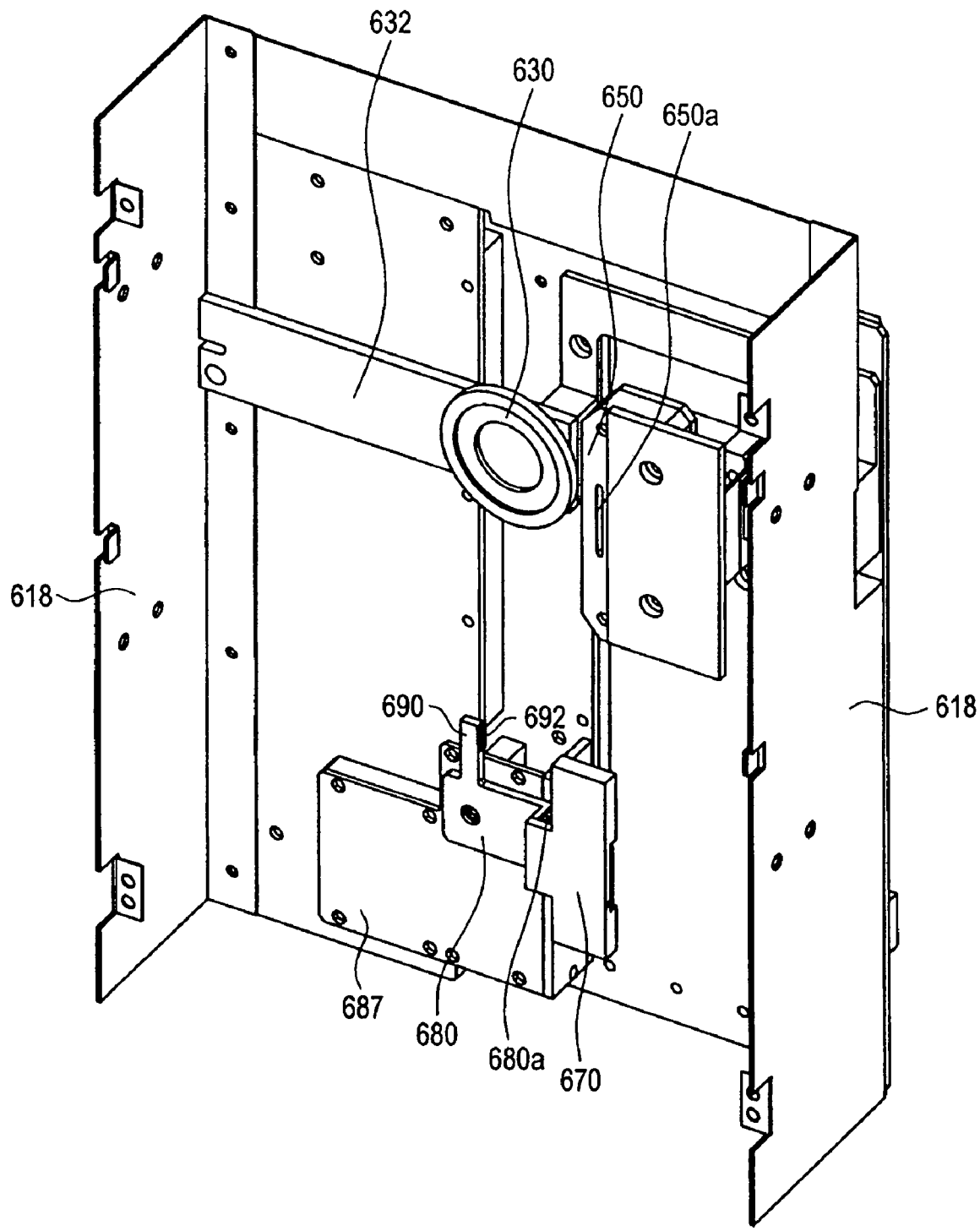
FIG. 45 shows a perspective view depicting the optical disk apparatus according to the same embodiment seen from the under surface side.
Figure 46:
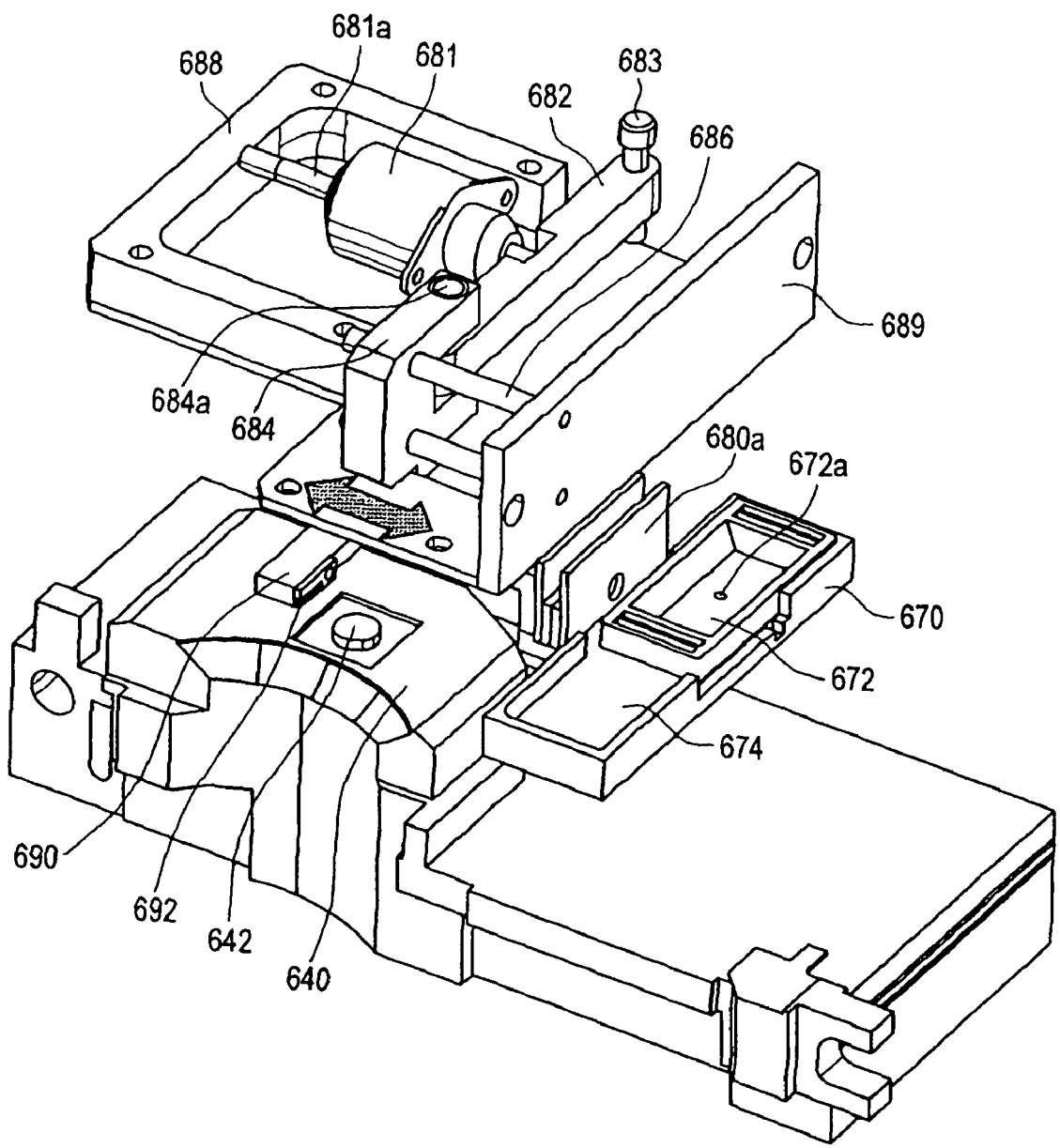
FIG. 46 shows an enlarged perspective view depicting the configuration of the essential part of the optical disk apparatus shown in FIG. 44.
Figure 47:
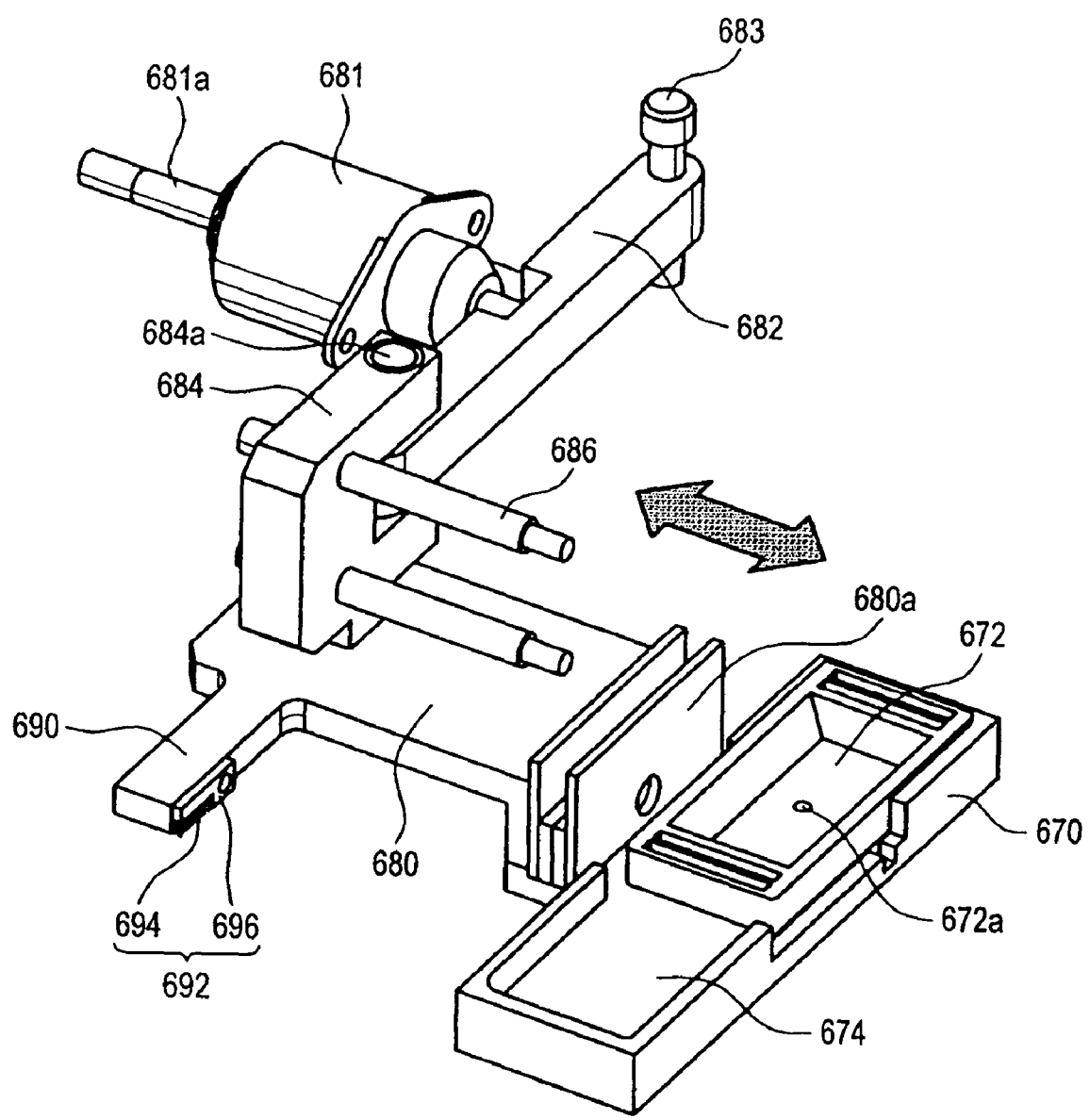
FIG. 47 shows an enlarged perspective view depicting key members extracted from FIG. 45.

The Configuration and Operation of an Optical Disk Apparatus 600 According to a Sixth Embodiment Next, the configuration of the optical disk apparatus 600 according to the sixth embodiment of an embodiment of the invention as an information recording apparatus will be described with reference to FIGS. 44 to 47. In addition, FIG. 44 shows a perspective view depicting the internal configuration of the optical disk apparatus 600 according to the sixth embodiment of an embodiment of the invention, FIG. 45 shows a perspective view depicting the optical disk apparatus 600 according to the same embodiment seen from the under surface side, FIG. 46 shows an enlarged perspective view depicting the configuration of the essential part of the optical disk apparatus 600 shown in FIG. 44, and FIG. 47 shows an enlarged perspective view depicting the key members further extracted from FIG. 46. In addition, in the discussion below, the detailed descriptions of the same configuration and operation as those of the optical disk apparatus 100, 200, 300, 400 and 500 according to the first to fifth embodiments described above will be omitted.

Here, the optical disk apparatus 700 before and the optical disk apparatus 100, 200, 300, 400 and 500 according to the first to fifth embodiments described above have problems below that occur because a label is printed by using a print head of the ink jet system.

In other words, when the print head of the ink jet system is used to print a label, since ink discharged from the print head smears the inside of the information recording apparatus such as an optical disk apparatus, in the information recording unit of the information recording apparatus, for example, in the optical disk apparatus, there is a problem that an optical part, particularly, a lens of the optical pickup is smeared with ink.

In addition, in contrast to this, in order to provide a cleaner exclusively used for an information recording unit such as an optical pickup, it is necessary to mount a complex mechanism, which leads to a factor of increasing costs.

Moreover, for example, in the case of using the print head of the ink jet system, such a mechanism is necessary that a cleaning mechanism such as a wiper is used to clean (for example, wipe off) ink attached to the ink discharge part of the print head. Therefore, there is also a problem that a complex mechanism is necessary in the rear part of the information recording apparatus (on the opposite side of the loading port of the information recording medium), and a space is reduced.

Then, in order to solve the problems above, in the optical disk apparatus 600 according to the embodiment, for example, a cleaning mechanism such as a wiper part which cleans the print head is formed in one piece with a cleaning mechanism for an information recording unit such as an optical pickup, and these mechanisms have a unit formed in one piece therewith which caps the print head so as not to dry ink, as necessary. Hereinafter, the configuration of the optical disk apparatus 600 will be described in detail.

As shown in FIGS. 44 to 47, in addition to the configuration provided to the optical disk apparatus 100, 200, 300, 400 and 500 according to the first to fifth embodiments described above, the optical disk apparatus 600 according to the embodiment has a wiper 680 as an exemplary head cleaning mechanism which cleans a print head 650, and a lens cleaner 690 as an exemplary recording unit cleaning mechanism which cleans an optical pickup 640, in which a cap 672 and an ink reservoir 674 are formed in one piece with these mechanisms. In addition, the cap 672 and the ink reservoir 674 are not necessarily formed in one piece. The wiper 680 and the lens cleaner 690 may be formed in one piece, and the cap 672 and the ink reservoir 674 may be formed separately. However, in this case, preferably, the cap 672 and the ink reservoir 674 are disposed at the position at which the wiper 680 does not come into contact with the cap 672.

As shown in FIGS. 44 and 45, as similar to the cases of the embodiments described above, in the optical disk apparatus 600, an optical disk 5 is loaded into a drive part surrounded by side panels 618, and the optical disk 5 loaded into the apparatus is clamped by a chucking plate 630 supported by a chucking plate mounting board 632 together with a hub. Hereinafter, the feature configuration of the embodiment will be described in detail.

The optical disk apparatus 600 has a cap 672 in order to prevent ink discharged from a print head (not shown) from drying, and the cap 672 is accommodated in a cap accommodating part 670. For example, the cap 672 is formed with a hole 672a nearly at the center part of the bottom part. As described above, the cap 672 is not a fully sealed cap, which has the hole 672a, whereby it can adjust the degree of drying ink. The hole 672a like this can be formed in the optical disk apparatus according to the embodiments described above. In addition, in addition to the cap 672, the cap accommodating part 670 is provided with an ink reservoir 674 which is a place at which ink is discharged on purpose so that air does not enter in order to prevent print errors. The other configurations of the cap 672 and the ink reservoir 674 are the same as those described in the embodiments.

In addition, as described above, the optical disk apparatus 600 has the head cleaning mechanism which cleans the print head, and the head cleaning mechanism according to the embodiment is configured of the wiper 680 which is moved in the direction vertical to the radial direction and a drive mechanism therefor.

The wiper 680 has a wiper head 680a at the tip end part thereof. For example, the wiper head 680a has a structure in which an elastic member like rubber is laminated in two layers. In addition, the wiper 680 is driven by a wiper drive motor 681, and they are joined to each other through a wiper arm 682 and a wiper joining part 684.

The wiper 680 is disposed on the under surface side of the wiper part supporting plate 687, and the wiper joining part 684 disposed on the top surface side of the wiper part supporting plate 687 is joined to the wiper 680 so as to penetrate through a through hole or a notch (both are not shown) formed in the wiper part supporting plate 687. The wiper drive motor 681 is fixed on the wiper part supporting plate 687. In addition, as shown in FIGS. 44, 46 and 47, a wiper drive shaft 681a is disposed so as to penetrate through the wiper drive motor 681, and a pressing part (not shown) is disposed at one end of the wiper drive shaft 681a (at the end part on the wiper arm 682 side). A pin 683 penetrates through one end of the wiper arm 682, and one end of the pin 683 is fixed to the wiper part supporting plate 687. In addition, the other end of the wiper arm 682 is joined to the wiper joining part 684 through a hinge part 684a.

In the wiper joining part 684, two through holes (not shown) are formed in the vertical direction, for example, and two wiper drive shafts 686 are inserted through the through holes. The two wiper drive shafts 686 are extended in the direction vertical to the radial direction, and arranged in parallel with each other. As shown in FIGS. 44 and 46, the wiper drive shaft 686 is mounted on a wiper holding member 689 in an L-shape in cross section, and a pin 683 is also held by the wiper holding member 689.

In addition, the optical disk apparatus 600 has the lens cleaner 690 which cleans a lens 642 of the optical pickup 640. The lens cleaner 690 is formed in one piece with the main body part of the wiper 680, for example, which is formed to extend from the main body part of the wiper 680 toward the front surface side of the optical disk apparatus 600. The lens cleaner 690 has a wiping member having a function of wiping the lens 642. For example, as shown in FIGS. 44 to 47, the optical disk apparatus 600 according to the embodiment has a brush wiping member 692 as the wiping member like this which is detachably disposed at the tip end part of the lens cleaner 690.

Figure 48A:
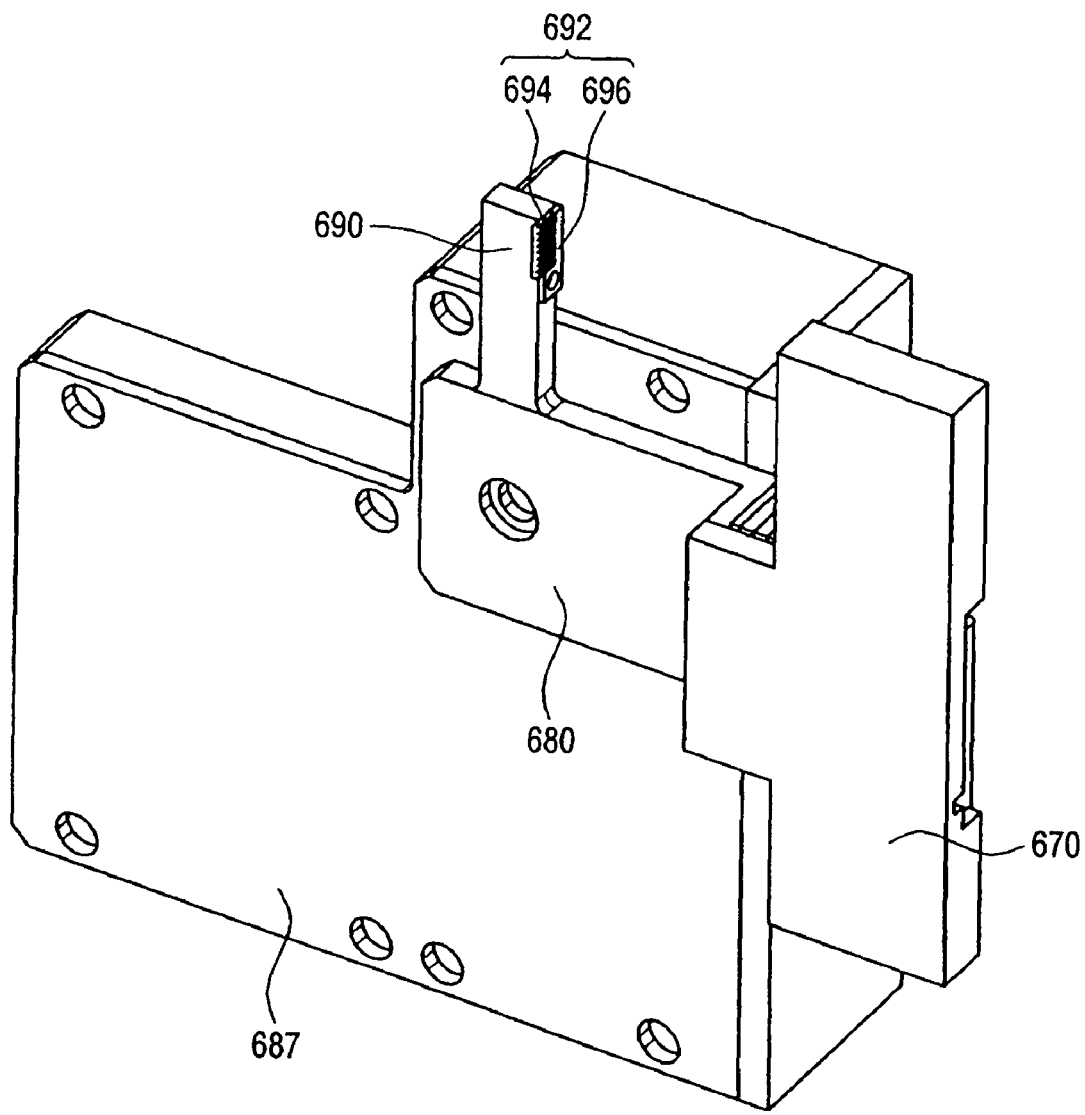
FIG. 48A shows an enlarged perspective view depicting the configuration of a wiping member according to the same embodiment.

Here, the brush wiping member 692 will be described with reference to FIG. 47 and FIG. 48A. For example, the brush wiping member 692 is formed of a brush part 694 which removes ink attached to the lens 642, and a brush support part 696 which supports the brush part 694. The brush support part 696 is detachably disposed on the main body part of the lens cleaner 690 with a screw (not shown), in which the brush wiping member 692 can be easily replaced in the case in which the brush wiping member 692 is used to degrade the brush part 694 due to abrasion. In the embodiment, since the lens cleaner 690 is formed in one piece with the wiper 680, the embodiment is significantly excellent in view of costs because when the brush wiping member 692 is formed in one piece with the lens cleaner 690, the wiper 680 unnecessary to be replaced has to be changed together due to the abrasion of the brush part 694. However, with no consideration of these points, the brush wiping member 692 may be formed in one piece with the lens cleaner 690.

Figure 48B:
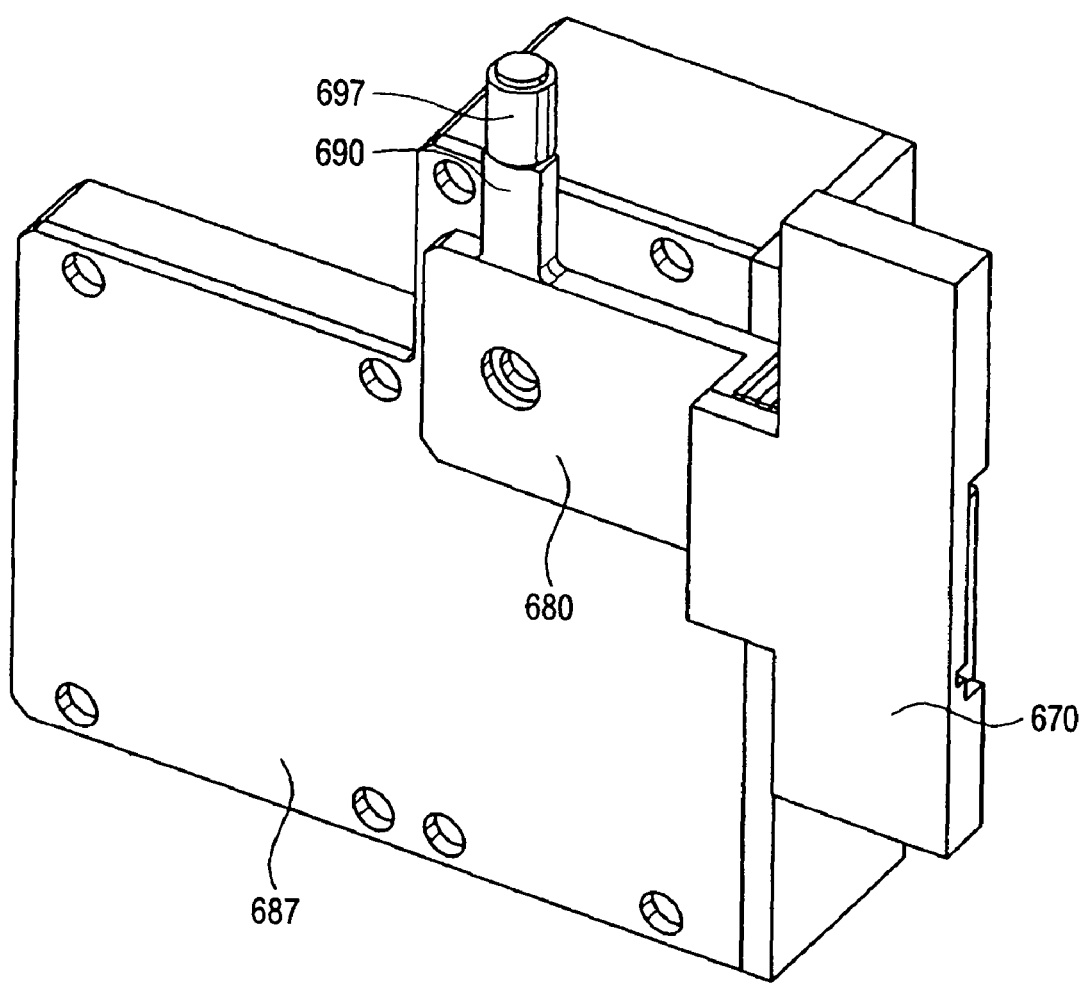
FIG. 48B shows an enlarged perspective view depicting the configuration of the wiping member according to a first modification of the same embodiment.
Figure 48C:
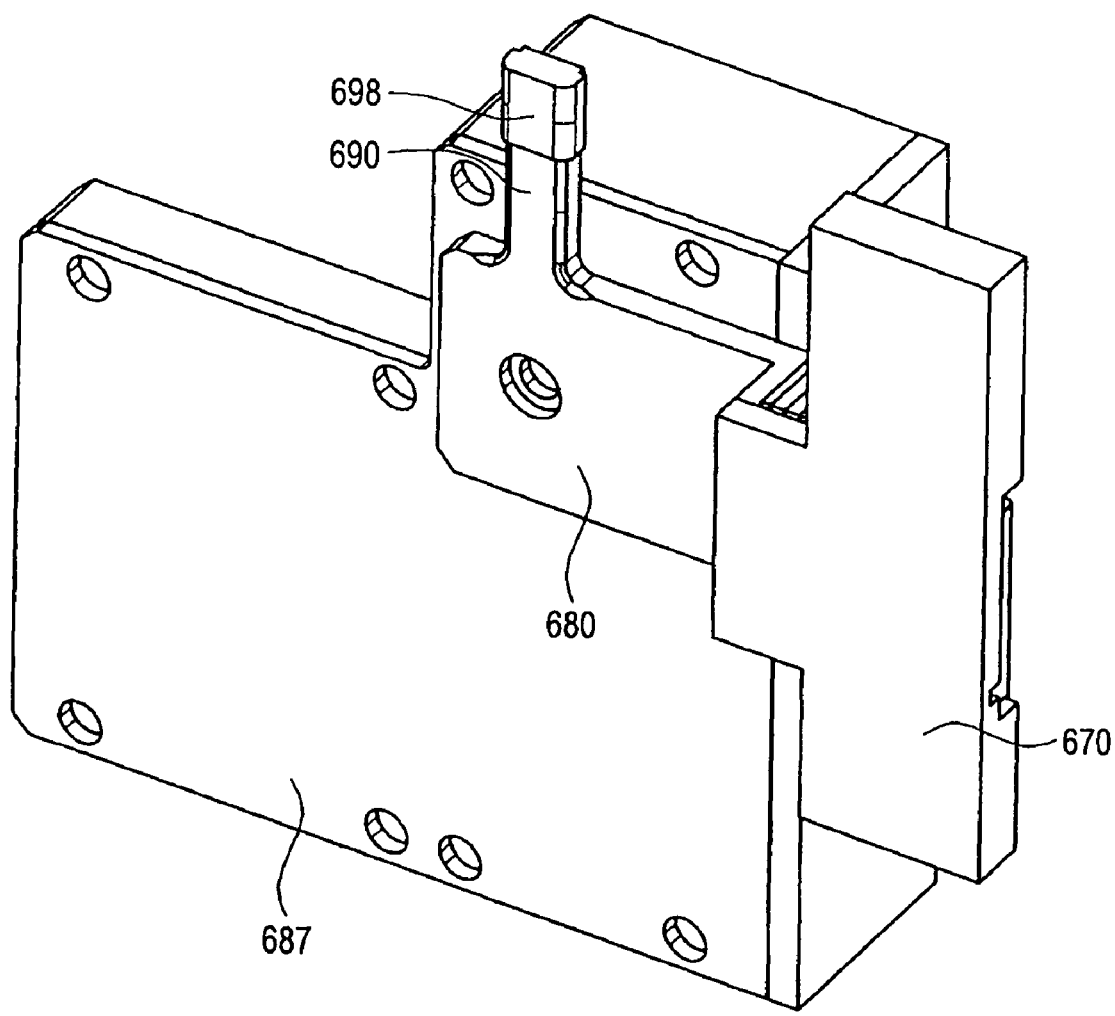
FIG. 48C shows an enlarged perspective view depicting the configuration of a wiping member according to a second modification of the same embodiment.

In addition, as a modification of the wiping member according to the embodiment, for example, as shown in FIG. 48B, the wiping member may be a rotating wiping member 697 which is formed of a material that hardly causes lint such as a nonwoven fabric formed of acrylic or PET (lint free) nearly in a cylindrical shape for rotation to remove ink attached to the lens 642. Alternatively, as shown in FIG. 48C, a paper wiping member 698 in which the tip end part of the lens cleaner 690 is covered with a material such as paper may remove ink attached to the lens 642.

The operations of the cap 672, the wiper 680, and the lens cleaner 690 according to the embodiment having this configuration will be described below. In the discussion below, for the convenience of descriptions, the motion of the wiper 680 will be mainly described. First, the wiper drive motor 681 is rotated to move the wiper drive shaft 681a in the direction toward the wiper arm 682, and then the pressing part (not shown) at the tip end part of the wiper drive shaft 681a presses the wiper arm 682 in the direction of moving the wiper drive shaft 681a. With the pressing force, the wiper arm 682 is rotated counterclockwise, for example, as the pin 683 is used as the fulcrum. Subsequently, in association with the rotation of the wiper arm 682, the wiper joining part 684 joined to the wiper arm 682 through the hinge part 684a is linearly moved along the shaft 686 in the direction vertical to the radial direction while it is guided by the wiper drive shaft 686. The wiper 680 is linearly moved toward the print head (not shown) side in the direction vertical to the radial direction as interlocking with the movement of the wiper joining part 684.

On the other hand, in the case in which the wiper arm 682 is rotated clockwise, for example, it can be rotated by using the force of an elastic member such as a spring (not shown) that is elastically restored. In other words, for example, when the wiper drive motor 281 is reversely rotated to move the wiper drive shaft 681a toward the opposite side of the wiper arm 682, the pressing part (not shown) is separated from the wiper arm 682 and the pressing force caused by the pressing part is not applied to the wiper arm 682. Therefore, for example, the wiper arm 682 can be rotated clockwise due to the restoration force of the elastic member described above. Then, the wiper 680 is moved toward the reverse direction before (toward the opposite side of the print head side). By repeating the rotation and the reverse rotation of the drive motor 281, the wiper 680 can clean the ink discharge part of the print head (not shown) with the wiper head 680a.

In addition, at this time, in the embodiment, since the cap 672 and the lens cleaner 690 are formed in one piece with the wiper 680, they reciprocate in the direction vertical to the radial direction in association with the operation of the wiper 680 described above. The lens cleaner 690 passes through the upper part of the lens 642 in moving like this, and it cleans the lens 642 when passing through the lens 642.

Here, preferably, in the optical disk apparatus 600, the wiper 680 as the head cleaning mechanism according to the embodiment is further provided with a maintenance control part (not shown) which controls the lens cleaner 690 as a recording unit cleaning mechanism according to the embodiment to clean the lens 642 after the print head is cleaned. This is because when the wiper 680 cleans the print head, ink attached to the print head sometimes splatters to the lens 642 due to the wiping operation of the wiper 680. Even in this case, the maintenance control part is provided to eliminate such an event that the lens 642 is smeared again by cleaning the print head after the lens 642 is cleaned.

As described above, in the optical disk apparatus with the function of printing a label using the print head of the ink jet system, excessive ink (mist) that is discharged from the print head and does not reach the printing surface smears the inside of the apparatus in printing a label. At this time, the optical pickup, particularly the lens part is smeared, and data read and write becomes unstable as well as write failure sometimes occurs. Like the optical disk apparatus 600 according to the embodiment, the wiper 680, the cap 672, and the ink reservoir 674 as well as the lens cleaner 690 are disposed, and the wiper 680, the cap 672, the ink reservoir 674 and the lens cleaner 690 are formed in one piece, whereby an effective maintenance mechanism is implemented with a simple structure more than the case of separately providing the lens cleaner 690.

Therefore, in accordance with the optical disk apparatus 600 according to the embodiment, since the wiper 680, the cap 672, the ink reservoir 674, and the lens cleaner 690 can be moved in an integrated manner, as compared with the manner before, an effective maintenance mechanism can be implemented with a simple configuration, which allows low costs and a reduction in size, and such an advantage can be obtained that failure hardly occurs because of a simple mechanism.

In addition, the optical disk apparatus 600 according to the embodiment is not restricted to the examples described above. For example, various modifications can be considered such as the case in which the cap and the ink reservoir have different shapes, the case in which the lens cleaner has a different shape other than the brush shape, the rotation type, and cleaning paper, the case in which a mechanism that forms the wiper 680, the cap 672, the ink reservoir 674, and the lens cleaner 690 in one piece has a different structure, the case in which the motion of the wiper 680, the cap 672, the ink reservoir 674, and the lens cleaner 690 is the direction different from that in the embodiment (for example, the direction vertical to the direction of moving in the embodiment), and the case in which a print can be made on the label surface of a cartridge of a disk having the cartridge.

Figure 49:
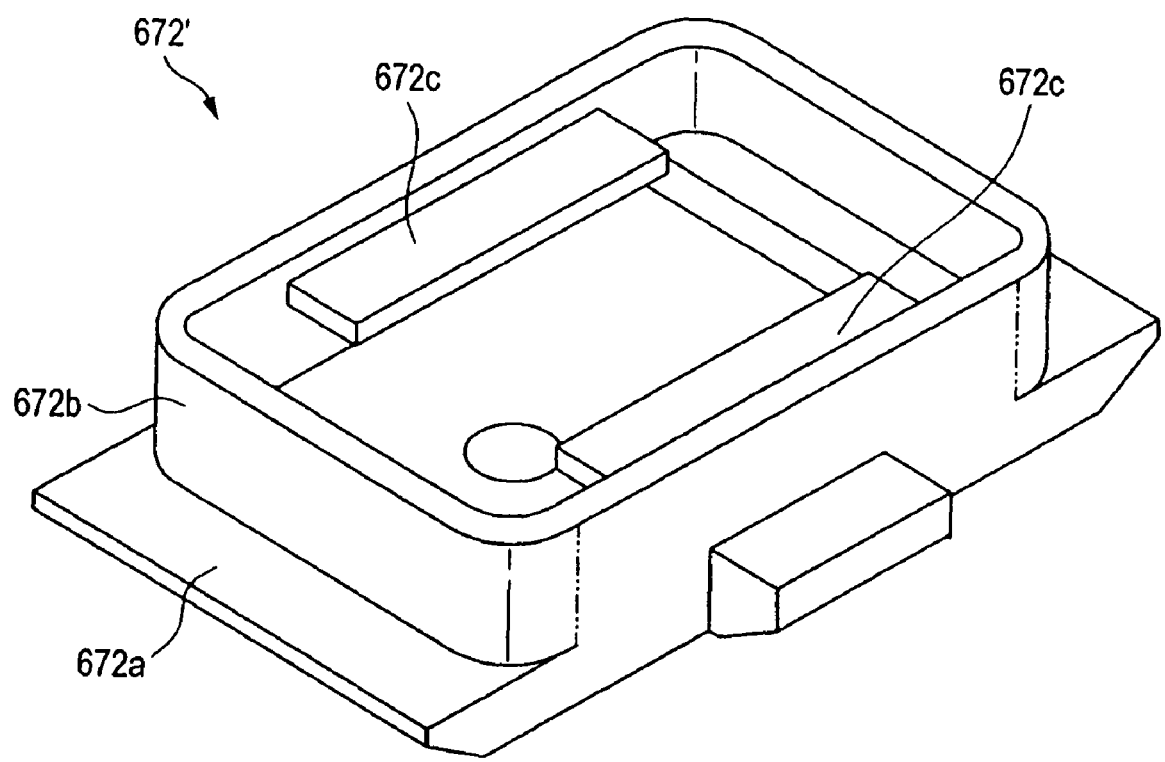
FIG. 49 shows a perspective view depicting the configuration of a cap according to an exemplary modification of the same embodiment.

Among the cases, for example, for a modification of the shape of the cap, a shape of a cap 672' shown in FIG. 49 is named. For example, the cap 672' is formed of rubber overall (synthetic rubber such as latex), in which a base 672a and an ink absorbing part 672b in which an ink absorber (not shown) is accommodated are formed in one piece. The ink absorbing part 672b is formed of a bottom part nearly in a rectangular shape and wall parts formed on the outer radius thereof, in which a pair of holding members 672c is extended on the wall parts facing to each other. The holding members 672c clamp the ink absorber so as not to be removed.

As described above, the preferred embodiments according to an embodiment of the invention have been described with reference to the accompanying drawings. It is needless to say that an embodiment of the invention is not restricted to the examples above. It should be apparent for those skilled in the art that various modifications or revisions can be contemplated within the scope of the claims, which are of course included in the technical scope of an embodiment of the invention.

For example, in the embodiments described above, as the information recording apparatus according to an embodiment of the invention, the optical disk apparatus 100, 200, 300, 400, 500, 600 which record and reproduce the optical disk are taken and described as examples. For the information recording apparatus according to an embodiment of the invention, it is not restricted to the optical disk apparatus, for example, which may be a magnetic disk apparatus and a magneto-optical disk apparatus.

For example, in the embodiments described above, for the optical disk apparatus having the print head replace cover, the case of the optical disk apparatus 300 is described in which the optical disk apparatus 100 according to the first embodiment is further provided with the print head replace cover 319. The optical disk apparatus 200, 400, 500 and 600 according to the second, fourth, fifth and sixth embodiments may be further provided with the print head replace cover.

In addition, in the embodiments described above, the detailed descriptions of the cap mechanism and the cleaning mechanism are discussed as the optical disk apparatus 200 according to the second embodiment is taken as an example. The optical disk apparatus 100, 300, 400, 500 and 600 according to the first, third, fourth, fifth and the sixth embodiments are the same.

In addition, in the third embodiment described above, an example is described in which the cap 372 and the ink reservoir 374 are detachably disposed with respect to the tray 320. The cap 372 and the ink reservoir 374 may be formed in one piece with the tray 320.

In addition, the cleaning mechanism and the cap mechanism according to the sixth embodiment may be adapted to the optical disk apparatus 400 and 500 according to the fourth and fifth embodiments.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording apparatus into which an information recording medium is loaded, in which a label can be printed on a label surface of the information recording medium, the apparatus comprising:
   an information recording means positioned on a recording surface side of the information recording medium;
   a print head positioned on an opposite side of the information recording means from the recording surface side of the information recording medium and configured to print a label;
   a print head moving means for moving the print head at a position shifted from a rotational center of the information recording medium in parallel with a radial direction of at least part of the information recording medium; and
   a head cleaning mechanism configured to clean the print head and a recording means cleaning mechanism configured to clean the information recording means,
   wherein the head cleaning mechanism is formed in one piece with the recording means cleaning mechanism.

2. The information recording apparatus according to claim 1, further comprising a chucking plate disposed on a same side as the print head with respect to the information recording medium and configured to hold a center part of the information recording medium,
   wherein the print head moving means moves the print head at a position at which the print head does not interfere with the chucking plate.

3. The information recording apparatus according to claim 1, wherein the print head moving means moves the print head to a retract position and the information recording apparatus further comprises a head cleaning mechanism configured to clean the print head and a cap means for capping the print head at the retract position, and
   wherein the print head is cleaned and capped at a position distant from the information recording means.

4. The information recording apparatus according to claim 1, wherein in the case in which the print head is moved over the information recording medium, the print head moving means moves the print head in parallel with the radial direction of the information recording medium, and
   in the case in which the print head is off the information recording medium, the print head moving means moves the print head in a predetermined direction different from the radial direction and then moves the print head to a retract position.

5. The information recording apparatus according to claim 1, wherein the print head has an ink discharge part on a side facing the label surface of the information recording medium, and
   the ink discharge part has a plurality of ink discharge ports which is arranged in a direction in parallel with the radial direction of the information recording medium.

6. The information recording apparatus according to claim 1, further comprising a loading means for loading the information recording medium or ejecting the information recording medium,
   wherein an eject operation for the information recording medium by the loading means is used to print the label.

7. The information recording apparatus according to claim 1, wherein the print head may be detachably disposed with respect to the information recording apparatus, and
   the print head moving means may move the print head at a position shifted from the rotational center of the information recording medium toward an opening which is disposed on a surface on an eject side of the information recording medium.

8. The information recording apparatus according to claim 1, further comprising a loading means having a tray on which the information recording medium is placed,
   wherein the tray is provided with a maintenance member configured to perform maintenance of the print head.

9. The information recording apparatus according to claim 8, wherein the maintenance member is detachably disposed with respect to the tray.

10. The information recording apparatus according to claim 1, wherein between two areas that are obtained by splitting an area including the information recording medium along a first direction of movement of the information recording means, the print head is placed in the area positioned more on the downstream side than the information recording means with respect to a second direction of rotation of the information recording medium.

11. The information recording apparatus according to claim 1, wherein the print head is provided with an ink discharge part on a side facing to the label surface of the information recording medium, and
    the ink discharge part has a plurality of ink discharge ports which is arranged in the direction vertical to the radial direction of the information recording medium.

12. The information recording apparatus according to claim 11, further comprising a loading means for loading the information recording medium or ejecting it the information recording medium,
    wherein an eject operation for the information recording medium by the loading means is used to print the label.

13. The information recording apparatus according to claim 1, comprising a head control part configured to control the print head moving means so that a distance of a single movement of the print head can be changed, wherein the head control part changes a distance of a single movement of the print head, whereby the head control part can be selectively set a single print mode in which a same region on the information recording medium is printed for a single time and a multiprint mode in which the same region on the information recording medium is printed for a plurality of times.

14. The information recording apparatus according to claim 13, wherein the head control part controls the print head moving means so that a distance of a single movement of the print head is 1/n of a maximum print width of the print head, wherein n is a natural number.

15. The information recording apparatus according to claim 1, further comprising a maintenance member configured to perform maintenance of the print head,
wherein the head cleaning mechanism, the recording means cleaning mechanism and the maintenance member are formed in one piece with each other.

16. The information recording apparatus according to claim 1, further comprising a maintenance control part configured to perform control so that after the head cleaning mechanism cleans the print head, the recording means cleaning mechanism cleans the information recording means.

* * * * *